US010049292B2

(12) United States Patent
Walsh

(10) Patent No.: US 10,049,292 B2
(45) Date of Patent: Aug. 14, 2018

(54) INTELLIGENT DELIVERY SYSTEM BASED ON METRICS AND ANALYTICS

(71) Applicant: Dale Walsh, Dallas, GA (US)

(72) Inventor: Dale Walsh, Dallas, GA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/280,327

(22) Filed: Sep. 29, 2016

(65) Prior Publication Data

US 2018/0089526 A1    Mar. 29, 2018

(51) Int. Cl.
*G06K 9/46* (2006.01)
*G06Q 10/08* (2012.01)
*G06K 9/00* (2006.01)
*H04N 1/00* (2006.01)

(52) U.S. Cl.
CPC .......... *G06K 9/46* (2013.01); *G06K 9/00442* (2013.01); *G06Q 10/0838* (2013.01); *H04N 1/00225* (2013.01); *H04N 1/00251* (2013.01); *G06K 2209/01* (2013.01); *G06K 2209/27* (2013.01); *H04N 2201/3271* (2013.01); *H04N 2201/3277* (2013.01)

(58) Field of Classification Search
CPC .. G06K 9/46; G06K 9/00442; G06K 2209/01; G06K 2209/27; G06Q 10/0838; H04N 1/00225; H04N 1/00251; H04N 2201/3271; H04N 2201/3277

USPC ................. 382/101, 102; 705/7.29
See application file for complete search history.

(56) References Cited

U.S. PATENT DOCUMENTS

| 8,891,145 B2* | 11/2014 | Stumbo ............... G06F 3/147 358/426.02 |
| 2013/0182887 A1* | 7/2013 | Neinast ............... G06Q 40/00 382/101 |
| 2013/0226655 A1* | 8/2013 | Shaw ................. G06F 17/5009 705/7.29 |
| 2014/0140571 A1* | 5/2014 | Elmenhurst .......... G06K 9/3216 382/101 |

OTHER PUBLICATIONS

"Intelligent Mail Barcode Question and Answers", Sep. 17, 2008.
"USPS—Mail Tracking and Reporting—How IMb Tracing™ Works", 2016.
"Steps to creating your Intelligent Mail Barcode", 2016.
M. Ironside, "Revolutionizing the Student Mail Center".
"Intelligent Mail Barcode 4-State Specification", 2015.
U.S. Appl. No. 15/339,807, Dale Walsh, filed Oct. 31, 2016.
U.S. Appl. No. 15/280,277, Dale Walsh, filed Sep. 29, 2016.
U.S. Appl. No. 15/339,832, Dale Walsh, filed Oct. 31, 2016.

* cited by examiner

*Primary Examiner* — Ping Hsieh

(74) *Attorney, Agent, or Firm* — Cooper & Dunham LLP

(57) ABSTRACT

Tools are provided including intelligent provisions to perform processing of mail at a mailcenter that services plural mail service customers, such as, for example, adapted based on metrics and analytics derived from previous mail processing.

17 Claims, 44 Drawing Sheets

INTELLIGENT DELIVERY SYSTEM BASED ON METRICS AND ANALYTICS

TECHNICAL FIELD

This disclosure relates to systems, apparatuses, methodologies and other tools for processing of mail, and more specifically, tools including intelligent provisions to perform processing of mail at a mailcenter that services plural mail service customers, such as, for example, adapted based on metrics and analytics derived from previous mail processing.

BACKGROUND

The standard practice in most mailcenters across the country is to process mail as they arrive, with little, if any, planning to include provisions to track and tally incoming mail. For example, the conventional method in most mailcenters across the country is to deliver by hand mail that is received at the mailcenter. However, a large percentage of the mail may be unwanted (e.g., "junk mail"). Further, most mailcenters have no idea where their incoming mail actually comes from, who the mail is going to, sizes of their incoming mail or the classes of their incoming mail which makes it very difficult to know the amount of unwanted mail that is being received. As a result, mailcenters spend tremendous amounts of money and time receiving, sorting, distributing and delivering mail that is often unwanted and immediately thrown away by the mail service customer. Further, most mailcenters do not charge for the sorting and delivery of incoming mail, as there is no provision to accurately account for the incoming mail, in contrast to outgoing mail.

An improved approach to process and deliver mail, such as by integrating and adapting existing information technology tools, is needed.

SUMMARY

Various tools (for example, a system, application software, a method, etc.) can be provided for intelligent processing of mail. A system may entail a suite of hardware and software designed to facilitate the accurate collection of incoming mail piece counts, image and OCR (Optical Character Recognition) mailpieces to extract useful data and provide detailed metrics and analytics regarding incoming mail volumes, recipients, departments, senders, sizes, classes of mail, etc. The analytics collected can be employed as a roadmap to facilitate automation of workflows within mailstreams. As another advantageous option, the system of hardware and software can be utilized to convert physical correspondence mail into digital mail by sending recipients the captured images of their mailpieces and giving them the ability to provide instructions as to how each mailpiece should be processed. Such a system can allow a mailcenter staff to have complete visibility to incoming mail streams as well as the option to turn all of those mainstreams (including transactional and correspondence mail) into digital workflows instead of time consuming and expensive physical delivery.

For example, an intelligent delivery system may be provided to obtain information from each mail item amongst incoming mail by imprinting mailpiece identifier on the mail item, scanning of the mail item to generate a digital image, performing optical character recognition (OCR) on the digital image to obtain sender/addressee information (and generate corresponding data). Further, such system preferably has a mail processing controller that is programmed to control mail processing flow. Such control may be based on live data (such as sender/addressee data), as well as metrics and analytics that may be performed offline or on a back end.

In another aspect, the processing of the live data may include acquiring an electronic address of a customer associated with the addressee information, and sending the digital image (and mailpiece identifier) to the electronic address as a notification, which may include a request for instruction regarding how to process the mail item. Such request may be provided via a webpage accessible by a uniform resource locator (URL) link that is included in the notification. By user operation through the webpage, the customer may enter a message, or otherwise specify instructions, indicating to the mailcenter on how to process the notified mail item. For example, the page (or the notification) may provide options for specifying predetermined instructions, such as open-and-scan-mailpiece, deliver mailpiece by hand, hold mailpiece for pickup, forward to a specified address, discard or destroy, treat as junk mail, etc.). Thus, the customer may simply activate one of the predetermined response instructions for processing the mail item.

In another aspect, incoming mail can be categorized as transactional mail or correspondence mail. Transactional mail, such as when the specified destination is a group, post office box number or mailstop (e.g., Accounts Payable, Accounts Receivable, Claims, Human Resources, Remittance, etc.) and not an individual may be processed according to predefined and repeatable workflows associated with them. In the case that a mail item is considered to be transaction mail, a transaction mail code and/or a department code can be generated as metadata. For example, the code can be marked physically on the casing of the mail item, and processing can be performed on the mail item according to a predetermined workflow corresponding to the code. All of the remaining mail (i.e. that is not transactional) may be considered to be correspondence mail and automated as much as possible, including converting a customer's physical correspondence mail into digital mail, where desired and instructed by the customer. As an initial digitizing step, one or more digital images of the exterior of the mailpiece is captured and emailed to the customer, and providing the mail service customer with the to provide instructions as to how each mailpiece should be processed.

The system preferably tracks each mailpiece and the disposition decision made regarding the mailpiece in real time, and then notifies the mailcenter when a decision is made regarding the mailpiece. In the case that the delivery system is fully automated, the mailpiece identified by the mailpiece identifier is retrieved from repository and routed according to the disposition instruction. On the other hand, in other circumstances, such notification may be sent to mailcenter personnel, and the mailpiece may be retrieved by hand from a mail tray and bin (or the tray or bin may be retrieved) and placed on a processing station including a scanner, and processed through the scanner. Once the mailpiece identifier (such as in form of imprinted barcode) associated with the mailpiece is detected, the scanner then imprints the disposition instructions (such as in form of code, corresponding to, e.g., open/scan, hold, deliver, destroy, etc.) onto the mailpiece, and diverts it from the rest of the mailpieces still awaiting disposition instructions. The system may also be configured to process business rules such as escalations for mailpieces which have not had a sort decision made regarding them in a predefined number of days, multiple notifications of mail receipt from key senders, such as governmental agencies (e.g., FDA, FAA, IRS, etc.) for compliance purposes.

In another aspect, the data obtained through the processing is preferably output as metadata to a mail database. Each mailpiece is assigned a unique mailpiece identifier, and the metadata for the mailpiece is associated with such identifier. By employing an organized process to collect and register mail data, it is possible to readily apply a metrics process and/or an analytics process to extract data for a detailed view as well as data for a high-level view, that permit intelligent adjustments to mail processing control. The system may calculate total mail data such as the total number of mail items received for particular customer, the total number of mail items sent by specific sender, the total number of mail items for specific mail class (e.g., transactional mail, junk mail, etc.), etc. Such total mail data may be registered in the mail database for further analysis. The system may determine from the mail processing preferences by specific customers such as preferred disposition method, preferred hand-delivery location, preferred pick-up location, etc. The system may utilize such information when creating notifications that include predetermined responses (e.g., open-and-scan mailpiece, delivery-by-hand, pick-up, etc.) by specifying the preferred locations or disposition methods for each one. Many other possible uses of the mail data are possible. Some additional examples are provided in the following discussion.

BRIEF DESCRIPTION OF THE DRAWINGS

The aforementioned and other aspects, features and advantages can be more readily understood from the following detailed description with reference to the accompanying drawings wherein.

DETAILED DESCRIPTION OF EMBODIMENTS

Figure 1A:
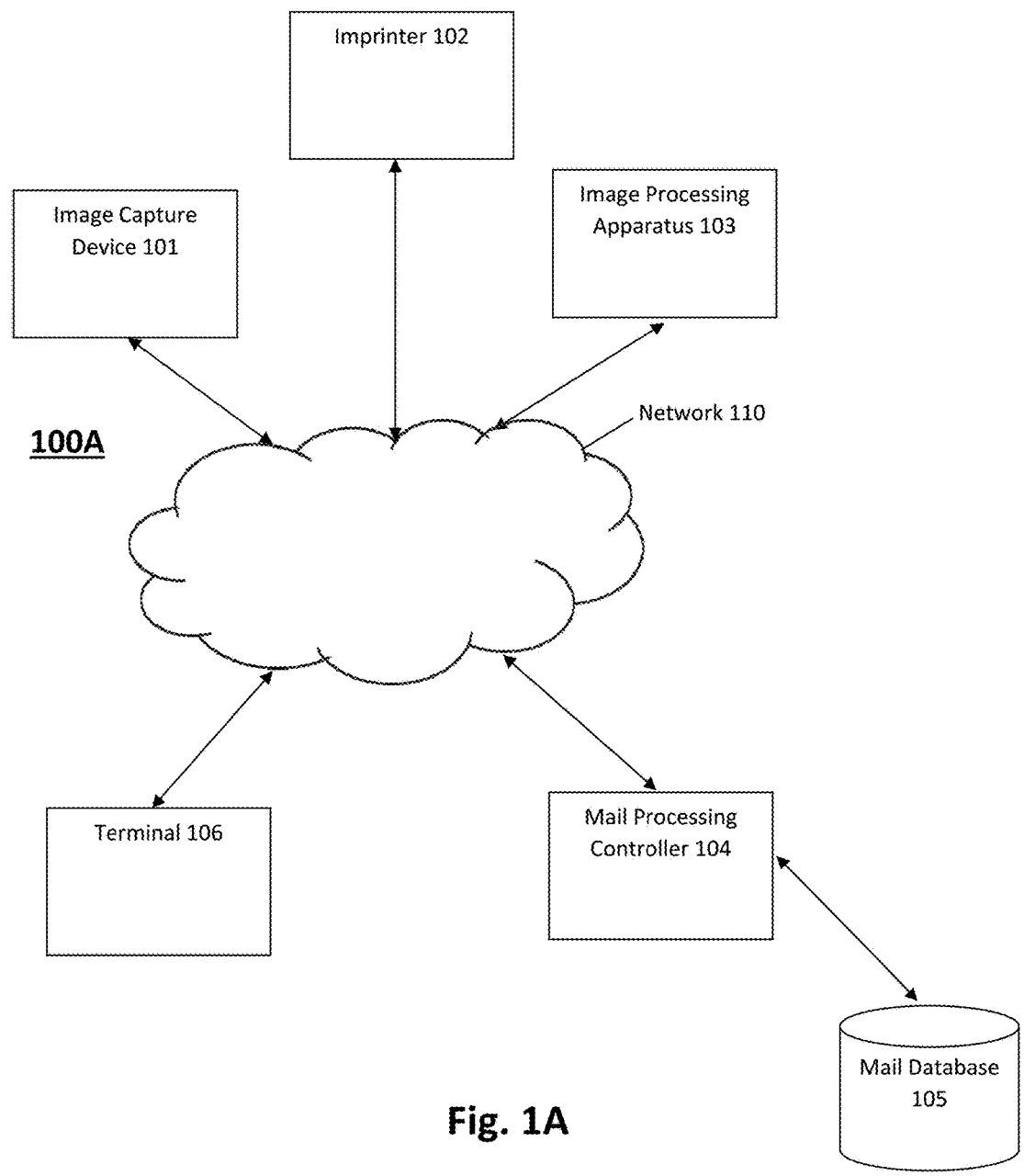
FIG. 1A shows a block diagram of a system that can include various provisions to perform processing of mail, according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate processing of mail are discussed herein. It should be appreciated by those skilled in the art that any one or more of the various aspects, features and advantages discussed herein may be embedded in a mail delivery system and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1A shows schematically a system 100A that includes an image capture device 101, an imprinter 102, an image processing apparatus 103, a mail processing controller 104 and a terminal 105, all of which is configured to connect to a network, such as network 106.

The image capture device 101 scans mail to obtain a digital image of an address-bearing face of the mail received at a mail facility. Mail can be any item (e.g., letters, writing, documents, etc.) that is sent to the customer in a variety of forms (e.g., postcards, envelope, package, boxes, etc.). The mail facility may be any location that receives, sends out or processes mail. For example, the mail facility can be the local post office or a mailcenter of an organization or a university. For example, the image capture device 101 may receive numerous amounts of mail to scan. For each properly labeled mail item amongst the mail, the image capture device 101 may capture images of the mail item using a device for capturing images (e.g., camera). Such captured images become the digital image of an address-bearing face of the mail item. The address-bearing face of the mail item may be the portion of the mail item in which information regarding the sender (and his or her address) and the recipient (and his or her address) is indicated. In one exemplary embodiment, a mail staff of the mail center may assist the image capture device 101a in determining which portion of the mail item is the address-bearing face. In another exemplary embodiment, the image capture device 101a may capture every portion of the mail item, and let another device (e.g., image processing apparatus 103) determine which portion is the address-bearing face. The image capture device 101 may send the digital image to the image processing apparatus 103.

The imprinter 102 marks the mail item with a mailpiece identifier that is uniquely assigned to the mail item. The mailpiece identifier may be randomly determined or generated and may include letters, symbols and numbers arranged in a pattern that uniquely identifies the mail item. The marking of the mail item with the mailpiece identifier may performed through various means such as stamping, printing, engraving, etc. Further, the marking of the mail item may be performed before or after the image capture device 101a scans mail.

In one exemplary embodiment, the imprinter 102 may send the mailpiece identifier to the image processing apparatus 103. In another exemplary embodiment, the imprinter 102 may imprint the mailpiece identifier onto the mail item before such mail item is captured by the image capture device 101. Further, such mailpiece identifier may be on the address-bearing face of the mail item. Thus, when the image capture device 101a captures an image of the address-bearing face of the mail item, the mailpiece identifier may be captured along as well. As a result, it is not necessary for the imprinter 102 to send the mailpiece identifier to the image processing apparatus 103.

The image processing apparatus 103 extracts information from the digital image received from the image capture device 101. For example, from the digital image, image processing apparatus 103 may determine any writing (whether typed or handwritten) that is on the mail item by using optical character recognition (OCR). After performing OCR on the mail obtain characters (e.g., Latin/Cyrillic alphabet, Chinese/Japanese characters, etc.), the image processing apparatus 103 may determine what sort of mail information is represented by the now-recognized characters (e.g., a person's name, company, government agency, university, a physical address of a location in real-life, etc.) by, for example, comparing information in the mail database 105 to the now-recognized characters. In an exemplary embodiment, in a case that the image processing apparatus 103 receives more than one digital image (as the image capture device does not know which side is the address-bearing face of the mail item), the image processing apparatus 103 may perform OCR on each of the digital images, then compare the now-recognized characters to the information in a database to determine which of the digital images is the address-bearing face, as well as the information contained with the now-determined address-bearing face.

By performing such action, the image processing apparatus 104 can extract sender information (e.g., sender name, sender's address, etc.) and recipient information (e.g., recipient name, recipient's address, etc.) from the digital image. In an exemplary embodiment, in the case that the digital image includes the mailpiece identifier marked by the imprinter, the image processing apparatus 103 may extract this as well. Next, after performing extraction, the image processing apparatus 103 outputs, to the mail processing controller 104, (i) the digital image, (ii) the sender information, (iii) the recipient information and (iv) metadata (including the mailpiece identifier) as extracted mail information.

The mail processing controller 104, after receiving the extracted mail information, determines an electronic address (e.g., email address) of the customer who is associated with the recipient information by accessing the mail database 105 which may include a table that contains information of all of the customers associated with the mail center along with their corresponding electronic address (e.g., email, phone number, etc.). In an exemplary embodiment, when the mail processing controller 101d may use the recipient information to query the mail database 105. Once the query causes matches to be made to records in the customer database 102, the mail processing controller 104 compares remainder of the metadata (received from the image processing apparatus 103) to the records to select a record that best matches the metadata. Once the mail processing controller 104 determines the electronic address, the mail processing controller 104 sends a notification (notifying arrival of mail) to the electronic address. In an exemplary embodiment, the mail processing controller 104 may also attach the digital image and the mailpiece identifier corresponding to the mail item to the notification.

The notification may be performed by sending an email from the mail processing controller 104 to the customer. For example, the mail processing controller 104 may be possessed by an organization that provides mail service via the mail center. The customer may have previously registered his or her email address with the organization so that when any mail for the customer arrives, the customer may be automatically informed by an email sent by the mail processing controller 104 to the customer. However, it should be noted that such notification is not limited to email. For example, notifications can be performed via SMS messaging, Facebook, etc.

Upon receiving the notification from the mail processing controller 104, the customer may be presented with information that is included in the notification. For example, the notification may have been an email that includes a selectable link [e.g., uniform resource location (URL)] that, once selected by the customer, directs the customer to a particular page on a website (made specifically for the incoming mail associated with the customer) which provides the customer with a way to specify instructions on how to process the mail at the mail center. For example, the customer may type in notes or instructions manually (e.g., "send mail to my house", "keep at mail center for me to pick up", etc.). Once the customer submits his or her manual instructions, a staff at the mail center may read the customer's instructions and perform such actions corresponding to the instructions accordingly.

In another exemplary embodiment, the customer may not need to manually specify instructions on how the mail is to be processed. Instead, the customer may simply indicate that the mail should be processed according to predetermined responsive instructions. For example, instead of a link to a webpage, the notification email may include links that include predetermined responsive instructions (e.g., "open-and-scan-mailpiece", "deliver mailpiece by hand", "hold mailpiece for pickup", "forward to a specified address", "discard or destroy and treat as junk mail", etc.). In other words, the customer may not need to manually type in instructions. He or she may simply select the predetermined responsive instructions which may cause the mail to be processed automatically according to the selected predetermined responsive instructions. Thus, there is no need to have a staff of the mail center read manually typed instructions from the user as the process can be performed automatically.

In addition to performing the aforementioned actions, the mail processing controller 104 also manages the day-to-day operations of the mail facility. For example, the mail processing controller 104 may receive instructions from the customers from which the mail processing controller 104 may execute such instructions itself or may assign a specific mail staff at the mail facility tasks associated with the instructions. In another example, the mail processing controller 104 may periodically manage the existing mail items that are currently stored at the mail facility. In other words, the mail processing controller 104 may keep track of mail items that have received instructions on processing, but such instructions have not been executed yet. In another case, the mail processing controller 104 may keep track of mail items that have not yet received any instructions.

The mail database 105 includes information regarding mail data. For example, the mail database 105 includes information regarding the customers associated with the mail facility. In another example, the mail database 105 may include information such customer name, primary physical address (e.g., home), secondary physical address (e.g., work), home phone number, cell phone number, electronic address (email), etc. In yet another example, the mail database 105 registers data for arrived mail. Whenever the mail facility receives incoming mail, the mail items are processed and temporary stored in a bin that is labeled with the a bin identifier that is associated with the mailpiece identifier of the corresponding mail item (the bin identifier being a different series of characters, numbers and symbols then the mailpiece identifier). However, the mail processing controller 104 may register in the mail database 105 information (such as metadata) corresponding to each mail item processed. For example, such metadata may include time of arrival of the mail item, weight of the mail item, size of the mail item, color of the casing of the mail item, etc. The mail processing controller 104 may register a digital image corresponding to the mail item in the mail database 105 as well. In addition, the metadata and the digital image are registered in association with the mailpiece identifier uniquely assigned to the mail item, in the mailpiece database.

In an exemplary embodiment, the metadata may also include a transaction mail indicator and a department code. When the image processing apparatus 103 determines from analyzing the digital image (received from the image capture device 101) that such digital image corresponds to transactional mail (e.g., Accounts Payable, Accounts Receivable, Claims, Human Resources, Remittance, etc.), the image processing apparatus 103 outputs the digital image and the metadata including a transactional mail indicator (specifying that such mail item is transaction mail) and a department code, to the mail processing controller 104. The department code may correspond to one of several departments in the mail facility. In other words, for example, one department may handle mail regarding checks, while another may handle money orders. After the mail processing controller 104 receives the metadata including the mailpiece identifier, the transactional mail indicator and the department code, the mail processing controller 104 causes the imprinter 102 to mark the department code on the mail item and causes the mail item to be processed according to a predetermined workflow corresponding to the department code. In other words, the imprinter 102 creates a physical impression (e.g., via stamping, printing, etc.) on the casing (e.g., envelope, package, etc.) of the actual mail item. Such impression may correspond to the department code which allows mailcenter staff or a device at the mail facility to determine what kind of processing needs to be performed on the mail item according to the department code.

The host terminal 106 can be any computing device, including but not limited to a tablet or notebook computer, a PDA (personal digital assistant), another mobile information terminal, etc., that can communicate with other devices through the network 105.

The network 110 can be a local area network, a wide area network or any type of network such as an intranet, an extranet (for example, to provide controlled access to external users, for example through the Internet), a private or public cloud network, the Internet, etc., or a combination thereof. In addition, the network 106 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
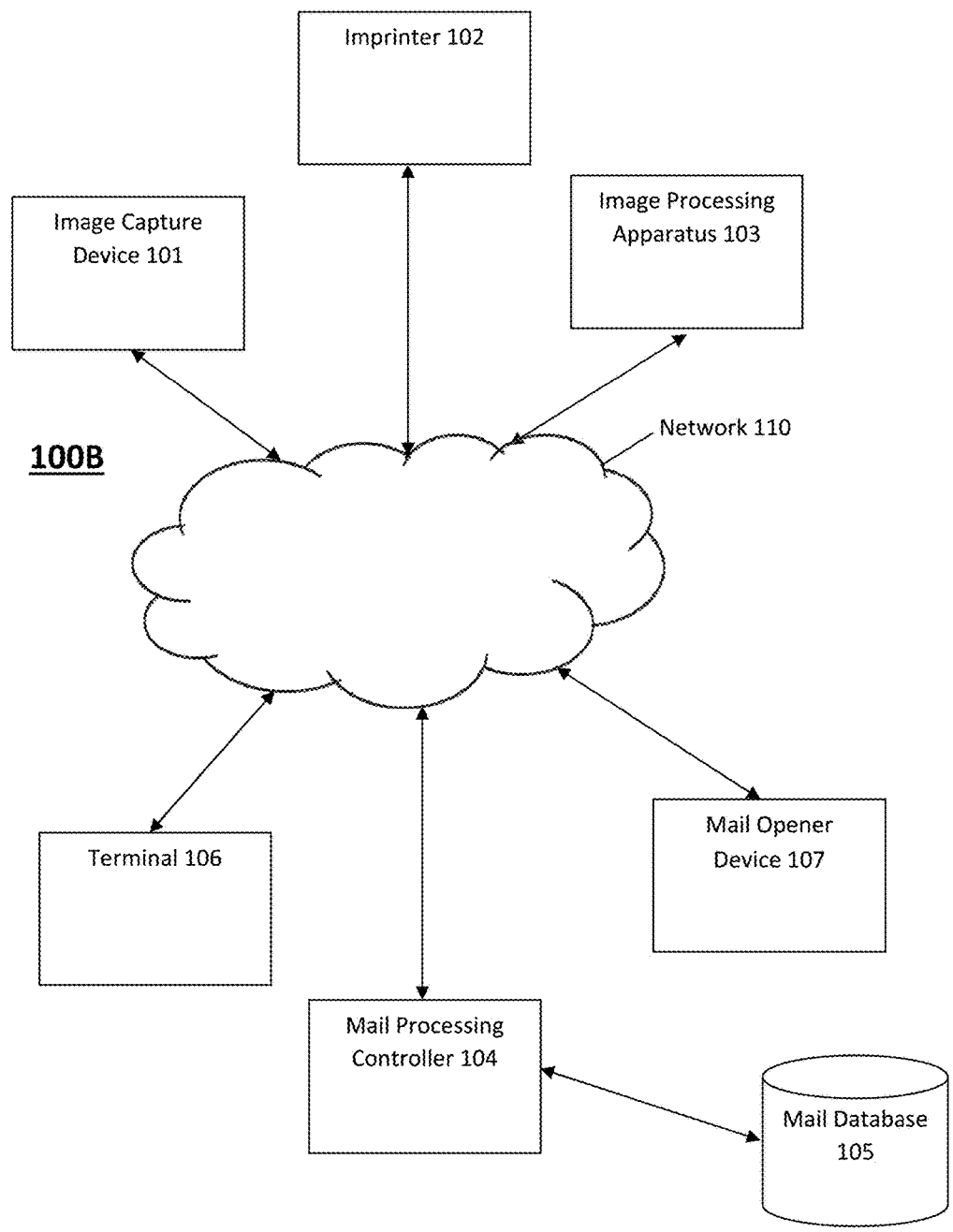
FIG. 1B shows a block diagram of a system that can include various provisions to perform processing of mail, according to another embodiment.

FIG. 1B shows schematically a system 100B according to another exemplary embodiment. The system 100B is similar to the system 100A except that the system 100B additionally includes a mail opener device 107.

The mail opener device 107 opens mail items automatically (without any human intervention) upon receiving instructions to do so from the mail processing controller 104. For example, the mail processing controller 1004 may have received instructions from a customer to open and scan the mail item (i.e. open up the casing of the mail item to obtain the contents disposed inside the mail item and then scan the contents into an electronic document). Once the mail processing controller 1004 receives instructions to open-and-scan, the mail processing controller 104 sends an instruction to open the mail item to the mail opener device 107. Once the mail opener device 107 receives such instruction from the mail processing controller 104, the mail opener device 107 proceeds to separate the casing (e.g., envelope, packaging, etc.) from the contents (e.g., letter, documents, etc.) of the mail item. Such separation may be performed automatically by the mail opener device 107 using a variety of tools (e.g., knife, paper cutter, letter opener, etc.). In an exemplary embodiment, once the contents are separated, the mail processing controller 104 instructs the mail opener device 107 to send both the casing and the separated contents to the image capture device 101 for the purpose of scanning the casing and the contents.

Otherwise, operations of the elements of the system 100B are similar to those discussed in connection with corresponding elements of the system 100A of FIG. 1A.

Figure 1C:
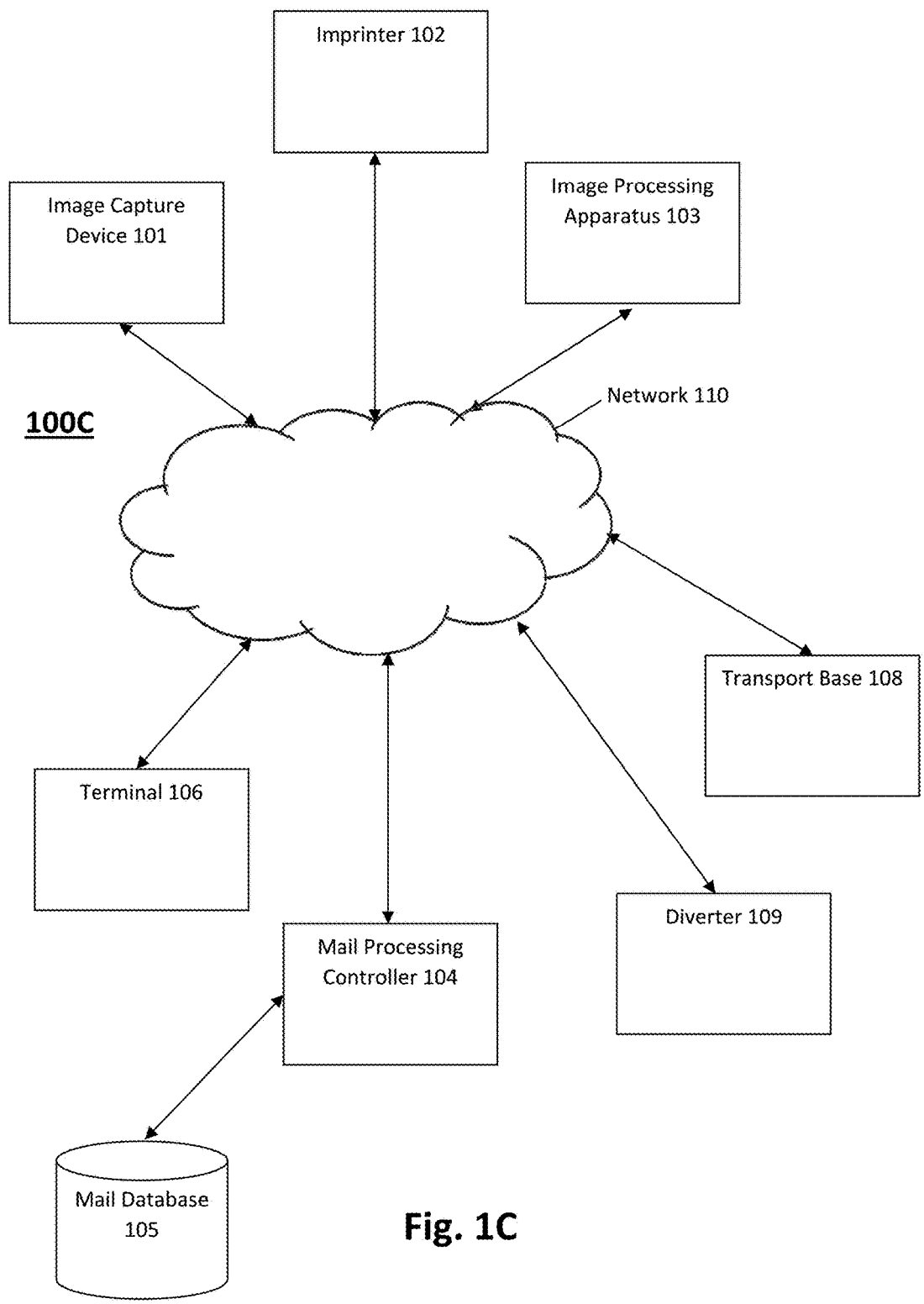
FIG. 1C shows a block diagram of a system that can include various provisions to perform processing of mail, according to yet another embodiment.

FIG. 1C shows schematically a system 100C according to another exemplary embodiment. The system 100C is similar to the system 100A except that the system 100C additionally includes a transport base 108 and a diverter 109.

The transport base 108 allows mail to be transported in the mail facility. For example, the transport base 108 may be a series of conveyor belts specifically designed to move packages from one location in the mail facility to the other. In another example, the transport base 108 may connect with other devices (e.g., mail opener device 107) in the mail facility.

The diverter 109 may divert mail items currently being transported by the transport base 108. For example, the diverter 109 may be a crane that lifts mail items from one section of the transport base 108 to be placed on another section of the transport base 108. In another example, the diverter 109 may be a switch (similar to a railroad switch) that is at the end of transport base 101f. When the mail processing controller 104 receives the transactional mail indicator and the department code, the mail processing controller 104 causes the diverter 109 to redirect mail items by continuously switching (from one position to another) to allow mail items to be processed according to the predetermined workflow corresponding to the department code.

Otherwise, operations of the elements of the system 100C are similar to those discussed in connection with corresponding elements of the system 100A of FIG. 1A.

Figure 2:
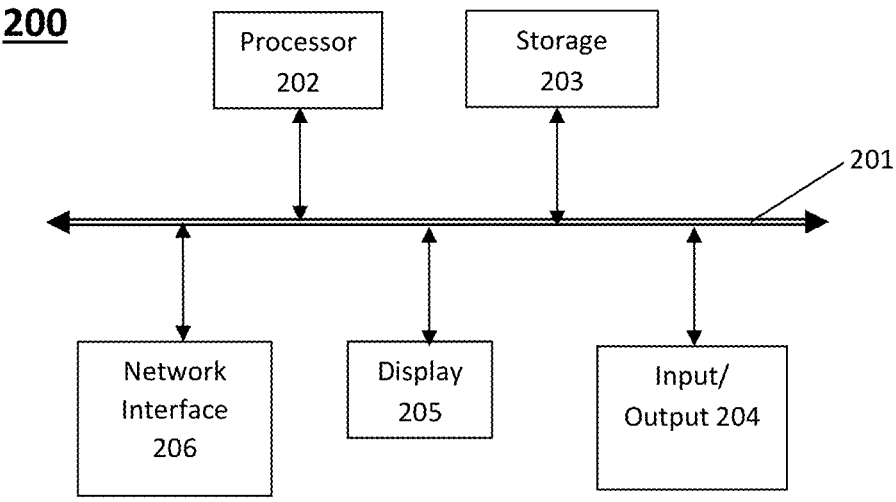
FIG. 2 shows a block diagram of an example of a configuration of a computing device that can be configured by software to operate as a mail notification apparatus.

FIG. 2 shows an exemplary constitution of a computing device that can be configured (for example, through software) to operate (at least in part) as the mail processing controller (e.g., 104 in FIGS. 1A-1C) and image processing device (e.g., 103 in FIGS. 1A-1C). In FIG. 2, apparatus 200 includes a processor (or central processing unit) 202 that communicates with a number of other components, including memory or storage device 203, display 205, network interface 206, and other input/output (e.g., keyboard, mouse, etc.) 204, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion. Further, the apparatus 200 is not limited to a server or computer, but can be manifested in any of various devices that can be configured to communicate over a network and/or the Internet.

Figure 3:
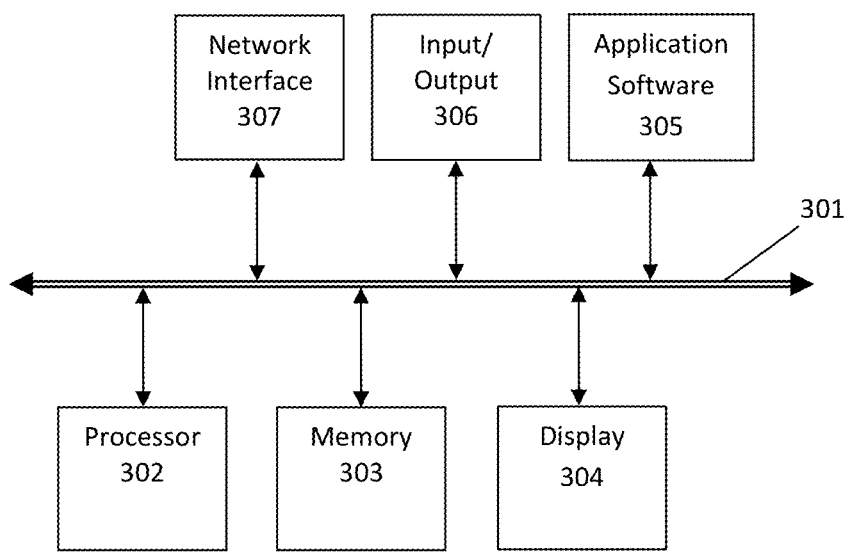
FIG. 3 shows a block diagram of an example of a configuration of a mobile device that can be configured to be a terminal.

An exemplary constitution of the host terminal 105 of FIGS. 1A-1C is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 106 of FIGS. 1A-1C).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
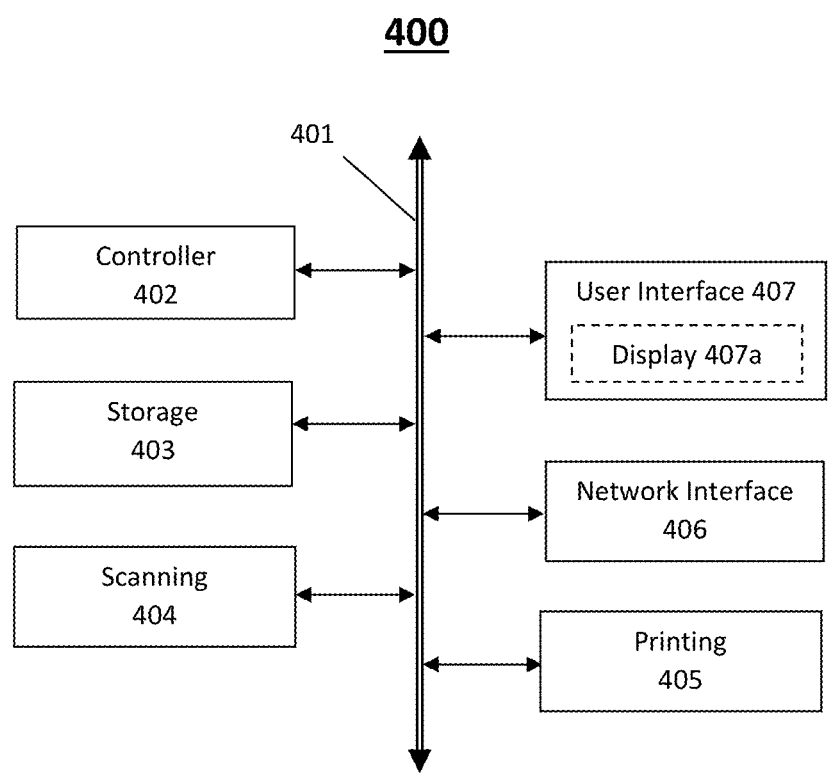
FIG. 4 shows a block diagram of an example of a configuration of a scanner workstation.

FIG. 4 shows a schematic diagram of a configuration of an output device that may perform scanning (e.g., image capture device 101a) and printing (e.g., imprinter 101b). The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406 and a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407a) for inputting information or requesting various operations. Alternatively, the user interface 407 and the display screen may be operated by a keyboard, a mouse, a remote control, voice recognition, or eye-movement tracking, or a combination thereof.

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

FIGS. 5A-5D shows processes performed in, for example, the systems 100A-100C (illustrated in FIGS. 1A-1C, respectively), according to an exemplary embodiment. It should be noted that the mailcenter may correspond to the image capture device 101, the imprinter 102, and the image processing apparatus 103 and the mail processing server may correspond to or include the mail processing controller 104 (or any databases presented in FIGS. 1A-1C).

Figure 5A:
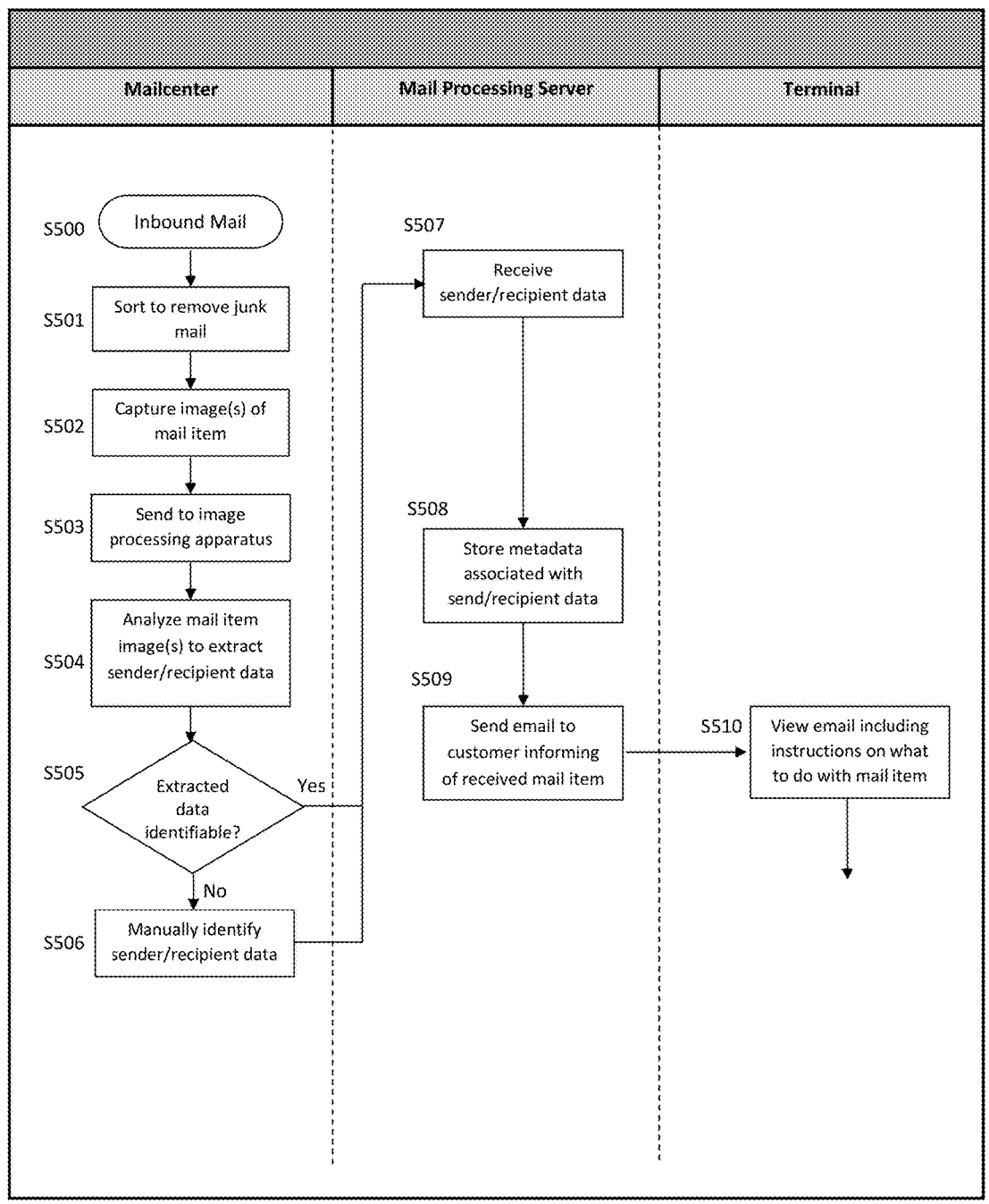
FIG. 5A shows a flow chart for a method (and communication flow) that can be performed in any of the systems of FIGS. 1A-1C (or an equivalent)

FIG. 5A shows a process performed in, for example, the systems 100A-100C (illustrated in FIGS. 1A-1C, respectively), according to an exemplary embodiment.

When the mailcenter receives incoming mail (S500), the mailcenter sorts through the incoming mail to remove any junk mail (S501). Next, an image capture device captures images (e.g., such as an address-bearing face) of the mail item (S502). Afterwards, the image capture device sends the captured images to an image processing apparatus (S504). The image processing apparatus analyzes the captured images to extract sender/recipient data from the captured images (S504).

However, the mail item may not always have legible writing or the font may be unrecognizable, which may be reflected in the captured image. Thus, in the case that the extracted data is identifiable (or, in other words, the sender/recipient data can be clearly established) (S505, yes), the mailcenter sends the extracted data to the mail processing server (S507). Otherwise, in the case that the extracted data is not identifiable (S505, no), the sender/recipient data is manually determined by, for example, a mail staff (S506). Next, the mail processing server stores metadata associated with send/recipient data (S508). Then, the mail processing server sends an email to a customer associated with the recipient information (S509). After receiving the email, the terminal opens the email to present the contents for the customer's viewing and for inputting instructions (S510).

Figure 5B:
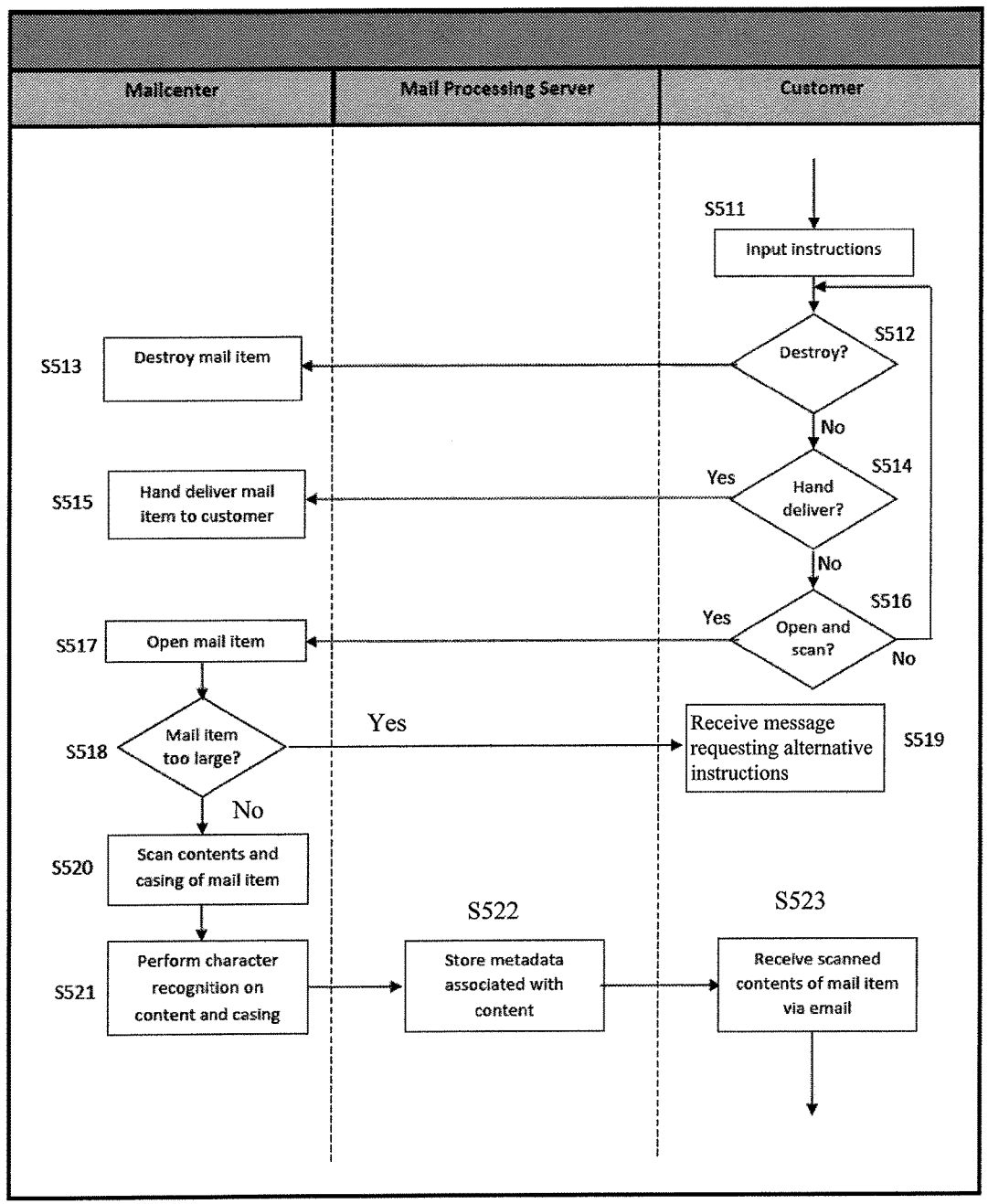
FIG. 5B shows a flow chart for a method (and communication flow) that can be performed in any of the systems of FIGS. 1A-1C (or an equivalent)

FIG. 5B shows a process performed in, for example, the systems 100A-100C (illustrated in FIGS. 1A-1C, respectively), according to an exemplary embodiment.

After receiving the instructions from the customer, the terminal determines what kind of instructions were inputted by the user. In the case that the instructions are to destroy the mail item (S512, yes), the mailcenter destroys the mail item (S513). Otherwise (S512, no), in the case that the instructions are to hand deliver the mail item (S514, yes), the mailcenter hand delivers the mail item to the intended recipient (S515). Otherwise (S514, no), in the case that the instructions are to open and scan the mail item (S516, yes), the casing (e.g., packaging, mail item, etc.) of the mail item is opened to obtain the contents inside (S517). Otherwise (S516, no), the process repeats. Next, a determination is made as to whether the mail item is too large to scan (S518). In the case that the mail item is too large (S518, yes), the contents are not scanned and instead another message is sent to the terminal to request alternative instructions (S519). On the other hand, if the mail item is not too large (S518, yes), the contents and the casing are scanned (S520). Then, optical character recognition (OCR) is performed on the scanned content and casing (S521). Next, the scanned content and casing is sent to the mail processing server which creates and stores metadata associated with the scanned content (S522). Afterwards, the scanned content is sent to the intended recipient via email to the terminal (S523).

Figure 5C:
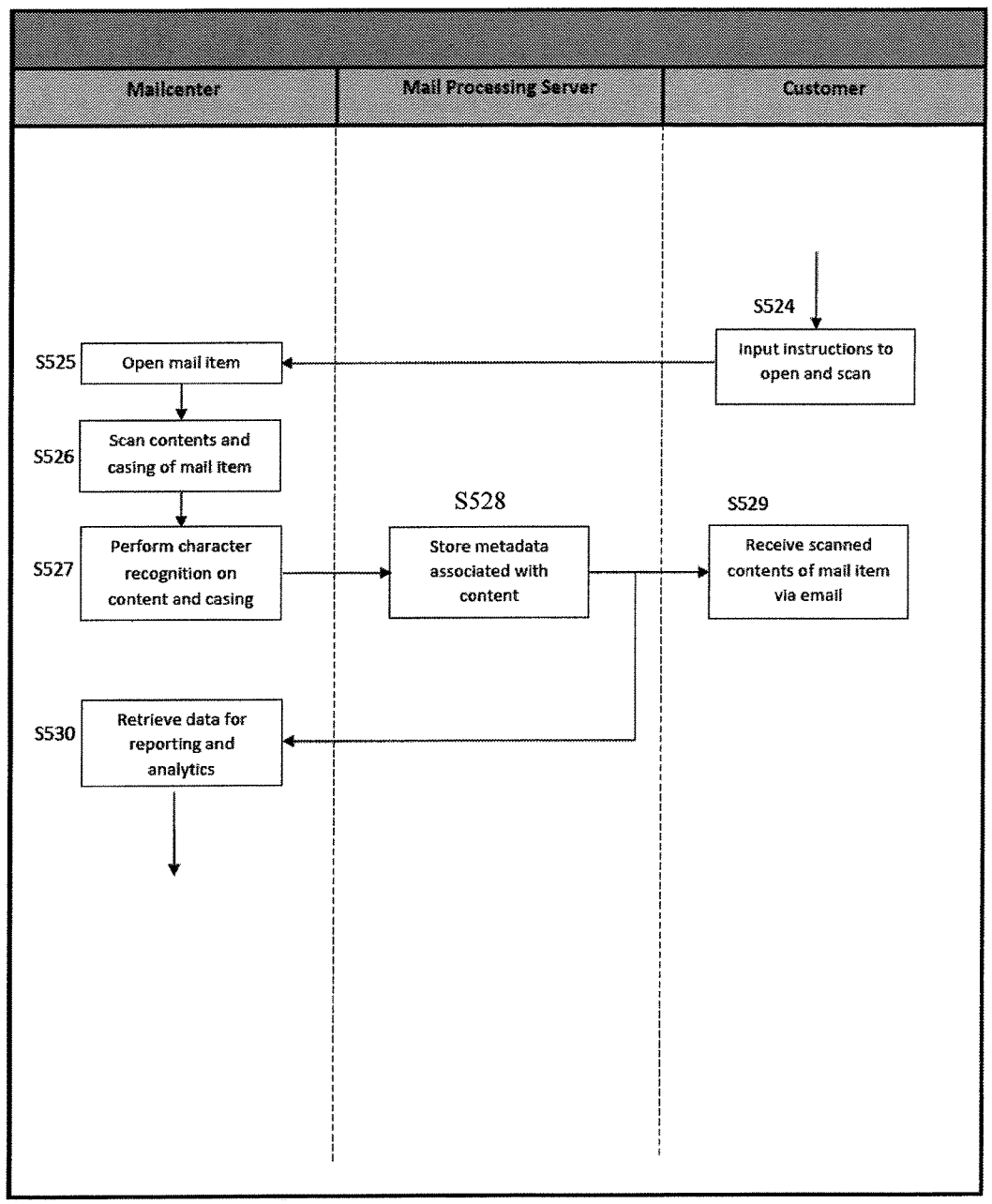
FIG. 5C shows a flow chart for a method (and communication flow) that can be performed in any of the systems of FIGS. 1A-1C (or an equivalent)

FIG. 5C shows a process performed in, for example, the systems 100A-100C (illustrated in FIGS. 1A-1C, respectively), according to an exemplary embodiment.

After receiving instructions to open and scan the mail item (S524), such instruction is sent to a mail opener device which proceeds to open the mail item (S525). Next, the image capture device scans the content and casing of the mail item as a digital images (S526). Then, the image processing apparatus performs character recognition (e.g., OCR) on the digital images corresponding to the content and casing of the mail item (S527). Next, the digital images which had OCR performed thereon and the metadata associated with the mail item is sent to the mail processing server which proceeds to store the metadata (S528), send the digital images to the customer (S529), and causes the mail processing controller to retrieve data corresponding to the mail item for reporting and analytics (S530).

Figure 5D:
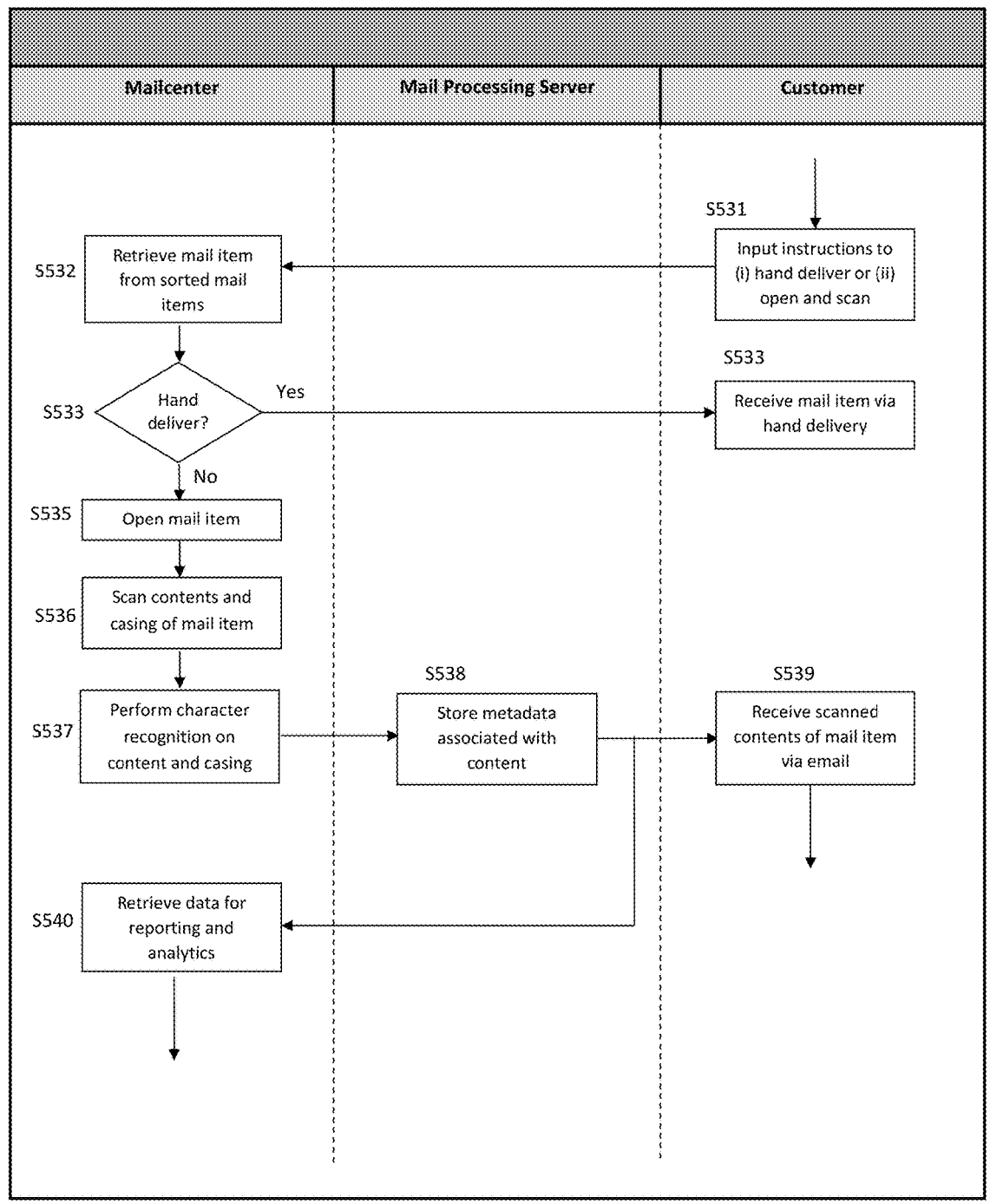
FIG. 5D shows a flow chart for a method (and communication flow) that can be performed in any of the systems of FIGS. 1A-1C (or an equivalent)

FIG. 5D shows a process performed in, for example, the systems 100A-100C (illustrated in FIGS. 1A-1C, respectively), according to an exemplary embodiment.

After receiving instructions to open and scan the mail item or hand deliver the mail item (S531), the mail item is retrieved from sorted mail (S532). In the case that the instructions were to hand deliver the mail item (S533, yes), the mailcenter hand delivers the mail item to the intended recipient (S534). On the other hand, in the case that the instructions are to open and scan the mail item (S533, no), the casing (e.g., packaging, mail item, etc.) of the mail item is opened to obtain the contents inside (S535). Next, the image capture device scans the content and casing of the mail item as a digital images (S536). Then, the image processing apparatus performs character recognition (e.g., OCR) on the digital images corresponding to the content and casing of the mail item (S537). Next, the digital images which had OCR performed thereon and the metadata associated with the mail item is sent to the mail processing server which proceeds to store the metadata (S538), send the digital images to the customer (S539), and causes the mail processing controller to retrieve data corresponding to the mail item for reporting and analytics (S540).

Figure 6A:
FIG. 6A-6D show examples of pieces of mail.

FIG. 6A shows an example of a mail item that has not yet been processed (i.e. newly arrived mail).

Figure 6B:

FIG. 6B shows an example of a mail item that has been imprinted (e.g., by imprinter 102 of FIGS. 1A-1C) with a mailpiece identifier. Such mailpiece identifier may be a series of characters, number or symbols that uniquely identifier a mail item.

Figure 6C:

FIG. 6C shows an example of a mail item with barcodes labeled under the addresses of each of the sender and recipient. Such barcodes enable, for example, an image processing apparatus to determine the address information of each of the sender and recipient without having to resort to performing OCR.

Figure 6D:
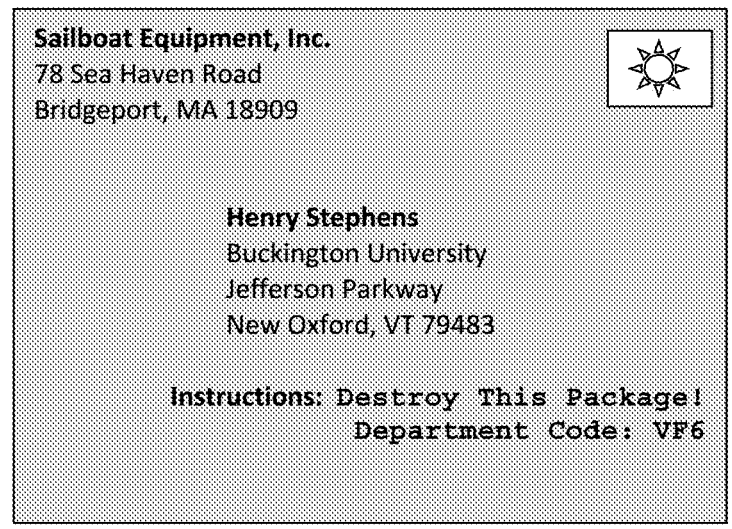

FIG. 6D shows an example of a mail item that has been processed. In this case the mail item has been printed with instructions and a department code. For example, the mail processing controller may determine whether mail processing instructions have been registered in association with the mailpiece identifier of the mail item. When such registration has been made, the mail processing controller causes the mail item to be printed with instructions and/or a department code. For example, the department code may indicate which department the mail item should be ultimately processed at. The instructions may indicate to, for example, a mail staff at the department on how to process the mail item.

Figure 7:
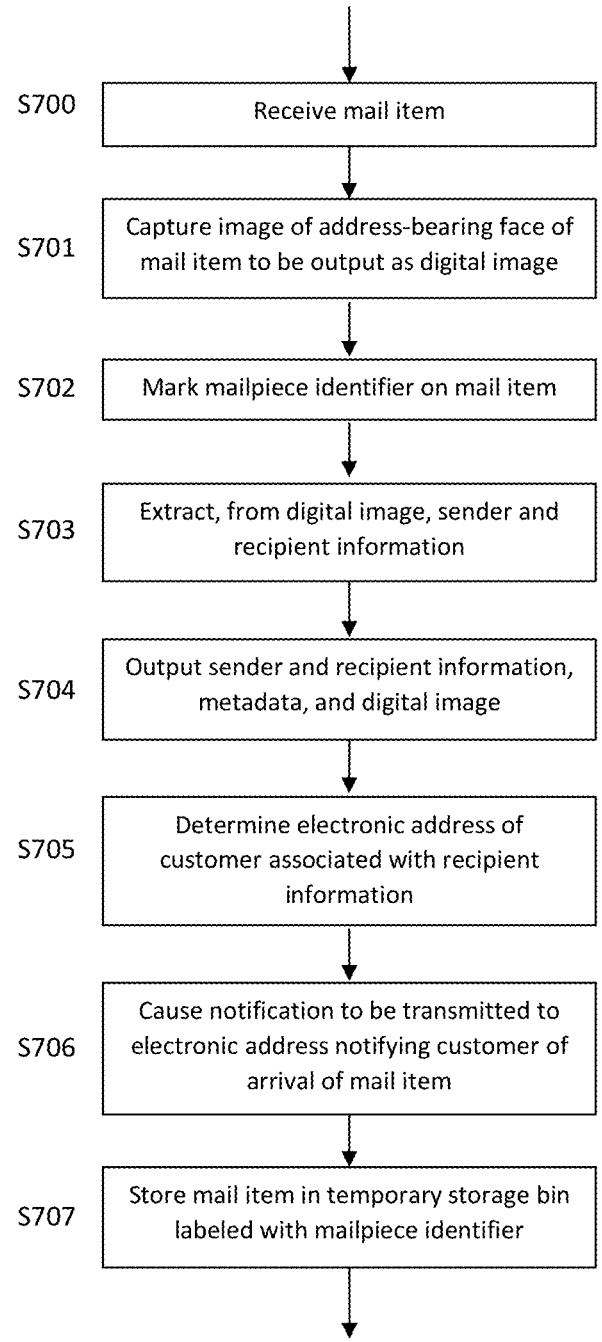
FIG. 7 shows a flow chart for a method that can be performed in any of the systems of FIGS. 1A-1C (or an equivalent)

FIG. 7 shows a method that can performed by a system (e.g., 100A-100B in FIGS. 1A-1B) according to an exemplary embodiment.

In the following example, a university (Buckington University) provides mail services on its campus to its university population (e.g., students, professors, staff members, etc.) via a mailcenter. The mail services, for example, may include delivering the mail on campus (e.g., dormitories, personal offices, cubicles, etc.). The mail may come in a variety of forms such as envelopes, postcards, packages, etc.

Such process commences when the mailcenter receives mail from one or more carriers (e.g., United States Post Office, Federal Express, United Postal Service, etc.). Once the mail has been received, each mail item (or mail piece) amongst the mail is processed automatically by one or more scanner workstations disposed throughout the mailcenter. The scanner workstations may include a mail processing controller, one or more image capture devices, an imprinter and an image processing apparatus. Once a particular scanner workstation receives at least one mail item (S700), the mail be transported (e.g., moved) throughout different portions of the scanner workstation via a variety of means (e.g., conveyor belts, etc.). For example, the first device to encounter the mail item may be the image capture device which captures an image of the address-bearing face of mail item to be output as a digital image (S701).

The address-bearing face of the mail item includes the side of the mail item that contains sender and addressee information. The sender information may include the name of the sender (e.g., person's name, company name, government agency, etc.) and the physical address (in a real-world location) of the sender. Likewise the addressee information may be similar in that the addressee information may also include the name of the addressee and the physical address (in a real-world location) of the sender. It should be noted that the sender may be from a different state or another country.

For example, such action may be performed by mailcenter staff at the scanner workstation determine the address-bearing face of the mail item. This may be required when the writing on the address-bearing face of the mail item is illegible or the shape of the package makes the package not feasible to be scanned by the image capture device. In an exemplary embodiment, the image capture device may simply capture images corresponding to every side of the package and let another device (e.g. image processing device) determine which captured image includes the address-bearing face. After obtaining the captured image(s) as a digital image, the mail item may be transported to the imprinter that marks (or prints) a mailpiece identifier which is a unique series of characters, letters, and/or numbers onto the mail item (S702). Next, the image capture device sends the digital image of the address-bearing face of the mail item to the image processing apparatus. Likewise, the imprinter may send the mailpiece identifier to the image processing apparatus.

Then, the image processing apparatus extracts sender and addressee information from the digital image (S703). The image processing apparatus may perform the extraction by, for example, performing optical character recognition (OCR) in which the image processing apparatus determines characters (e.g., letters, numbers, symbols, etc.) that are present on the digital image. Afterwards, the image processing apparatus determines the sender and addressee information by comparing the pattern of the characters to information in a database (e.g., customer database, third-party sites, etc.).

In an exemplary embodiment, in the case that the image processing apparatus receives one or more digital images (since the image captured device does not know which is the address-bearing face of the mail item), the image processing apparatus may also use OCR in determining which is address-bearing face. This can be accomplished, for example, by recognizing each character pattern in the digital image and comparing each recognized character pattern to information in a database to determine which character patterns are sender or addressee information and which character patterns are not sender or addressee information.

Further, the image processing apparatus may also generate metadata corresponding to the mail item. Metadata, may be, for example, data which describes data. In other words, metadata may not be displayed to the user when he or she opens a file but is accessed by other means (e.g., command-line interface) in order to view characteristics or properties of the file. For example, the primary purpose of an electronic newspaper article is to display the text of the article. Data describing the electronic newspaper article (e.g., date that the file was created, author, category, country of origin, etc.) may not be displayed with the text itself. To access the metadata describing the article, the user may, for example, use a command-line interface or a program on the operating system (OS) of the terminal to view the metadata describing the electronic newspaper article.

In this case, the metadata could be, for example, the time (hour, day, month, year, etc.) the mail item was received, the time that the digital image was captured, the size of the casing (e.g., package, envelope, etc.) of the mail item, the weight of the mail item, etc. Next, the image processing apparatus outputs the sender and addressee information, the metadata, and the digital image to the mail processing controller (S704). In response, the mail processing controller determines an electronic address of a customer who is associated with the addressee information (S705). For example, the addressee information may indicate that Henry Stephens is the intended receiver of the mail item. Further, Henry may have an electronic address henry.stephens@buckington.edu that is registered with a database (e.g., customer database) of the mailcenter. Thus, when the mail processing controller compares the addressee information with the information in the database, the mail processing controller may discover the electronic address of Henry.

After discovering the electronic address of the customer associated with the addressee information, the mail processing controller may then cause a mail notification apparatus to transmit a notification to the electronic address notifying the customer of arrival of the mail item (S706). Such notification may be, for example, an email to the customer informing him or her that a package (or envelope, postcard, etc.) has arrived. The notification may also include the mailpiece identifier and the digital image. The digital image provides the customer with the ability to determine what mail item was sent to him or her by viewing the sender information. For example, the customer may be able to determine from the sender information present from the digital image whether the mail item is expected or junk mail.

It should be noted that the capturing of the address-bearing face of the mail item, the marking of the mail item and the extraction of the sender and addressee information may be performed at a single location without the necessity to move or transport the mail item. In other words, the mail item may just be static while all of the aforementioned operations are performed. Afterwards, the scanner workstation may automatically retrieve a temporary storage bin to hold the mail item and mark the bin with the previously generated mailpiece identifier. Next, the scanner workstation may place the mail item into the temporary storage bin and send both the mail item and the bin to a location for storage (S707).

Figure 8:
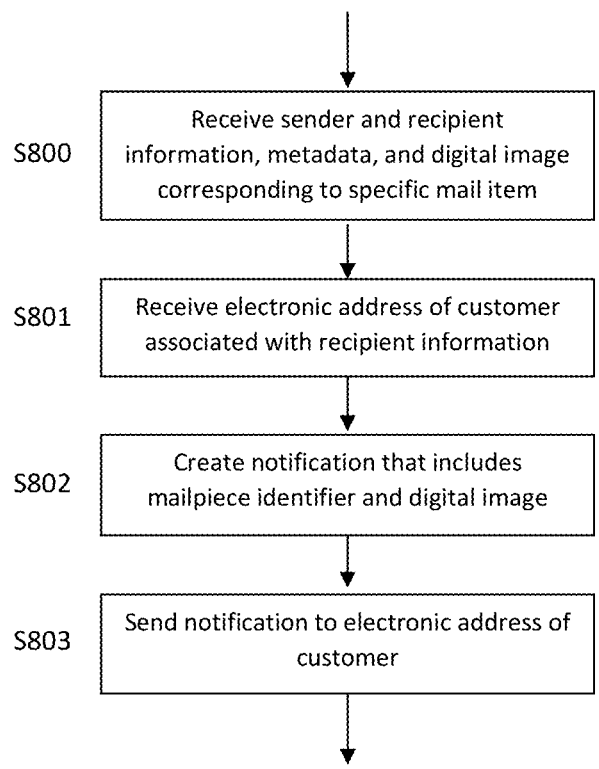
FIG. 8 shows a flow chart for a method that can be performed in any of the systems of FIGS. 1A-1C (or an equivalent)

FIG. 8 shows a method that can performed by a mail processing controller (e.g., 101 in FIG. 1A) according to an exemplary embodiment.

The mail notification apparatus receives sender and addressee information, metadata, and digital image from the scanner workstation (S800). Further, the mail notification apparatus may also receive an electronic address of a customer who is associated with the addressee information (S801). In response, the mail notification apparatus generates a notification that includes the mailpiece identifier and the digital image. The notification may, for example, be an email that includes a message indicating that there has been one or more mail items that have been received at the mailcenter. In one exemplary embodiment, the notification may also include a URL link to a web page that was created specifically for the mail item. Such webpage permits the customer to input instructions on how to process the mail item. In another exemplary embodiment, the notification may include one or more predetermined responsive instructions (e.g., open-and-scan-mailpiece, deliver mailpiece by hand, hold mailpiece for pickup, forward to a specified address, discard or destroy and treat as junk mail). After the notification is created, the mail notification apparatus sends the notification to the customer via the electronic address (S803).

Figure 9:
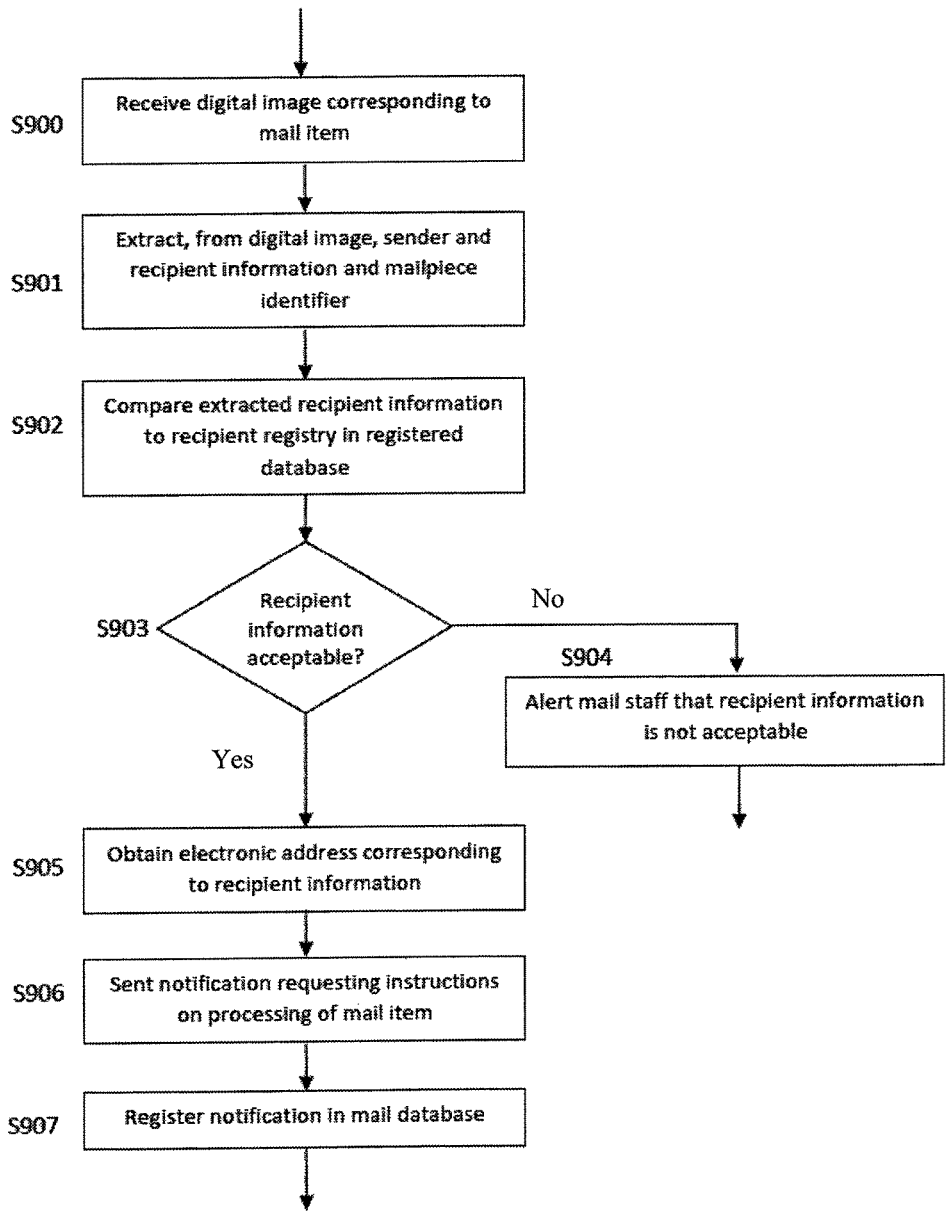
FIG. 9 shows a flow chart for a method that can be performed in any of the systems of FIGS. 1A-1C (or an equivalent)

FIG. 9 shows a method that can performed by a mail processing controller (e.g., 104 in FIG. 1A) according to an exemplary embodiment.

When a mail processing controller determines receives a digital image corresponding to a mail item (S900), the mail processing controller performs analysis on the digital image by extracting information from the digital image (S901). For example, the mail processing controller may perform character recognition (e.g., OCR) upon the digital image to recognize characters (e.g., letters, symbols, numbers, etc.) present in the digital image. After obtaining such characters, the mail processing controller may determine the sender and recipient information (e.g., names, department, title, physical address, etc.).

Once the mail processing controller determines the recipient information, the mail processing controller compares the recipient information to a recipient registry in a registered database to determine whether the recipient information is acceptable (S902). The recipient registry may include names and corresponding addresses of one or more customers. For example, the recipient information may be illegible (or impossible to extract from the digital image). Thus, such recipient information cannot be compared to data registered in the recipient registry. In another example, the physical address corresponding to the recipient information may be legible (and therefore extractable). However, the person corresponding to the recipient information may no longer be at that physical address. Thus, such recipient information may not be acceptable. In yet another example, the mail item may be undeliverable as addressed (UAA). In other words, the mail item may have sender information indicating that a person sent the mail item from mail facility. However, since the mail item could not be delivered, it was returned to the mail facility.

In the case that the mail processing controller determines that the recipient information is unacceptable (i.e. not acceptable) (S903, no), the mail processing controller alerts a mail staff to this issue by sending him or her a message (e.g., via email, SMS message, etc.) (S904). It may be that the mail staff knows which action to perform. For example, the recipient information on the mail item may be unreadable by a computer, but recognizable by a person. Thus, the mail staff may simply perform the portions of processing that the mail processing controller cannot (e.g., manually input recipient information into the records, etc.). In another example, the mail staff may discuss with other mail staff to determine which action to take in the case that he or she does not know why the mail processing controller rejected the recipient information.

On the other hand, in the case that the recipient information is acceptable (S903, yes), the mail processing controller determines the electronic address (e.g., email) of the customer associated with the addressee information (S905). Next, the mail processing controller sends a notification to the electronic address that (i) mail item has been received at the mail facility and (ii) request for instructions on processing the mail item (S906). Afterwards, the mail processing controller registers the notification sent to the customer in a mail database (S907). By registering the notification, a records is kept so that when issues (e.g., notification lost, notification never sent out, notification deleted by customer accidentally, etc.) occur, the notification can be retrieved for analysis or for resending.

Figure 10:
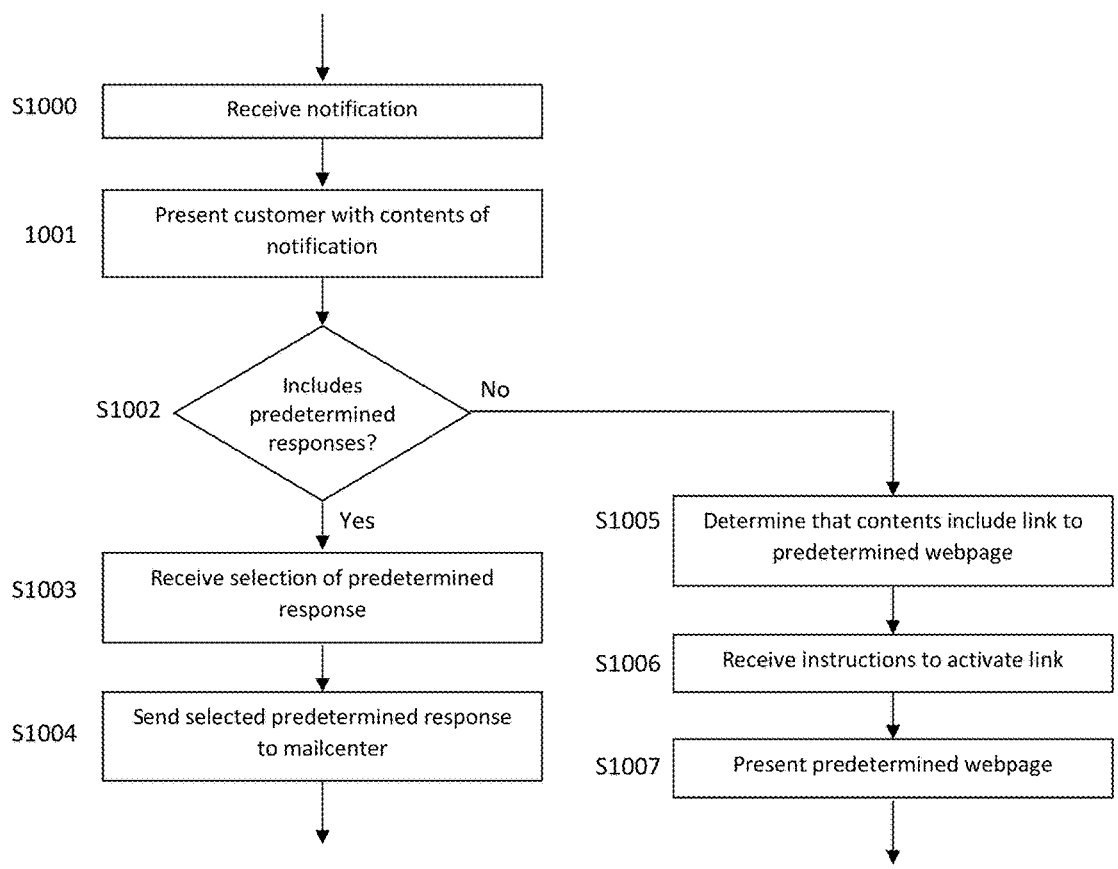
FIG. 10 shows a flow chart for a method that can be performed in any of the systems of FIGS. 1A-1C (or an equivalent)

FIG. 10 shows a method that can performed by a terminal (e.g., 105 in FIG. 1A) according to an exemplary embodiment.

Figure 11A:
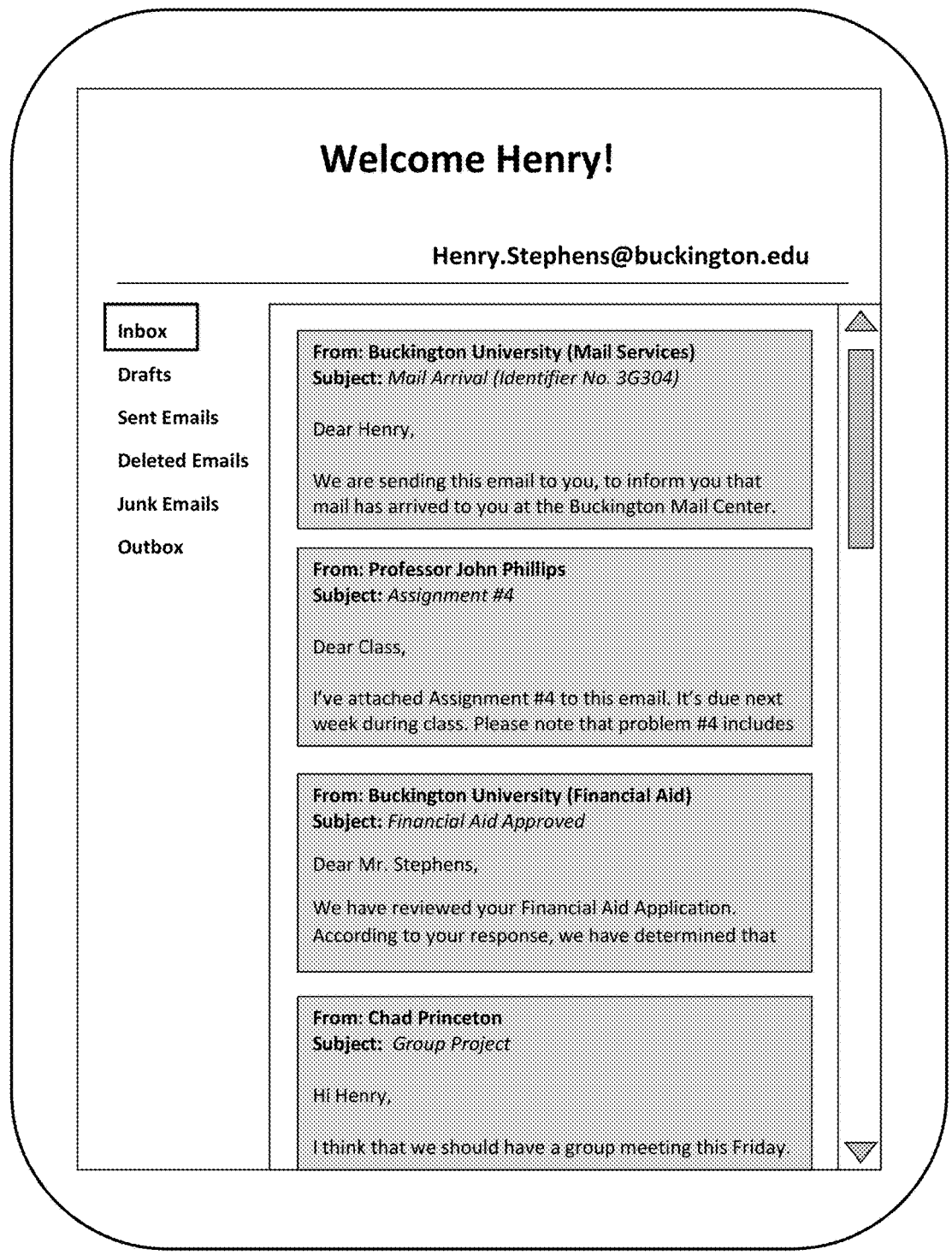
FIGS. 11A-11F show examples of electronic notifications that can be sent in any of the systems of FIGS. 1A-1C (or an equivalent)

After the mail notification apparatus sends instructions to one or more customers via, for example, an electronic address of the customer, one of the customer's terminal (e.g., tablet, personal computer, smartphone, etc.) may receive such notification (S1000). Such notification may be presented to the customer via an application on the terminal (S1001). For example, the application may be software that is installed on the customer's terminal that opens up emails for the customer to view, such as shown in FIG. 11A.

The notification may include a request by the mailcenter for instructions on processing the mail item associated with the unique identifier. For example, the instructions may be in the form of predetermined responses that are embedded into the notification. In such case, the customer may simply activate the predetermine response which causes a message associated with the predetermined response to automatically be sent to the mailcenter. In another example, the notification may include a link to a predetermined (pre-generated) webpage at a website maintained (or utilized) by the mailcenter. Such webpage may allow a customer to manually input a message on how he or she wants processing to be performed on the mail item.

Figure 11B:
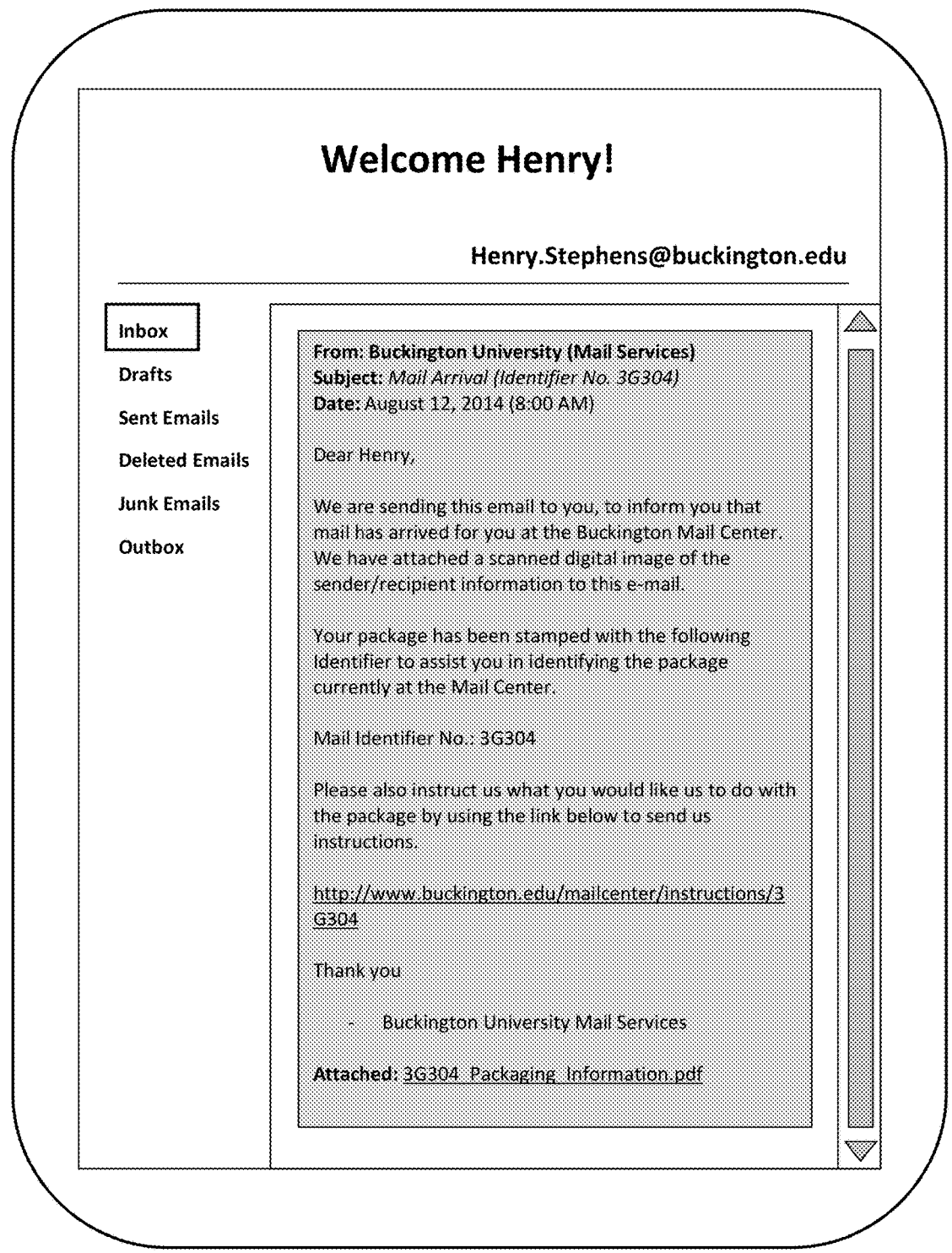

In the case that the notification includes predetermined responsive instructions (S1002, no), the terminal may determine that the contents include link to predetermined webpage (S1005). For example, the notification may be in the form of an email, such as shown in FIG. 11B, that includes a URL link to a webpage generated by the mailcenter. As indicated in the email, such link provides the means for directing the mailcenter on how to process the mail item.

Figure 11C:
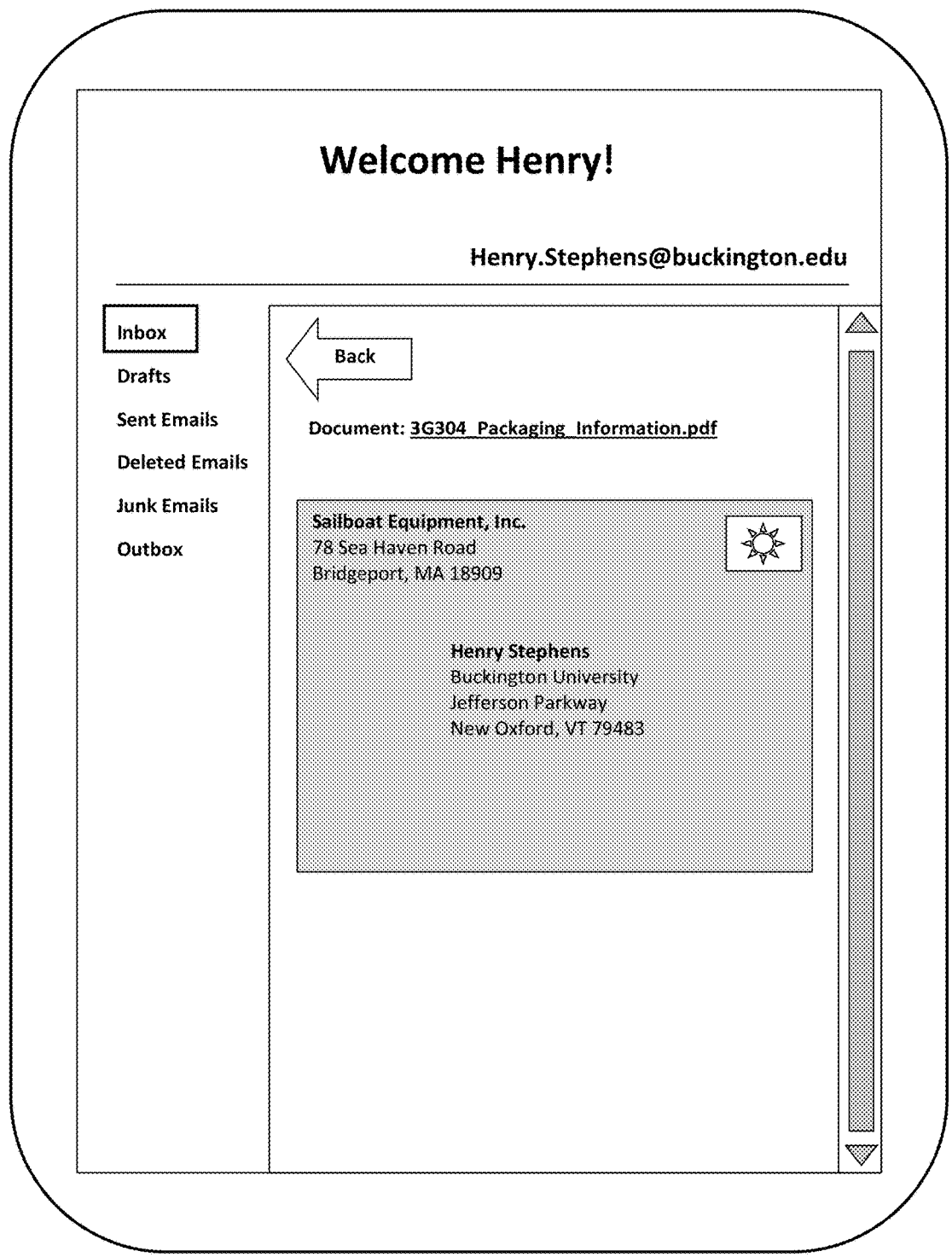

In an exemplary embodiment, the notification may also include a digital image corresponding to the mail item attached as a document (e.g., pdf, GIF, png, etc.) that can be viewed, such as shown in FIG. 11C. Such image shows who sent the mail item, and consequently the mail service customer may have a better determination of what kind of action is to be taken (e.g., destroy package, receive package, forward package to another address, etc.).

Figure 11D:
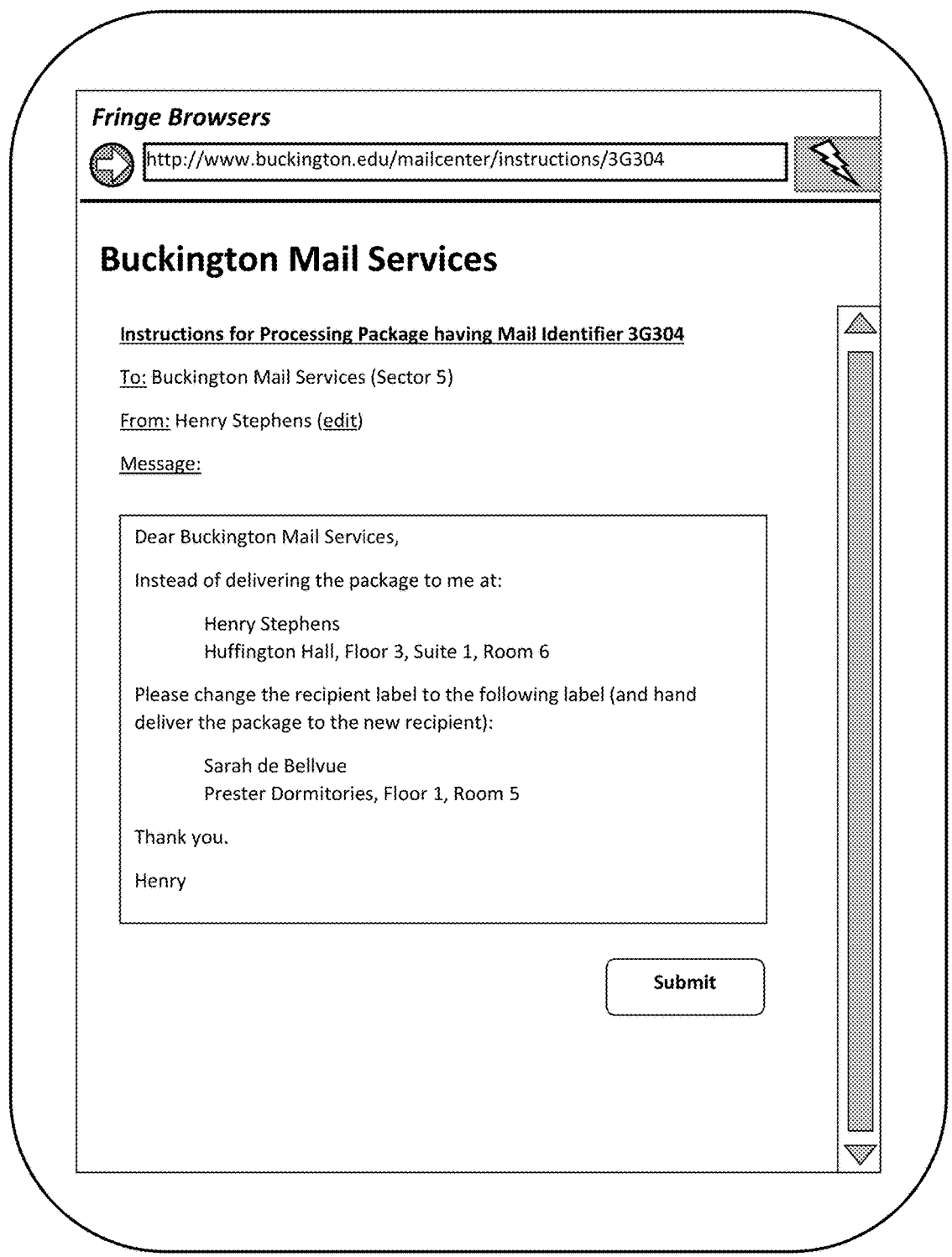

Thus, the terminal may receive instructions from the customer to activate the link in the notification (S1006) which causes the terminal to present a predetermined webpage to the customer (S1007). In an exemplary embodiment, the predetermined webpage may be automatically generated every time a mail item is received at the mailcenter. Further, such predetermined webpage may include ways for the customer to input his or her instructions. For example, the instruction may include a message to forward the package to a classmate (Sarah de Bellvue, in the example shown in FIG. 11D,).

Figure 11E:
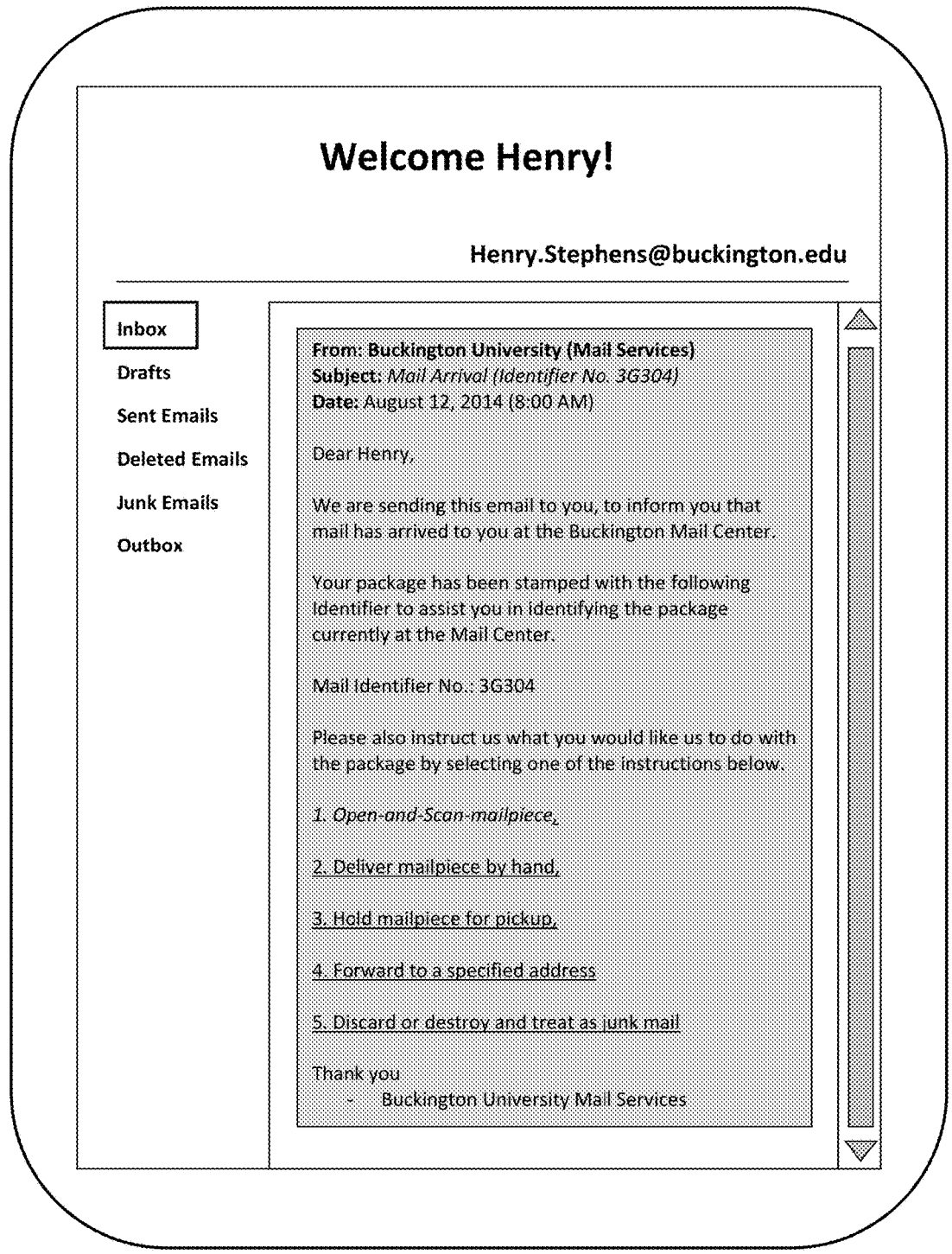

On the other hand, in the case that the notification includes predetermined responsive instructions (S1002, yes), the terminal may receive a selection of one of the predetermined responsive instructions (S1003). For example, there may be a variety of predetermined responsive instructions (e.g., open-and-scan-mailpiece, deliver mailpiece by hand, hold mailpiece for pickup, forward to a specified address, discard or destroy and treat as junk mail, etc.), such as shown in FIG. 11E. In an exemplary embodiment, the customer may not have the option of selecting all of the predetermined responsive instructions. In other words, a special circumstance may prevent selection of one of the options. For example, in this case, the package may not contain any documents at all. Instead, the package may only include some purchased items that are not suitable for scanning. Thus, the "open-and-scan-mailpiece" option may not be available. As such, to indicate that this option is not available, the option is unselectable and may include characteristics (e.g., italicized, different font, etc.) to point this out.

Figure 11F:
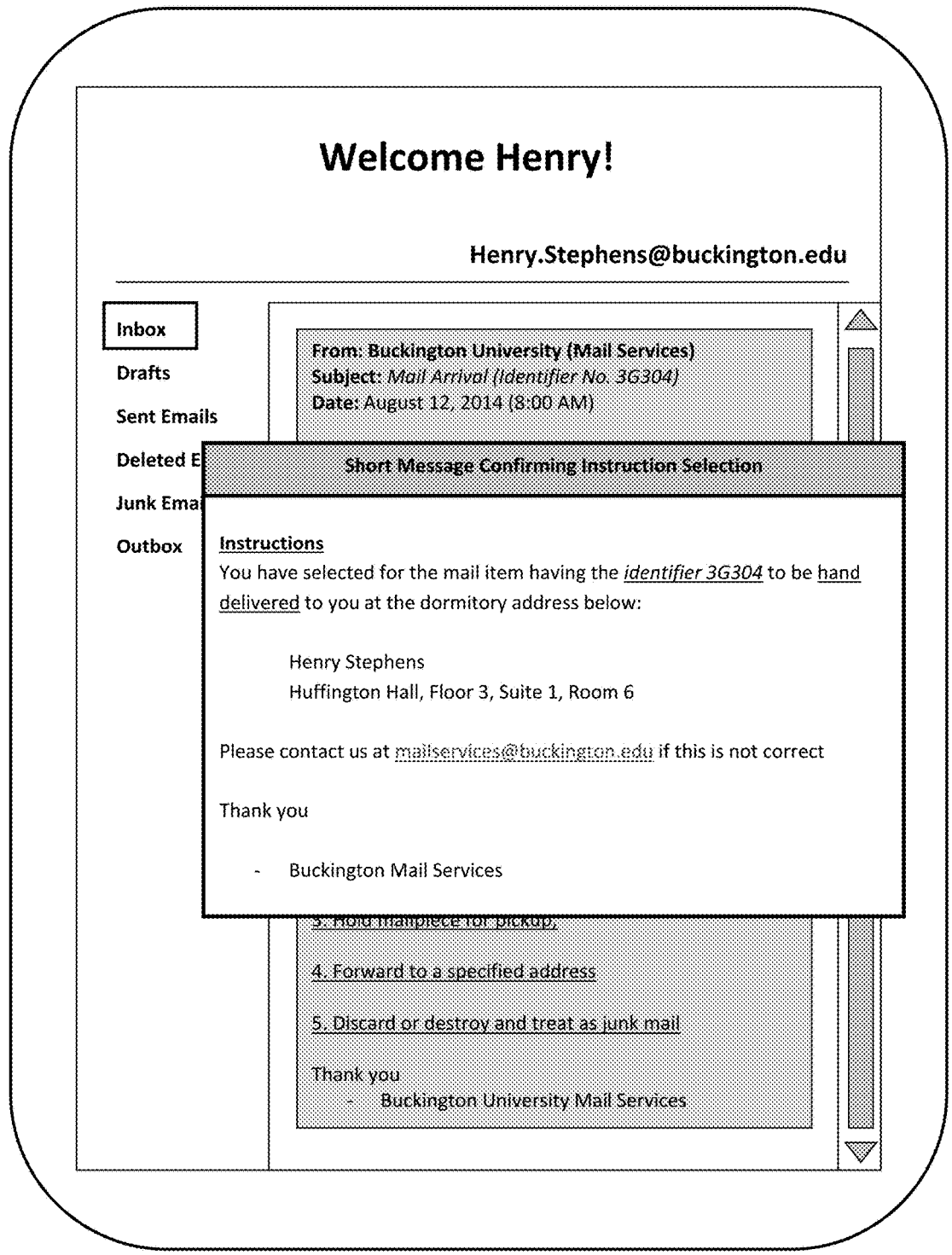

The customer may simply select the predetermined responsive instructions by activating the corresponding link (e.g., open-and-scan-mailpiece, deliver mailpiece by hand, hold mailpiece for pickup, forward to a specified address, discard or destroy and treat as junk mail, etc.). For example, the mail service customer may select the predetermined responsive instruction to hand the mailpiece to dormitory staff instead. After selecting the corresponding predetermined responsive instruction for hand-delivery, a message may automatically be presented to the customer confirming the selection of the predetermined responsive instruction as well as other relevant information, such as shown in FIG. 11F. After receiving the selected predetermined response, the terminal sends the selected predetermined response to the mailcenter for processing (S1004).

Figure 12:
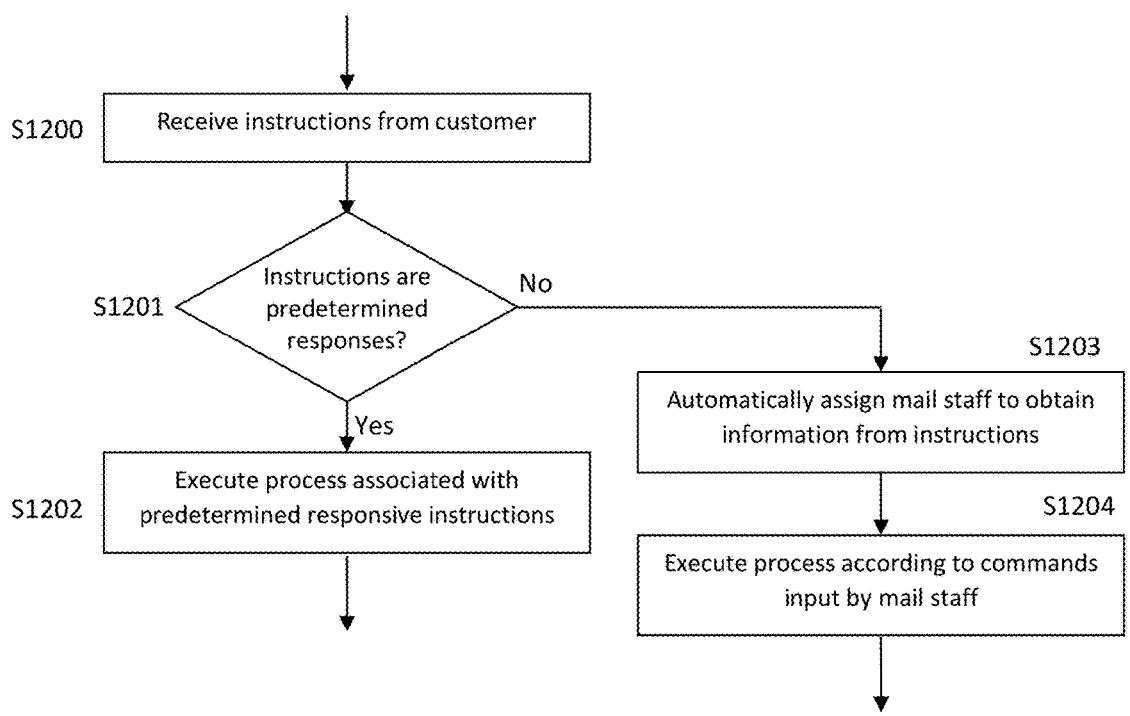
FIG. 12 shows a flow chart for a method that can be performed in any of the systems of FIGS. 1A-1C (or an equivalent)

FIG. 12 shows a method that can performed by a mail processing controller (e.g., 104 in FIG. 1A) according to an exemplary embodiment.

After receiving instructions from the customer via a webpage or predetermined responsive instructions (S1200), the mail processing controller determines how the instructions were sent. In other words, the mail processing controller determines whether the instructions were manually written (or typed) by a customer or were generated from the predetermined responsive instructions. In the case that the instructions are not predetermined responsive instructions (S1201, no), the mail processing controller automatically assigns a particular mail staff to obtain information from the instructions sent by the customer (S1203). In this case, for example, the instructions sent by the customer may have been manually typed in a format that is only understood by people (and not machines). Thus, the particular mail staff may read the instructions sent by the customer and input the instructions as corresponding commands that can be understood by the mail processing controller. After receiving such commands, the mail processing controller executes a process corresponding to the commands (S1204). On the other hand, in the case that the instructions are predetermined responsive instructions (S1201, yes), the mail processing controller executes a process associated with the predetermined responsive instructions (S1102).

Figure 13:
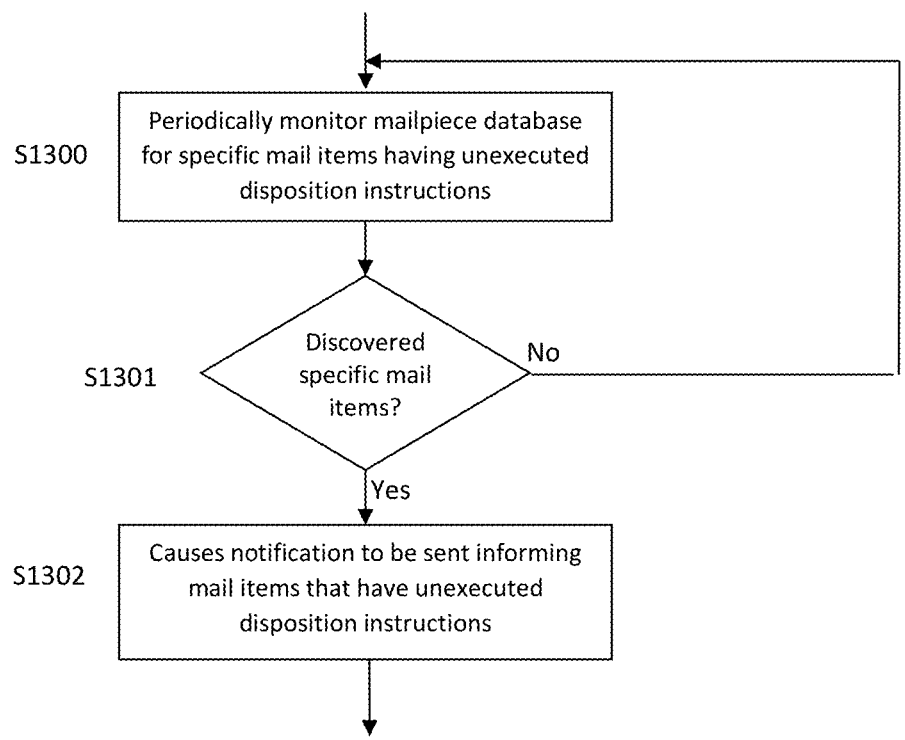
FIG. 13 shows a flow chart for a method that can be performed in any of the systems of FIGS. 1A-1C (or an equivalent)

FIG. 13 shows a method that can performed by a mail processing controller (e.g., 104 in FIG. 1A) according to an exemplary embodiment.

In certain cases there may be large amounts of incoming mail into the mailcenter. As a result, it may be difficult for the mailcenter to handle such large amount of mail. It may be possible that instructions sent from the intended addressees on processing the associated mail item may not be executed. To prevent such issues from occurring, the mail processing controller periodically monitors a mailpiece database (e.g., 105 in FIG. 1B) to determine if any specific mail items have corresponding instructions that have not yet been executed (S1301). In the case that the mail processing controller discovers one or more specific mail items that have unexecuted disposition instructions (S1301, yes), the mail processing controller causes a notification to be sent informing mail items that have unexecuted disposition instructions (S1302). For example, the notification may in the form of an alert (or email, SMS message, etc.) that is sent to a terminal (e.g., tablet, smartphone, computer, etc.) of the respective mailcenter staff who is responsible for the mail item. Otherwise, in the case that there is no one or more specific mail items that have unexecuted disposition instructions (S1301, no), the mail processing controller continues to perform periodic monitoring.

Figure 14:
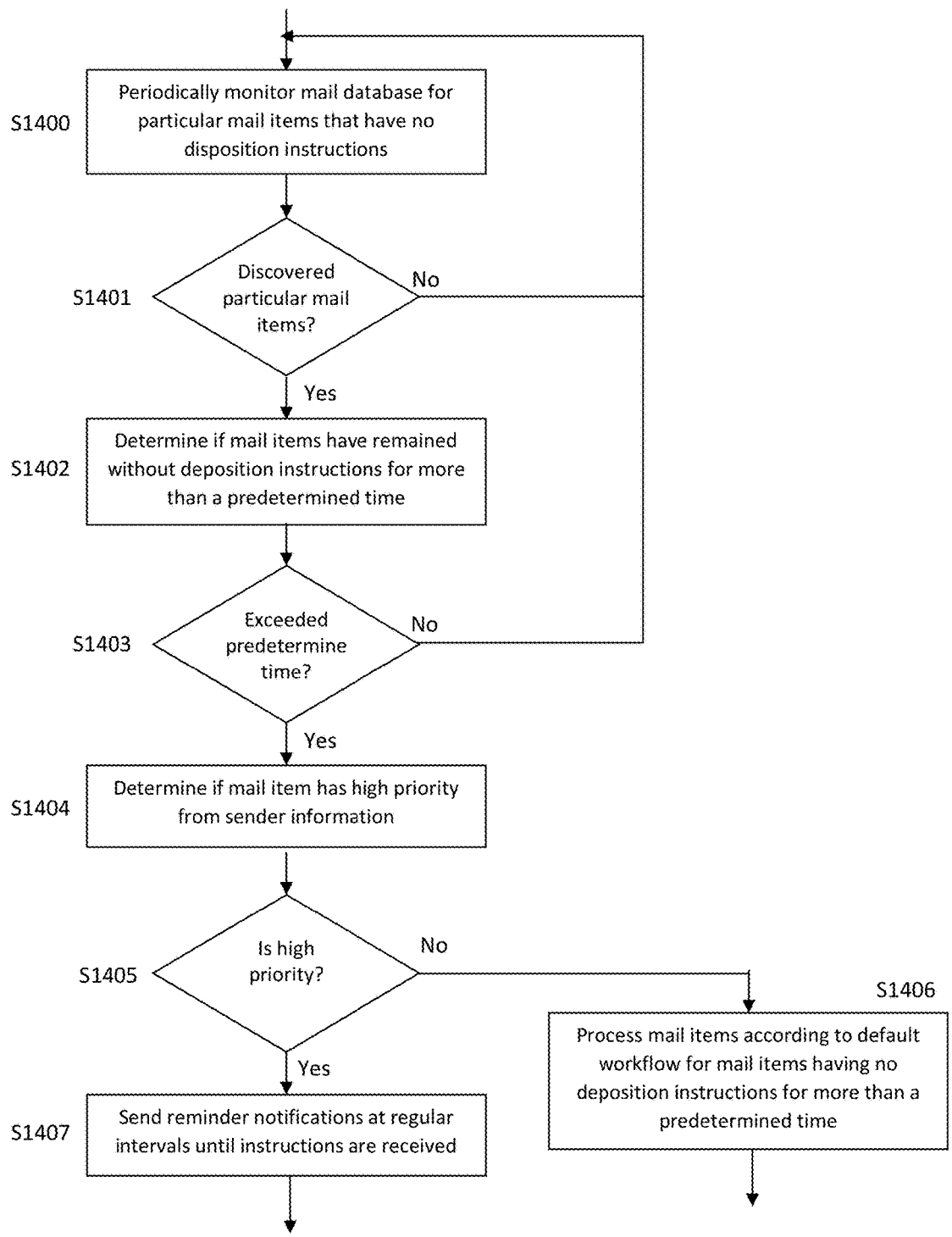
FIG. 14 shows a flow chart for a method that can be performed in any of the systems of FIGS. 1A-1C (or an equivalent)

FIG. 14 shows a method that can be performed by a mail processing controller (e.g., 104 in FIG. 1A) according to an exemplary embodiment.

Not every customer has the time or the concern to send instructions on processing one or more mail items intended for the customer. Further, not every customer remembers that he or she needs to send instructions. Thus, it is possible that within the mailcenter, there may be one or more mail items that have no processing instructions.

Accordingly, the mail processing controller can periodically monitor the mailpiece database for particular mail items that have no disposition instructions (S1400). In the case that all the particular mail items have disposition instructions (S1401, no), the mail processing controller goes back to monitoring. Otherwise (S1401, yes), in the case that one or more of the particular mail items have no disposition instructions, the mail processing controller determines if the particular mail items have remained without deposition instructions for more than a predetermined time (S1402).

The predetermined amount of time (e.g., minutes, hours, days, weeks, months, years, etc.) may be preset by authorized mailcenter staff. In one exemplary embodiment, each particular mail item may have a different predetermined time set by the mail processing controller. This may be determined by the sender information or the size of the package. For example, in the case that the sender is determined to be from an important government agency (e.g., Internal Revenue Service), the predetermined time may be set longer (e.g., month). On the other hand, in the case that the sender is determined to be from a retailer (e.g., Walmart), the predetermined time may be shorter (e.g., a week).

In the case that, for each mail item that has no disposition instructions, the predetermined time for at least one mail that has no disposition instructions has not been exceeded (S1403, no), the mail processing controller goes back to monitoring. On the other hand, in the case that, for each mail item that has no disposition instructions, the predetermined time for at least one mail that has no disposition instructions has been exceeded (S1403, yes), the mail processing controller processes the mail items according to default workflow (S1404). The default workflow is set by the mailcenter. In other words, the default workflow is an action or series of action that are to be taken with regard to a mail item that has no disposition instructions for more than a predetermined period of time. For example such actions may include destroying the mail item, moving the mail item to a warehouse, hand delivering the mail item to the intended addressee, a combination of the aforementioned actions, etc. By having this default workflow, it is possible to eliminate any space issues within the mailcenter.

Figure 15:
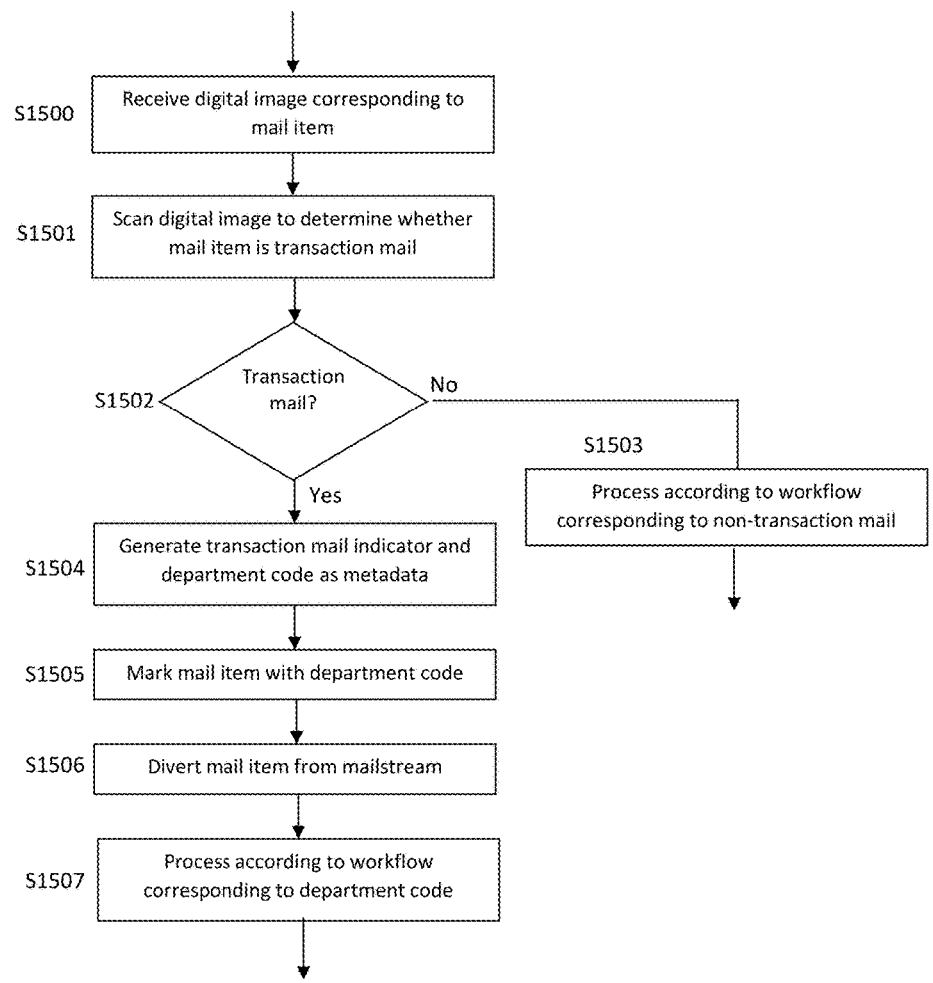
FIG. 15 shows a flow chart for a method that can be performed in any of the systems of FIGS. 1A-1C (or an equivalent)

FIG. 15 shows a method that can performed by an image processing apparatus (e.g., 103 in FIG. 1A) according to an exemplary embodiment.

Figure 16A:
FIG. 16A-16B show examples of pieces of mail.

After the image processing apparatus of the scanner workstation receives a digital image corresponding to a mail item (S1500), the image processing device scans the digital image to determine whether such mail item is transaction mail (S1501). Transaction mail may be any type of mail that includes Accounts Payable, Accounts Receivable, Claims, Human Resources, Remittance, etc. There may be a number of different ways by which the image processing apparatus determines whether the mail item is transaction mail or not. For example, FIG. 16A shows an example of transaction mail, and the image processing apparatus may determine from a logo on the mail item (e.g., IB for International Bank) or a barcode (signifying that this is transaction mail) placed by the sender, that such mail item is transaction mail.

Figure 16B:

In the case that the image processing apparatus determines that the mail item is not transaction mail (S1502, no), the mail item is processed according to a workflow corresponding to mail items that are not transaction mail (S1503). On the other hand, in the case that the image processing apparatus determines that the mail item is transactional mail (S1502, yes), the image processing apparatus generates a transaction mail indicator (to indicate that the mail item is transaction mail) and a department code (to indicate which department in the mailcenter is to be processed at and how the mail item is to be processed at such department) as metadata (S1504). Next, the imprinter prints (or marks, stamps, inscribe, label, etc.) the department code physically on the casing of the mail item (S1505), such as shown in FIG. 16B. Next, the mail processing controller causes the diverter to divert the mail item from the mailstream (S1506). Next, processing is performed on the mail item according to a predetermined workflow corresponding to the department code (S1507).

Figure 17:
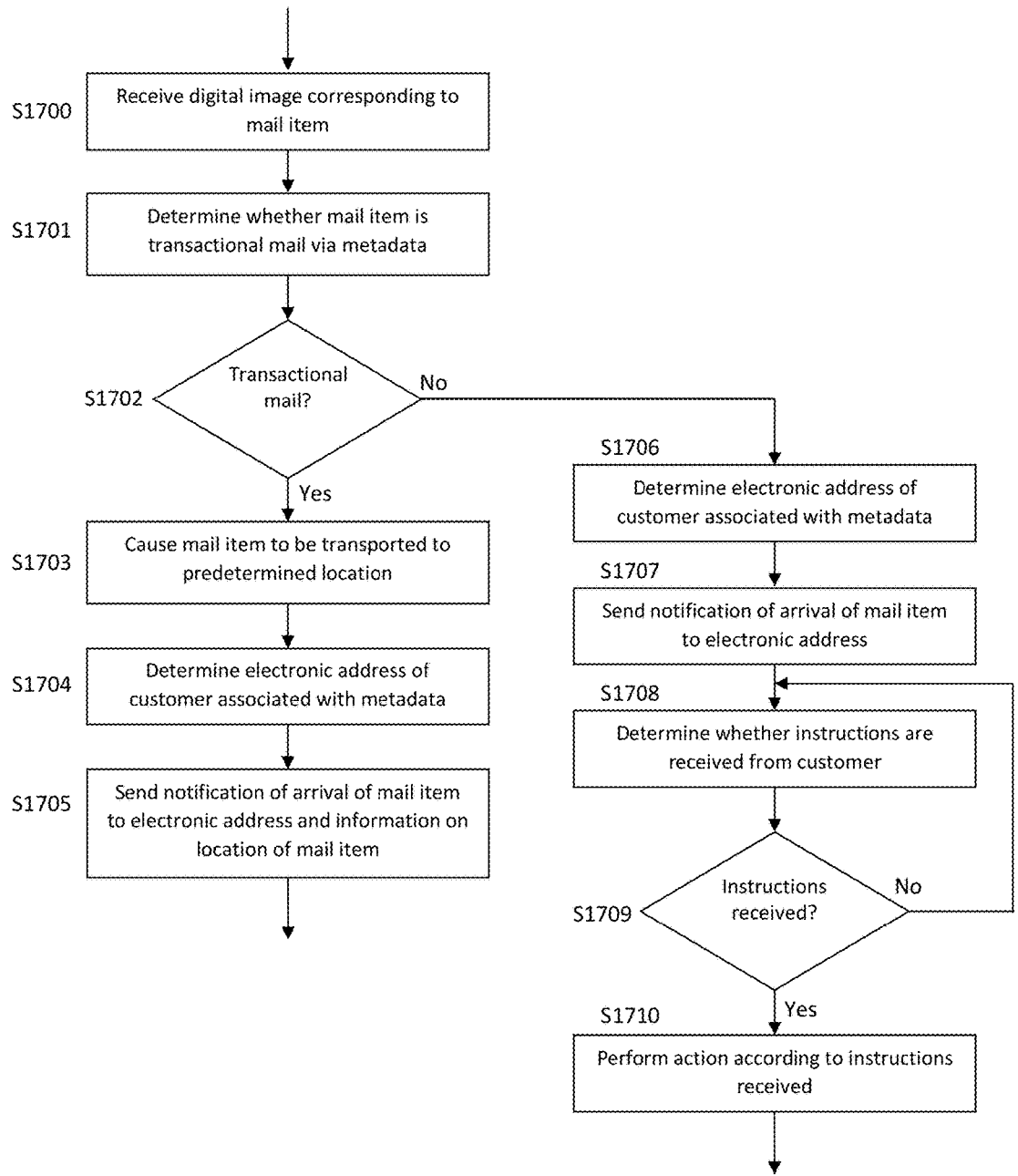
FIG. 17 shows a flow chart for a method that can be performed in any of the systems of FIGS. 1A-1C (or an equivalent)

FIG. 17 shows a method that can performed by a mail processing controller (e.g., 104 in FIG. 1) according to an exemplary embodiment.

When the mail processing controller receives a digital image corresponding to an address-bearing face of the mail item (or piece of mail) (S1700), the mail processing controller determines whether the mail item is transactional mail via the metadata corresponding to the mail item (S1701). Transactional mail may include accounts payable, accounts receivable, claims, human resources, remittance, etc. The metadata may include a mailpiece identifier that is uniquely assigned by the mail processing controller to the mail item, sender information and addressee information.

For example, the addressee information of the mail item may include other information in addition to the name of the recipient and the corresponding physical address. The addressee information may include the person's title (e.g., human resource manager, accountant, finance director, etc.) or a department (e.g., human resources, accounting, legal, finance, etc.). Thus, by recognizing the aforementioned keywords (e.g., human resource manager, accounting, legal, finance director, etc.) present in the addressee information, the mail processing controller may determine that such mail item is transactional mail. In another example, mail processing controller may determine that the lack of such keywords may indicate that the mail item is not transactional mail.

In the case that the mail item is transactional mail (S1702, yes), the mail processing controller causes the mail item to be sent (i.e. transported) to a predetermined location (S1703). For example, the transactional mail item may include sensitive information (e.g., social security numbers, tax information, account balances, salary information, finances, etc.). As a result, it may be best to transport the transactional mail item to a location that is more secure (separate from the other non-transactional mail items). In another example, the transactional mail item may include time-sensitive information. Thus, the mail processing controller may send all transactional mail items to a location in which mail processing and delivery is performed quicker (i.e. expediting).

Further, in an exemplary embodiment, the transactional mail item may be sent to the predetermined location without (and regardless) of any instructions from the customer corresponding to the addressee information. In other words, once a particular mail item has arrived at the mail facility and the mail processing controller determines that the particular mail item is transactional mail, the mail processing controller immediately causes the particular mail item to be transported to a predetermined location (e.g., safer storage facility, expedited mail center, etc.) without notifying the customer associated with the addressee information that such particular mail item has been sent to the predetermined location.

After causing the transactional mail item to be transported to the predetermined location, the mail processing controller determines the electronic address (e.g., email) of the customer associated with the addressee information (S1704). Next, the mail processing controller creates a notification which notifies the customer that a transactional mail item has been received at the mail facility (S1705). In the notification, the mail processing controller also informs the customer the location at which the transactional mail item is currently disposed at. In one exemplary embodiment, the mail processing controller may not include any requests for instructions in the notification. This may be because, it is safer to have the customer pick up the transactional mail item at the predetermined location than to, for example, hand-deliver it.

On the other hand, in the case that the mail item is not transactional (S1702, no), the mail processing controller determines the electronic address (e.g., email) of the customer associated with the addressee information (S1706). Next, the mail processing controller sends a notification to the electronic address that (i) mail item has been received at the mail facility and (ii) request for instructions on processing the mail item (S1707). Then the mail processing controller determines whether instructions are received from client (S1708). In the case that no instructions are received (S1709, no), the process repeats. On the other hand, in the case that the mail processing controller has received instructions from the customer (S1709, yes), the mail processing controller causes actions to be performed according to the instructions received (S1710).

Figure 18:
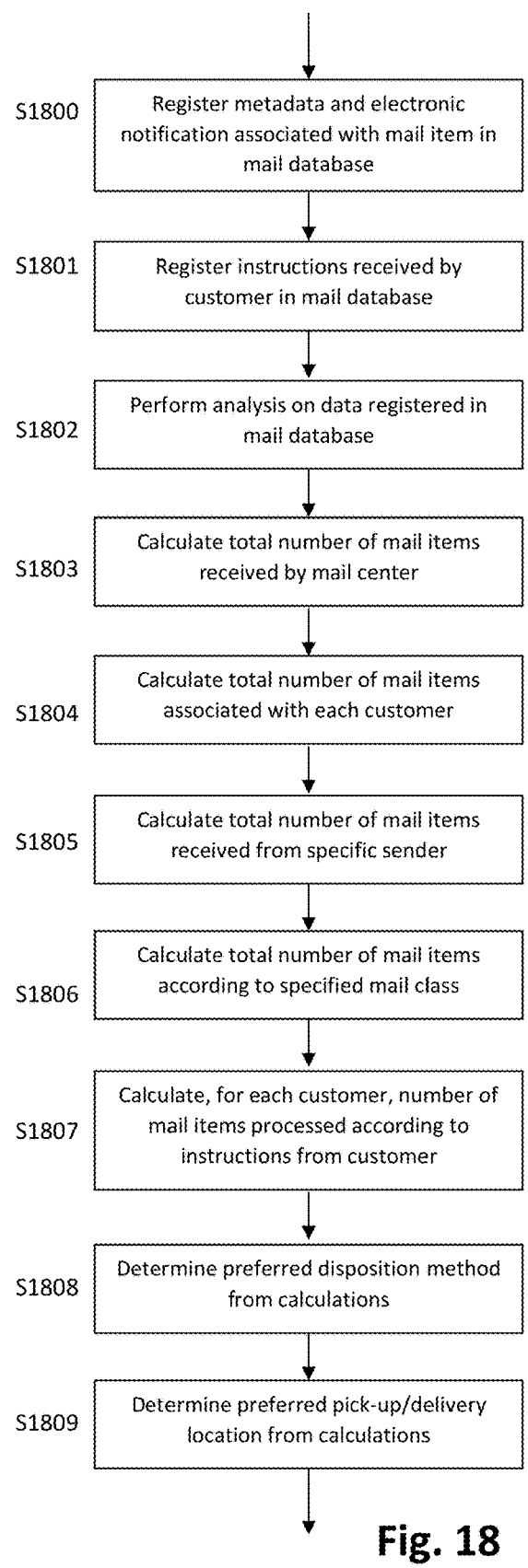
FIG. 18 shows a flow chart for a method that can be performed in any of the systems of FIGS. 1A-1C (or an equivalent)

FIG. 18 shows a method that can performed by a mail processing controller (e.g., 104 in FIG. 1A) according to an exemplary embodiment.

Whenever the mail facility receives one or more mail items, the mail processing controller may perform processing (e.g., extract metadata, send an electronic notification to a customer notifying arrival of the mail item, etc.) on the mail item. After processing is performed, the mail processing controller may register data corresponding to the processing performed in the mail database (S1800). For example, once the mail processing controller extracts metadata [e.g., sender/recipient information, time/date of mail arrival at mail facility, physical characteristics of mail item (e.g., size, weight, color, etc.)], etc.) from the mail item, the mail processing controller registers the metadata in the mail database. Likewise, when the mail processing controller receives instructions from the user in response to an electronic notification sent previously by the mail processing controller, the mail processing controller registers the instructions in the mail database (S1801).

At regular intervals (e.g., minutes, hours, days, weeks, years, etc.) or at non-regular intervals (e.g., when processing mail item for a specified customer, etc.), the mail processing controller may automatically perform an analysis to obtain metrics related to data in the mail database (S1802). The analysis may include calculating, for a specific time period (e.g., minutes, hours, days, weeks, years, etc.), (i) total number of mail items received by the mail center (S1803), (ii) total number of mail items associated with each customer (S1804), (iii) total number of mail items received from specific sender (S1805), (iv) total number of mail items according to specified mail class (S1806). In addition, the mail processing controller may also calculate, for each customer, number of mail items processed according to instructions from customer (S1807). In other words, the mail processing controller may calculate how many mail items (a) have received instructions from the customer for processing and (ii) have been processed according to such instructions.

After performing the calculations, the mail processing controller may determine a preferred disposition method (S1808). The preferred disposition method is the preferred method of processing a mail item for a specific user. For example, it may be that a certain customer may frequently give instructions to destroy mail items from a certain company because such customer considers them spam. Next, the mail processing controller determines a preferred pick-up location and a preferred delivery location (S1809). The preferred pick-up location may be the location that the customer prefers when picking up the mail item. The preferred delivery location is the location that the customer prefers for mail to be delivered at. For example, the customer may prefer for mail items directed to him or her to be sent to his or her office rather than his or her home.

Figure 19:
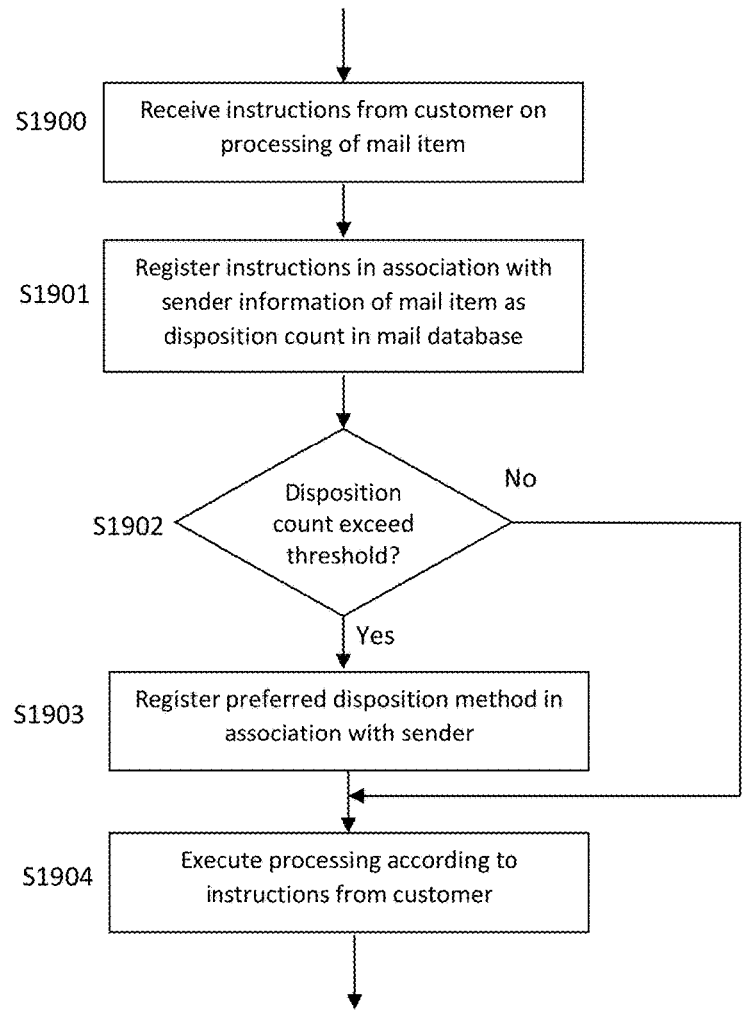
FIG. 19 shows a flow chart for a method that can be performed in any of the systems of FIGS. 1A-1C (or an equivalent)

FIG. 19 shows a method that can performed by a mail processing controller (e.g., 104 in FIG. 1) according to an exemplary embodiment.

After receiving instructions from a specific customer on processing mail item associated with the customer (S1900), the mail processing controller registers the instructions in association with sender information of the mail item as disposition count in mail database (S1901). It may be that the specific customer usually performs a certain action with regards to a mail item from a certain center. Thus, the mail processing controller may register a disposition count corresponding to each sender and recipient and instruction.

After registering the disposition count, the mail processing controller may determine whether the disposition count exceeds a disposition count threshold (S1902). The disposition count threshold may be a predetermined number set by mail staff at the mail facility. In an exemplary embodiment, the disposition count threshold may be different for each sender. For example, the disposition count may be lower for senders originating from advertisement companies, while the disposition count may be higher for senders originating from any government office or agency.

In the case that the disposition count exceeds the disposition count threshold (S1902, yes), the mail processing controller registers a preferred disposition method in association with sender (S1903). The preferred disposition method is the preferred course of action that a customer has taken with respect to a mail item from a specific sender. Afterwards, and in the case that the disposition count does not exceed a disposition threshold (S1902, no), the mail processing controller executes processing on the mail item according to the instructions by the customer (S1904).

Figure 20:
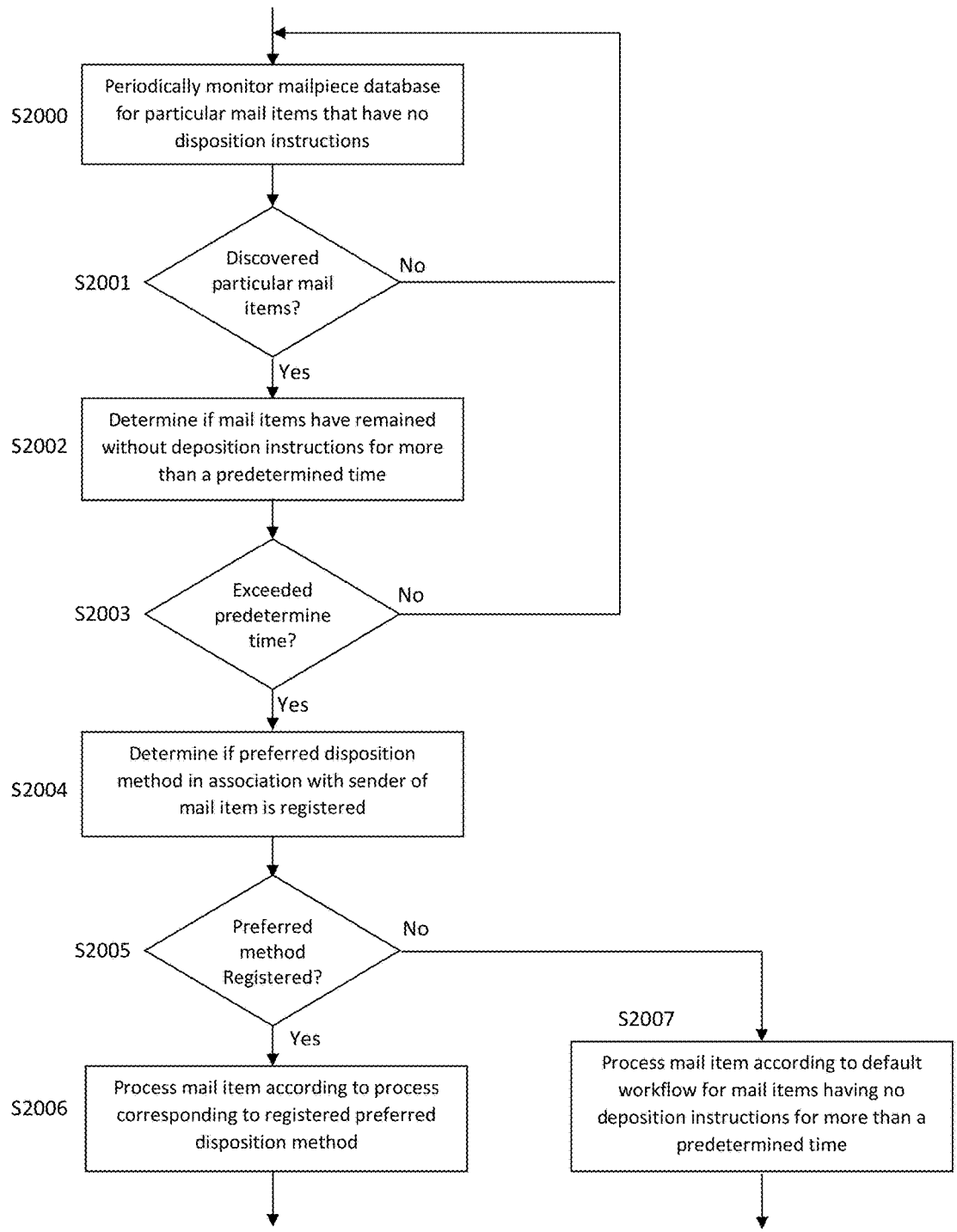
FIG. 20 shows a flow chart for a method that can be performed in any of the systems of FIGS. 1A-1C (or an equivalent)

FIG. 20 shows a method that can performed by a mail processing controller (e.g., 104 in FIG. 1A) according to an exemplary embodiment.

The mail processing controller periodically monitors the mailpiece database for particular mail items that have no disposition instructions (S2000). In the case that all the particular mail items have disposition instructions (S2001, no), the mail processing controller goes back to monitoring. Otherwise (S2001, yes), in the case that one or more of the particular mail items have no disposition instructions, the mail processing controller determines if the particular mail items have remained without deposition instructions for more than a predetermined time (S2002).

In the case that, for each mail item that has no disposition instructions, the predetermined time for at least one mail that has no disposition instructions has not been exceeded (S2003, no), the mail processing controller goes back to monitoring. On the other hand, in the case that, for each mail item that has no disposition instructions, the predetermined time for at least one mail that has no disposition instructions has been exceeded (S2003, yes), the mail processing controller determines whether there is a preferred disposition method associated with the customer and sender (S2004).

In the case that there is (S2005, yes), the mail processing controller processes the mail item according to a process corresponding to the registered preferred disposition method (S2006). By performing processing according to a preferred disposition method, the mail facility does not have to store the mail item at a particular location for an indefinite period of time simply because the mail facility has not received instructions for processing the mail item. Instead, the mail facility can perform processing on the mail item with a greater chance that the processing taken is in line with the wishes of the customer.

On the other hand, in the case that there has been no preferred disposition method registered (S2005, no), the mail items are processed according to a default workflow (S2007). The default workflow may be set by an authorized mail staff at the mail facility. The default workflow is an action or series of action that are to be taken with regard to a mail item that has no disposition instructions for more than a predetermined period of time. For example such actions may include destroying the mail item, moving the mail item to a warehouse, hand delivering the mail item to the intended recipient, a combination of the aforementioned actions, etc. By having this default workflow, it is possible to eliminate any space issues within the mail facility.

Figure 21:
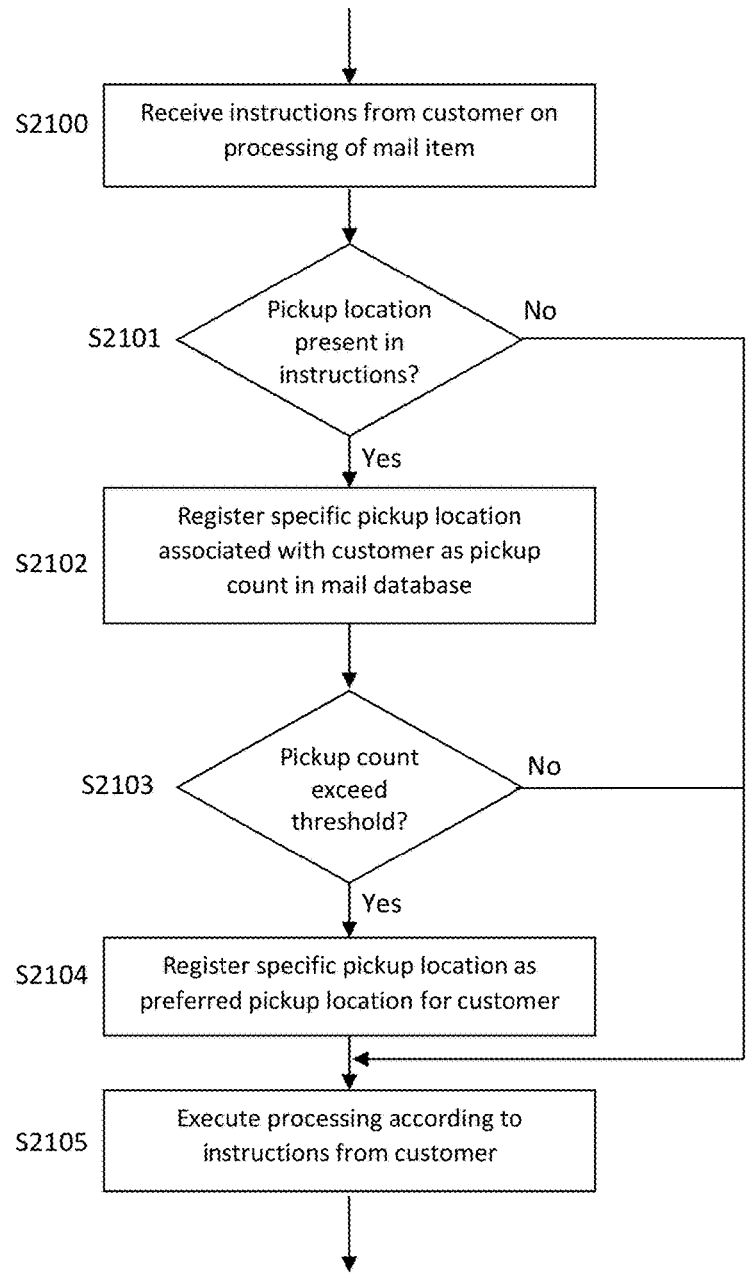
FIG. 21 shows a flow chart for a method that can be performed in any of the systems of FIGS. 1A-1C (or an equivalent)

FIG. 21 shows a method that can performed by a mail processing controller (e.g., 104 in FIG. 1A) according to an exemplary embodiment.

After receiving instructions from a specific customer on processing mail item associated with the customer (S2100), the mail processing controller determines whether the instructions specify that the customer is going to pick up the mail item at a specific location (S2101). In the case that the instructions do specify a pick up location (S2101, yes), the mail processing controller registers the specific pickup location associated with the customer as pickup count in a mail database (S2102). In other words, for every site that the customer specifies as a pickup location, the mail processing controller registers that specific site (associated with the customer) as pickup count.

Next, the mail processing controller determines whether the pickup count exceeds a predetermined pickup count threshold (S2103). In one exemplary embodiment, the pickup count threshold may be determined by mail staff at the mail facility. In another exemplary embodiment, the pickup count may be determined by the mail processing controller. In this case, the mail processing controller may determine the pickup count based on analysis of metrics (e.g., frequency of use of pickup location by other customers, etc.) gathered in the various databases. In another example, the pickup count threshold may be lower for locations frequented by other customers as compared to a pickup count threshold for locations that are remote or unfrequented.

In the case that the pickup count exceeds the predetermined pickup count threshold (S2103, yes), the mail processing controller registers specific pickup location as a preferred pickup location for customer (S2104). In other words, the preferred pickup location is the location that is used most by the customer or the location that was recently used most by the customer. Next [or in the case that the instructions do not specify a pickup location (S2101, no), or the pickup count does not exceed the threshold (S2103, no)], the mail processing controller executes processing according to instructions from customer (S2105).

Figure 22:
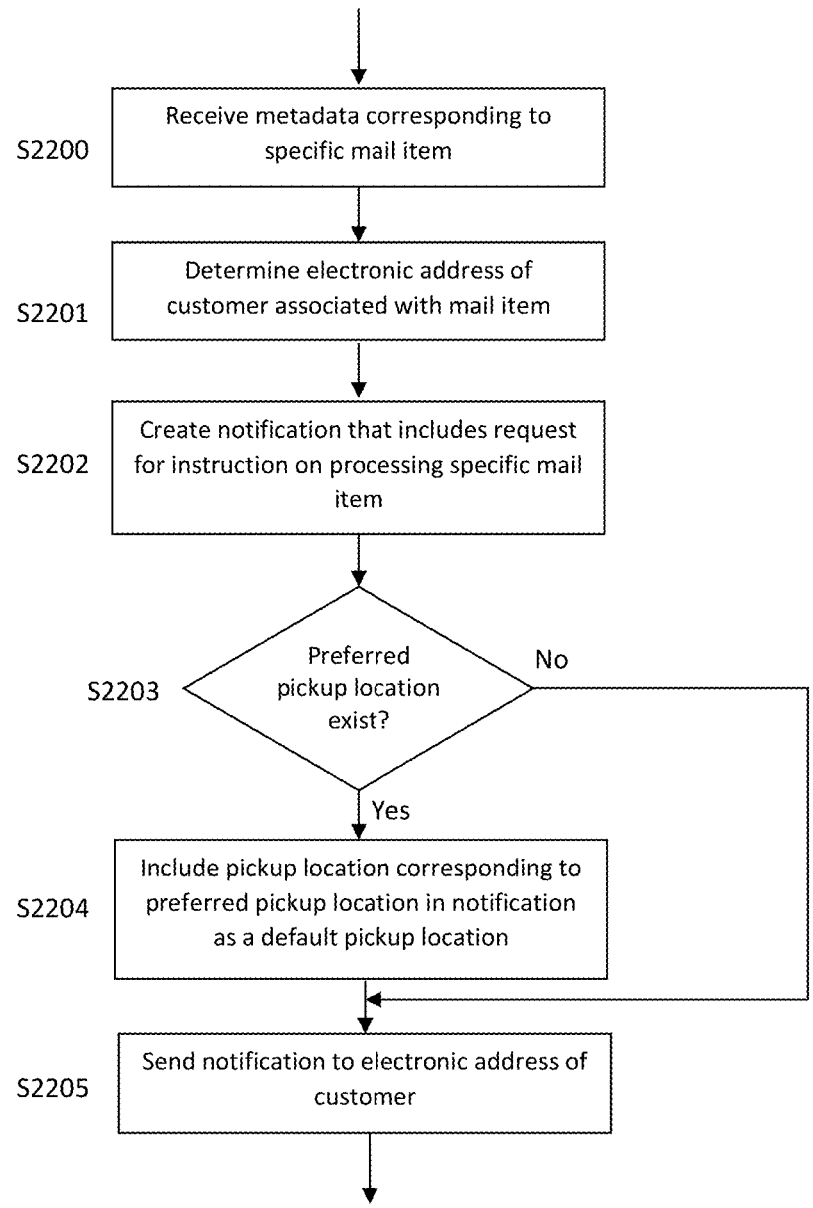
FIG. 22 shows a flow chart for a method that can be performed in any of the systems of FIGS. 1A-1C (or an equivalent)

FIG. 22 shows a method that can performed by a mail processing controller (e.g., 103 in FIG. 1) according to an exemplary embodiment.

After receiving metadata corresponding to a specific mail item (S2200), the mail processing controller determines an electronic address of a customer associated with the mail item (S2201). Next, the mail processing controller creates a notification that (i) notifies the customer that a mail item has arrived for him or her and (ii) requests instructions from the user on how to process the mail item (S2202). However, the mail processing controller may modify or add other information into the notification depending on the information registered in databases at the mail facility. For example, the mail processing controller may determine when creating the notification whether a preferred pickup location exists for the customer. In the case that the preferred pickup location exists (S2203, yes), the mail processing controller causes the preferred pickup location to be included as a default pickup location in the notification (S2204). Next [or in the case that there is no preferred pickup location registered (S2200)], the mail processing controller sends notifications to the electronic address of the customer (S2205).

Figure 23A:
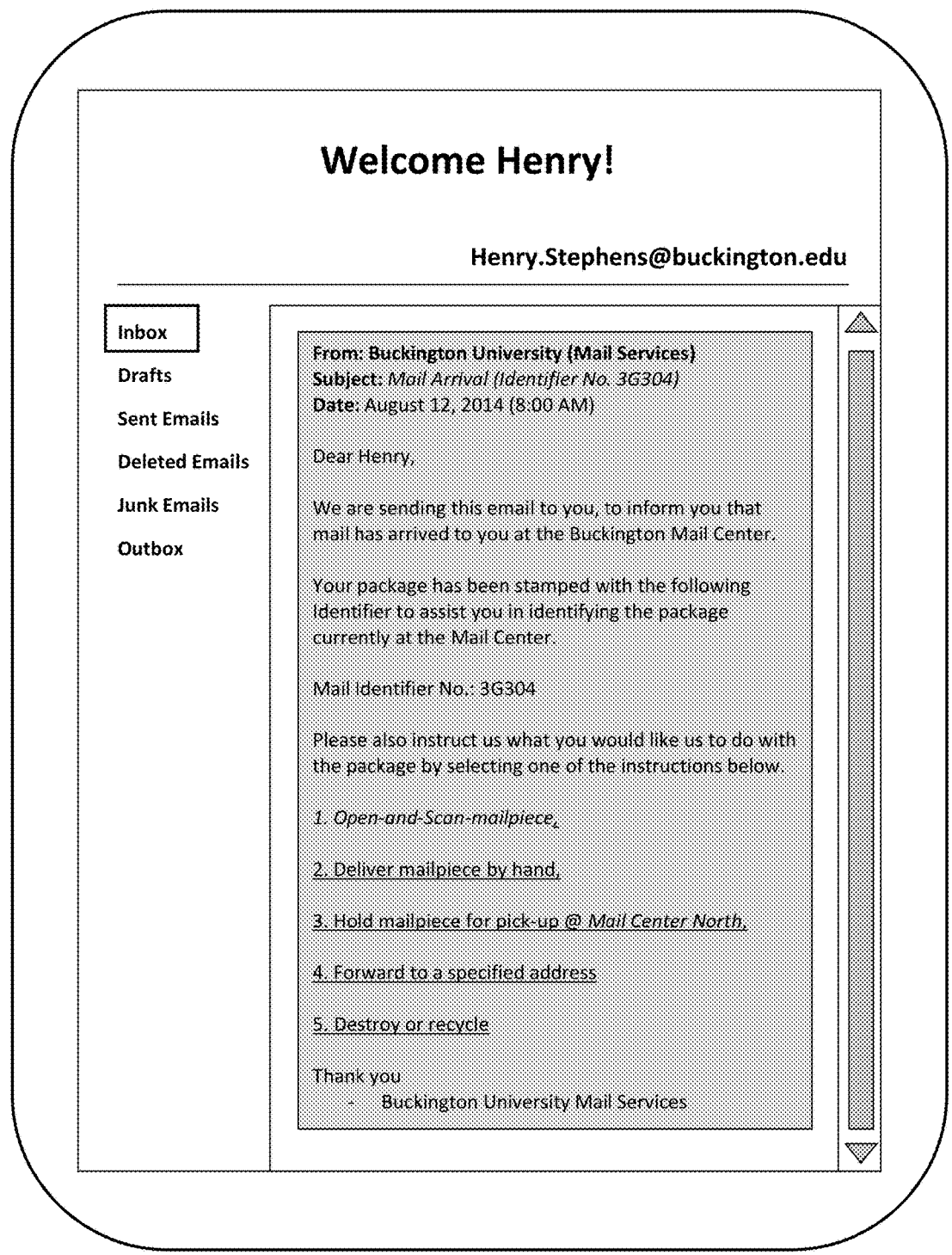
FIGS. 23A-23E show examples of electronic notifications that can be sent in any of the systems of FIGS. 1A-1C (or an equivalent)

An example of such notification is shown in FIG. 23A. As indicated in the notification, there are many different types of predetermined responsive instructions (e.g., "1. Open-and-Scan-mailpiece", "Deliver mailpiece by hand", "Hold mailpiece for pickup @ Mail Center North", "destroy or recycle", etc.). More specifically, one of the predetermined responsive instructions includes "Hold mailpiece for pickup @ Mail Center North". This is because the mail processing controller determined that there was a preferred pickup location (i.e. Mail Center North) associated with Henry.

Figure 23B:
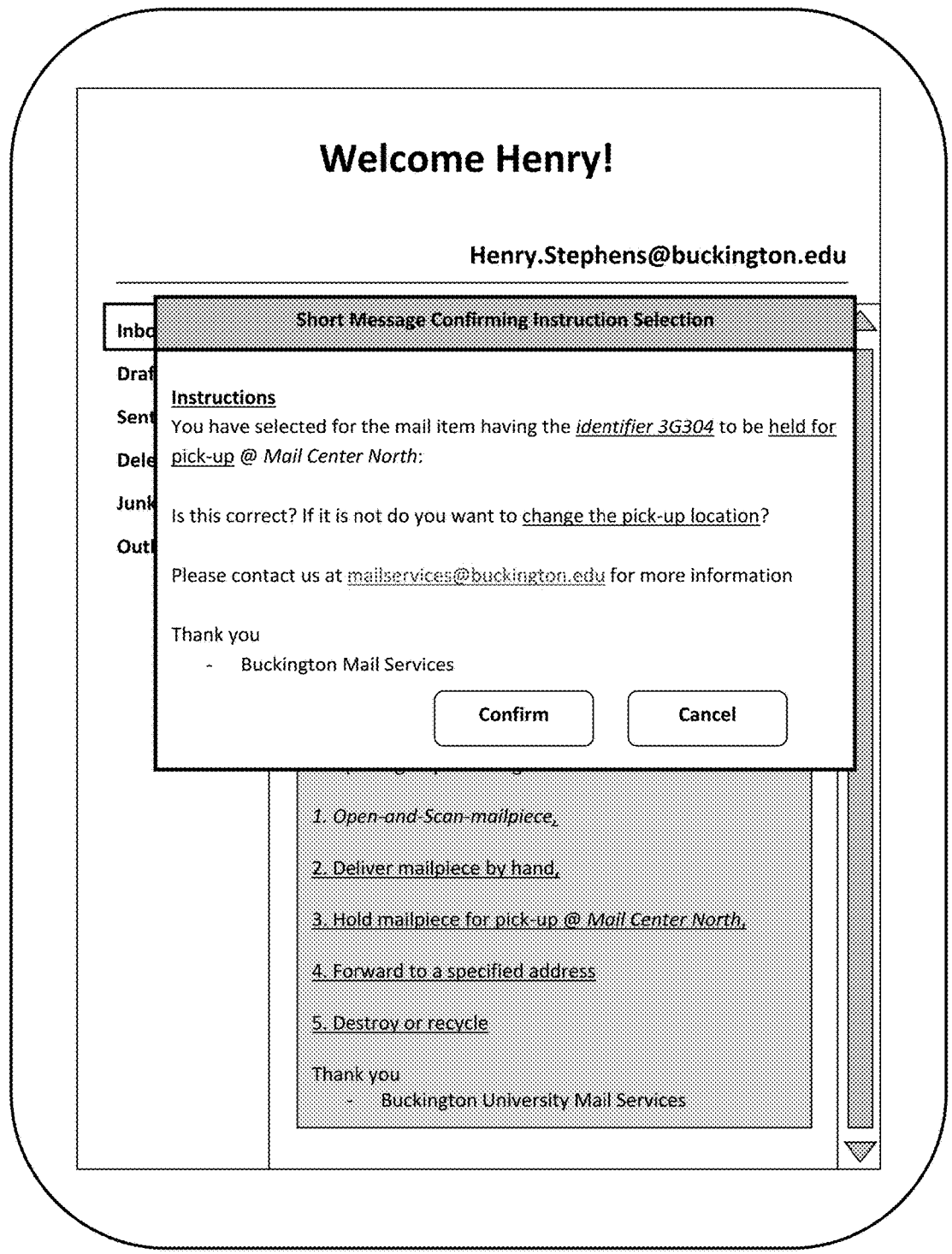
Figure 23C:
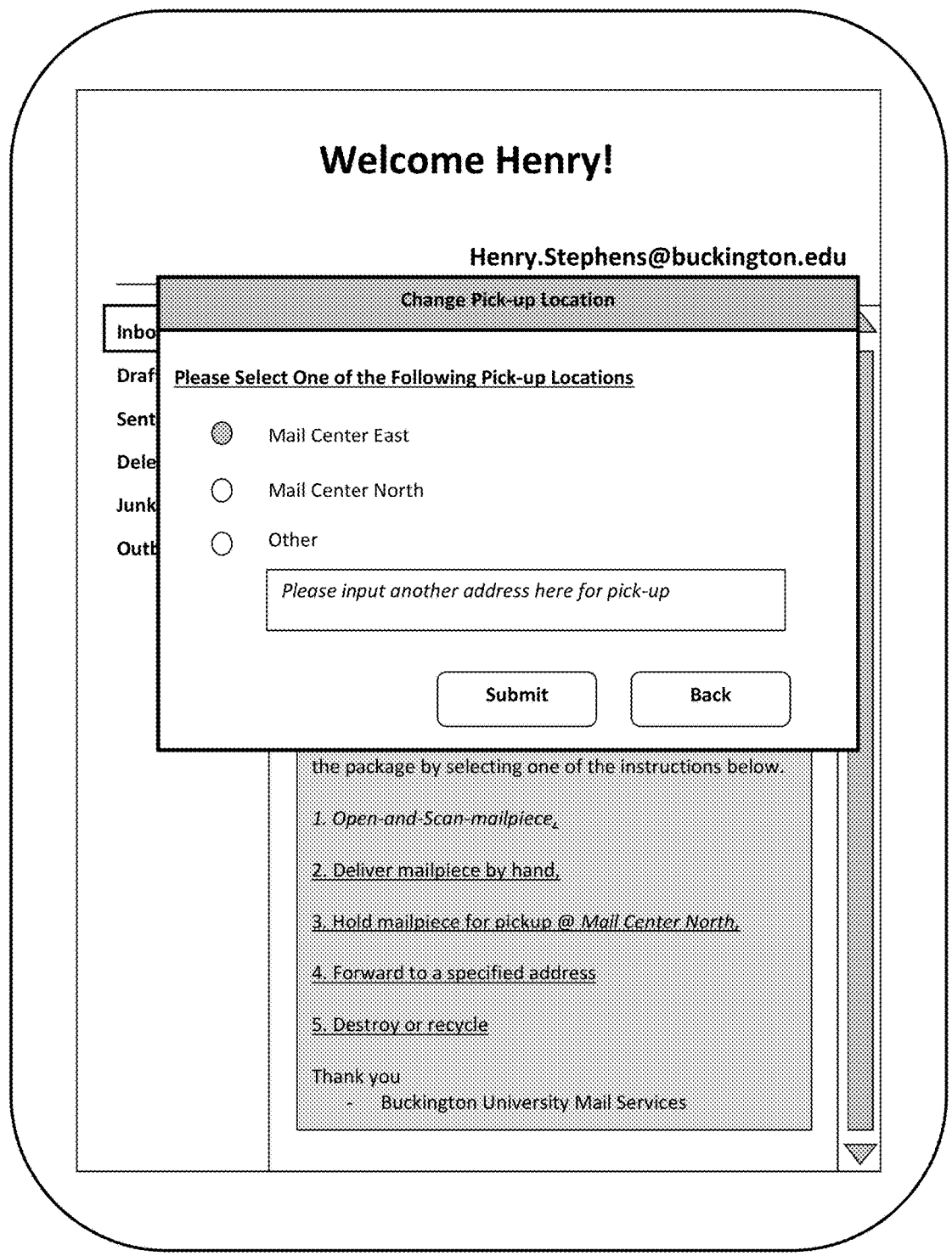

By activating the "Hold mailpiece for pickup @ Mail Center North" link, a short message is presented requesting confirmation of the instruction, such as shown in FIG. 23B. However, also present in the short message is a link to changing the pick-up location of the package. By, activating a "change the pick-up location" link, the short message presents a screen in which he can select another pick-up location, such as shown in FIG. 23C.

Figure 23D:
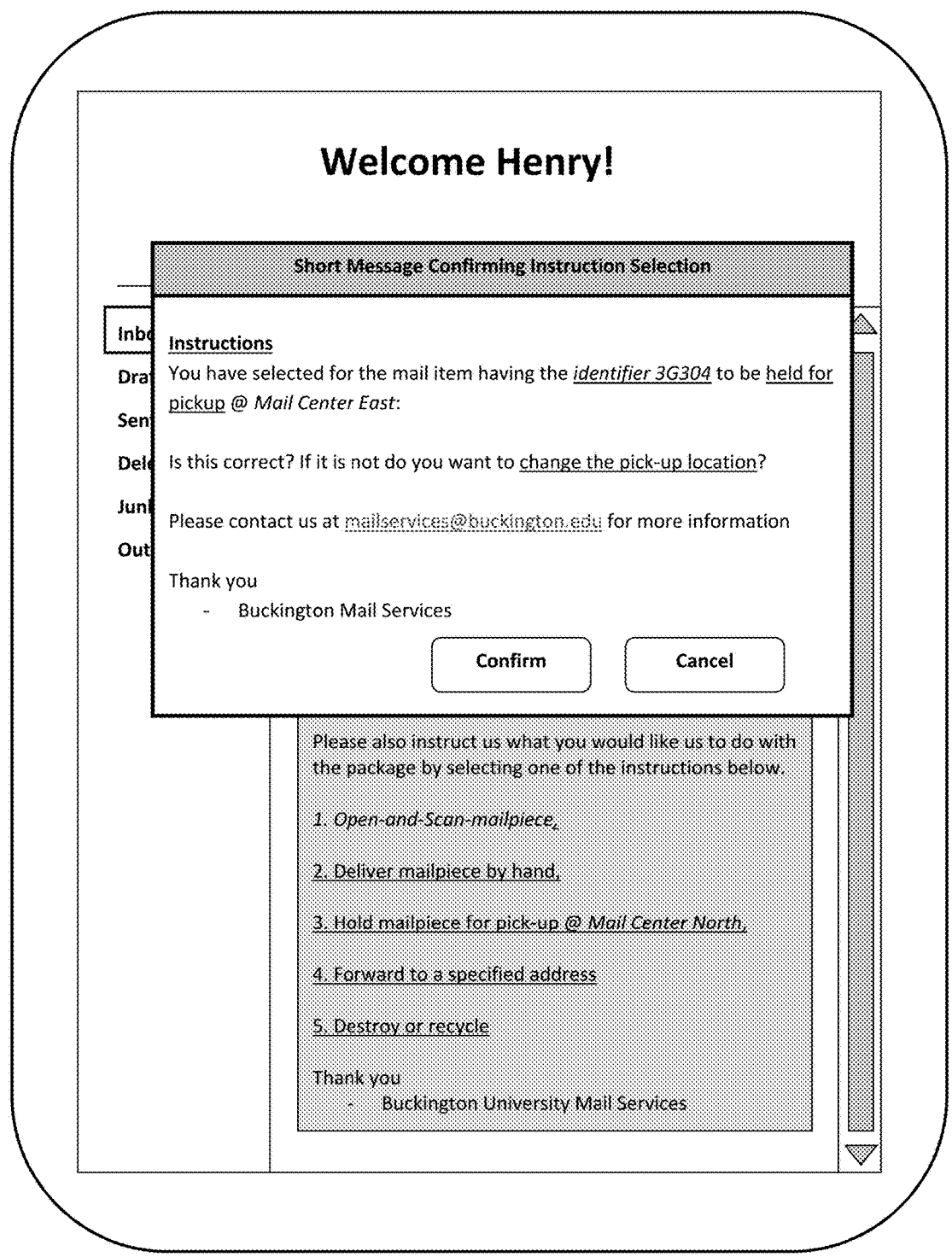
Figure 23E:
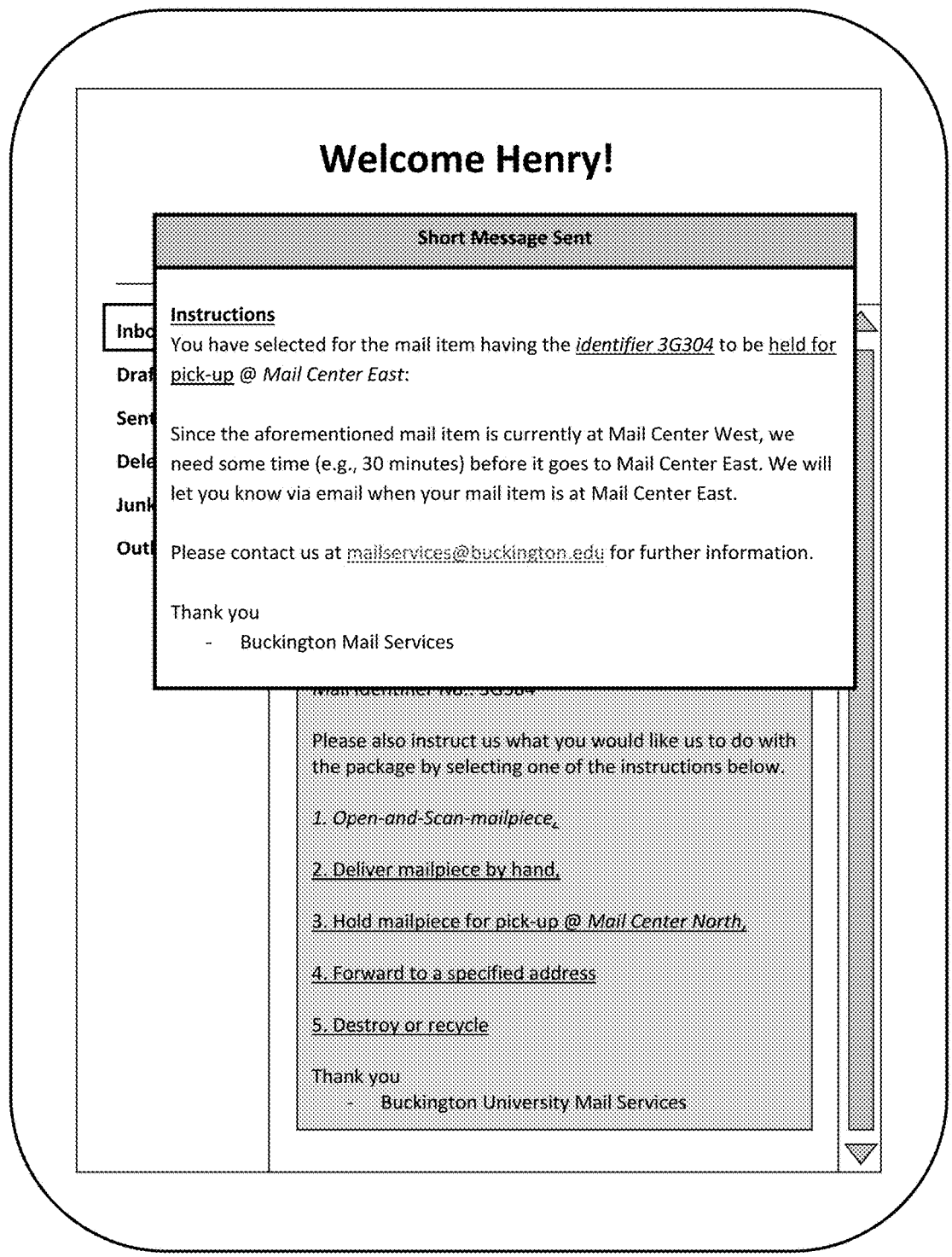

In an exemplary embodiment, the notification may include suggestions on alternative pick-up locations the "change the pick-up location" link is activated. Such alternative pick-up locations may be determined by analyzing the metrics registered in the databases utilizes by the mail facility. In another exemplary embodiment, the screen shown after the "change the pick-up location" link is activated may include an option in which the user may select an alternative pick-up location and specify that the selected pick-up location is now the new preferred pick-up location. After Henry has selected Mail Center East as the pick-up location, the short message confirms the new pick-up location, such as shown in FIG. 23D. Next, after confirming by activating the "Confirm" button, Henry is presented with a screen informing him that his package is currently stored at Mail Center West, such as shown in FIG. 23E. Thus, it may take some time before the mail item is transferred to Mail Center East. Once the package is at Mail Center East, the mail processing controller lets Henry know via an electronic message (e.g., email).

Figure 24:
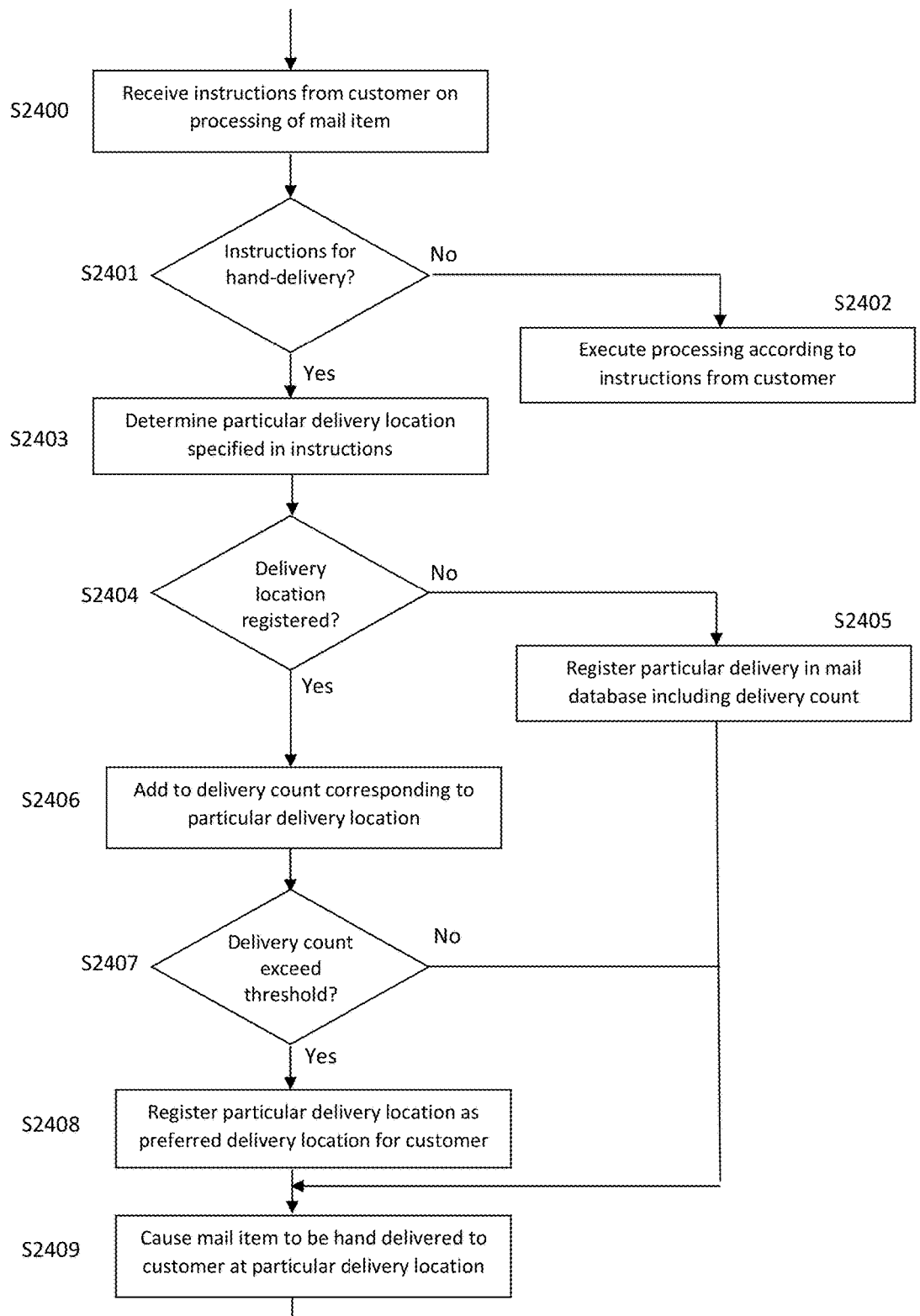
FIG. 24 shows a flow chart for a method that can be performed in any of the systems of FIGS. 1A-1C (or an equivalent)

FIG. 24 shows a method that can performed by a mail processing controller (e.g., 104 in FIG. 1A) according to an exemplary embodiment.

After receiving instructions from the customer on processing a received mail item (S2400), the mail processing controller determines whether the instructions are for hand-delivering the mail item (S2401). In the case that the instructions are not for hand-delivering the mail item (S2401, no), the mail processing controller executes processing according to the instructions specified by the customer (S2402). On the other hand, in case the instructions are for hand-delivering the mail item (S2401, yes), the mail processing controller determines a particular delivery location specified by the instructions (S2403). For example, the particular delivery location may be a physical address of a home or an office in a building.

Next, the mail processing controller determines whether the particular delivery location specified by the customer is registered in the mail database (S2404). In the case that the particular delivery location is not registered (S2404, no), the mail processing controller registers the particular delivery location along with a corresponding delivery count (2405). The delivery count is the number of times a specific customer has requested a mail item to be delivered to a particular delivery location. In the case that the particular delivery location has been previously registered (S2404, yes), the mail processing controller adds to the delivery count (S2406). Next, the mail processing controller determines whether the delivery count exceeds a predetermined delivery count threshold (S2407).

In the case that the delivery count exceeds the threshold (S2407, yes), the mail processing controller registers the particular delivery location as preferred delivery location for customer (S2408). Next [or in the case that the delivery count does not exceed the threshold (S2407, no)], the mail processing controller causes the mail item to be hand delivered to customer at particular delivery location (S2409).

Figure 25:
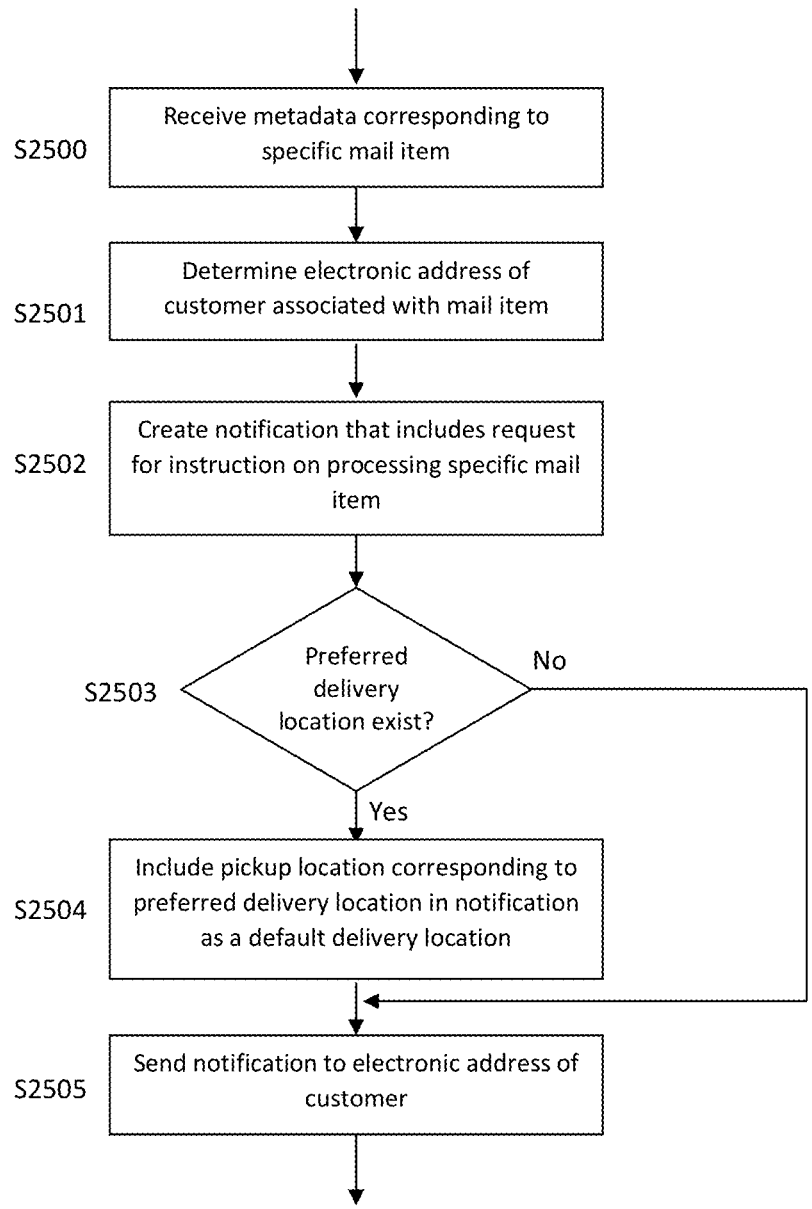
FIG. 25 shows a flow chart for a method that can be performed in any of the systems of FIGS. 1A-1C (or an equivalent)

FIG. 25 shows a method that can performed by a mail processing controller (e.g., 104 in FIG. 1A) according to an exemplary embodiment.

After the mail processing controller receives metadata from a specific mail item that has arrived at the mail facility (S2500), the mail processing controller determines an electronic address of the customer by analyzing the metadata corresponding to the specific mail item (S2501). Next, the mail processing controller creates a notification that (i) notifies the customer that a mail item has arrived for him or her and (ii) requests instructions from the user on how to process the mail item (S2502). However, the mail processing controller may modify or add other information into the notification depending on the information registered in databases at the mail facility. For example, the mail processing controller may determine when creating the notification whether a preferred delivery location exists for the customer (S2503). In the case that the preferred delivery location exists (S2503, yes), the mail processing controller causes the preferred delivery location to be included as a default delivery location in the notification (S2504). Next [or in the case that there is no preferred pickup location registered (S2503, no)], the mail processing controller sends notifications to the electronic address of the customer (S2505).

Figure 26A:
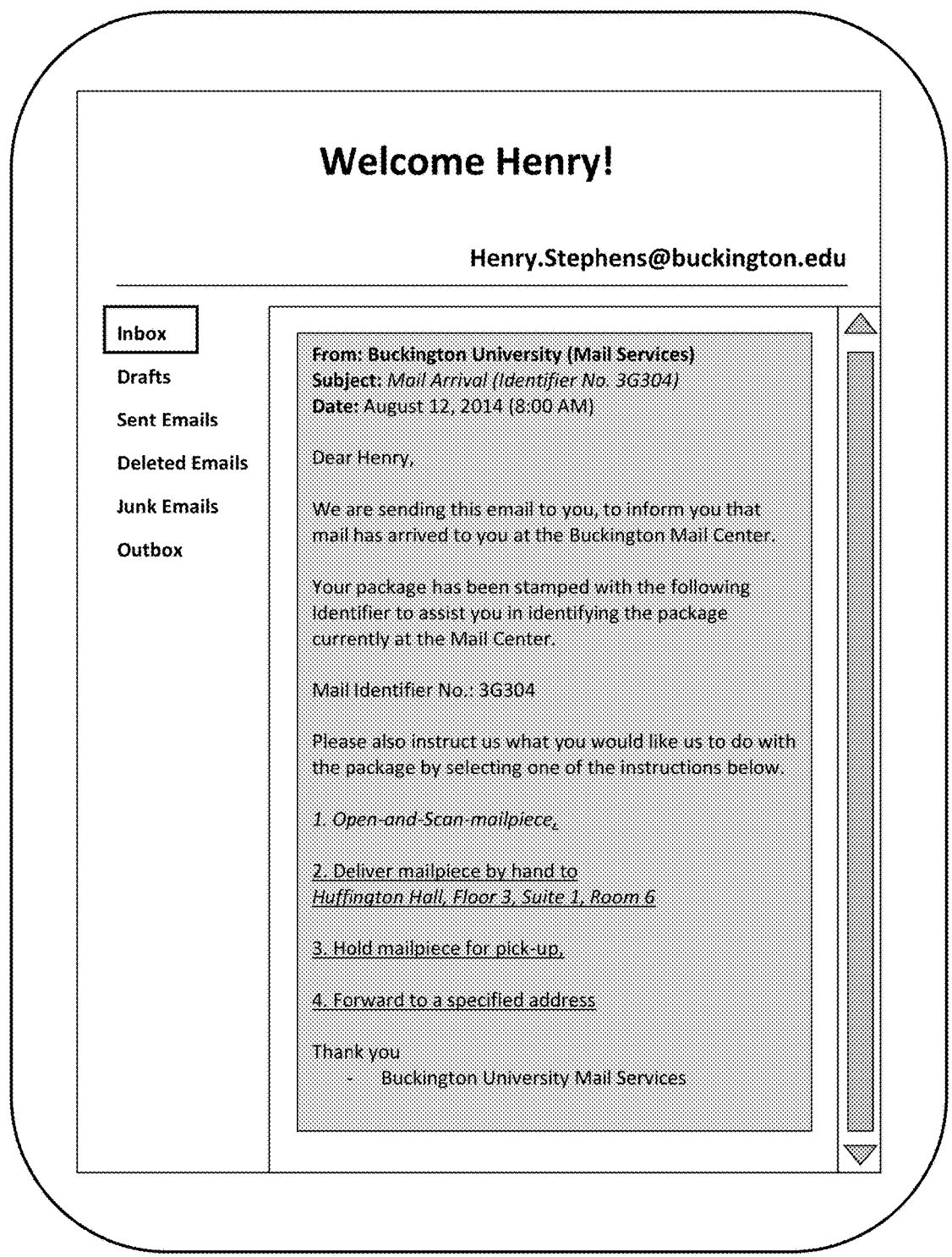
FIGS. 26A-26D show examples of electronic notifications that can be sent in any of the systems of FIGS. 1A-1C (or an equivalent)
Figure 26B:
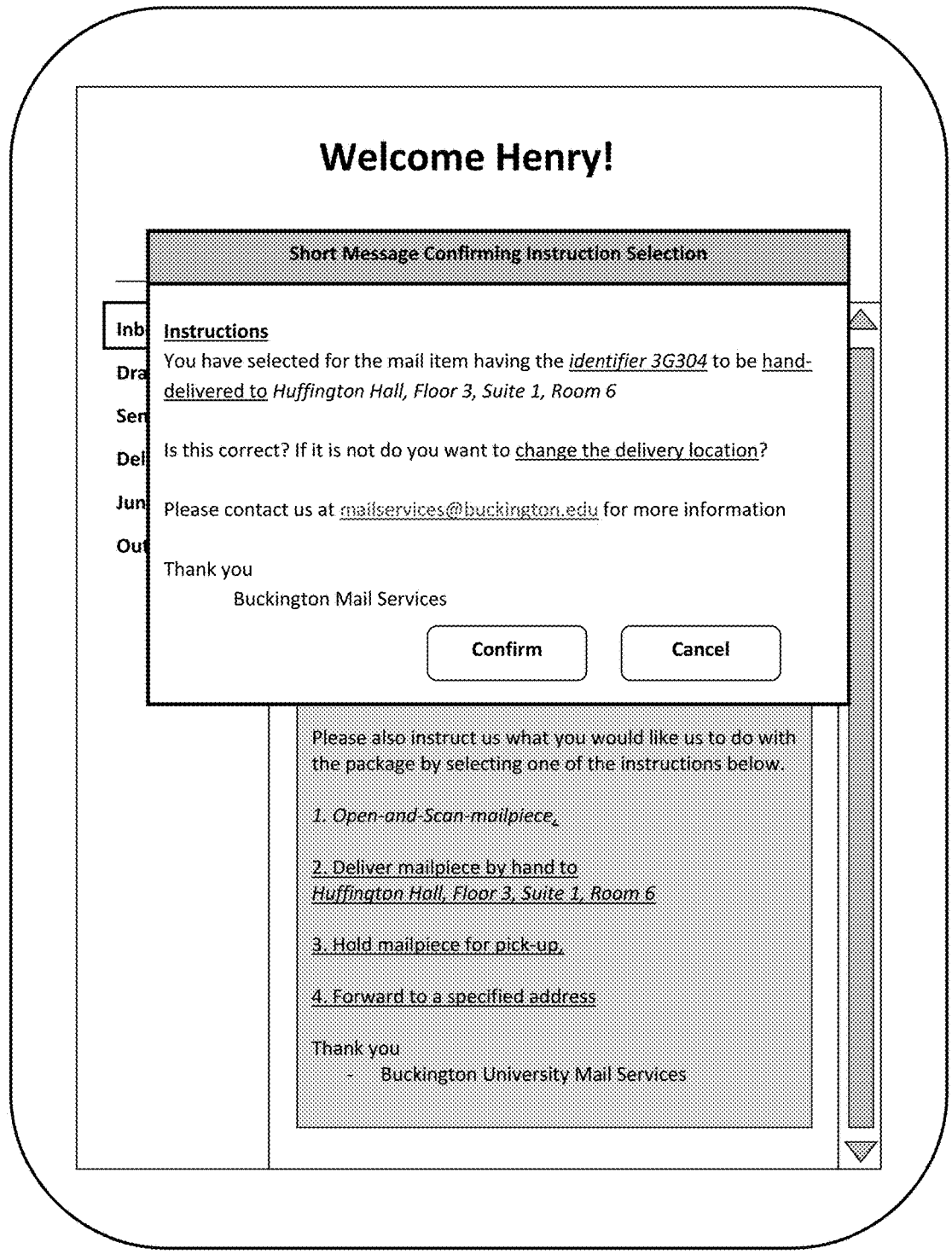
Figure 26C:
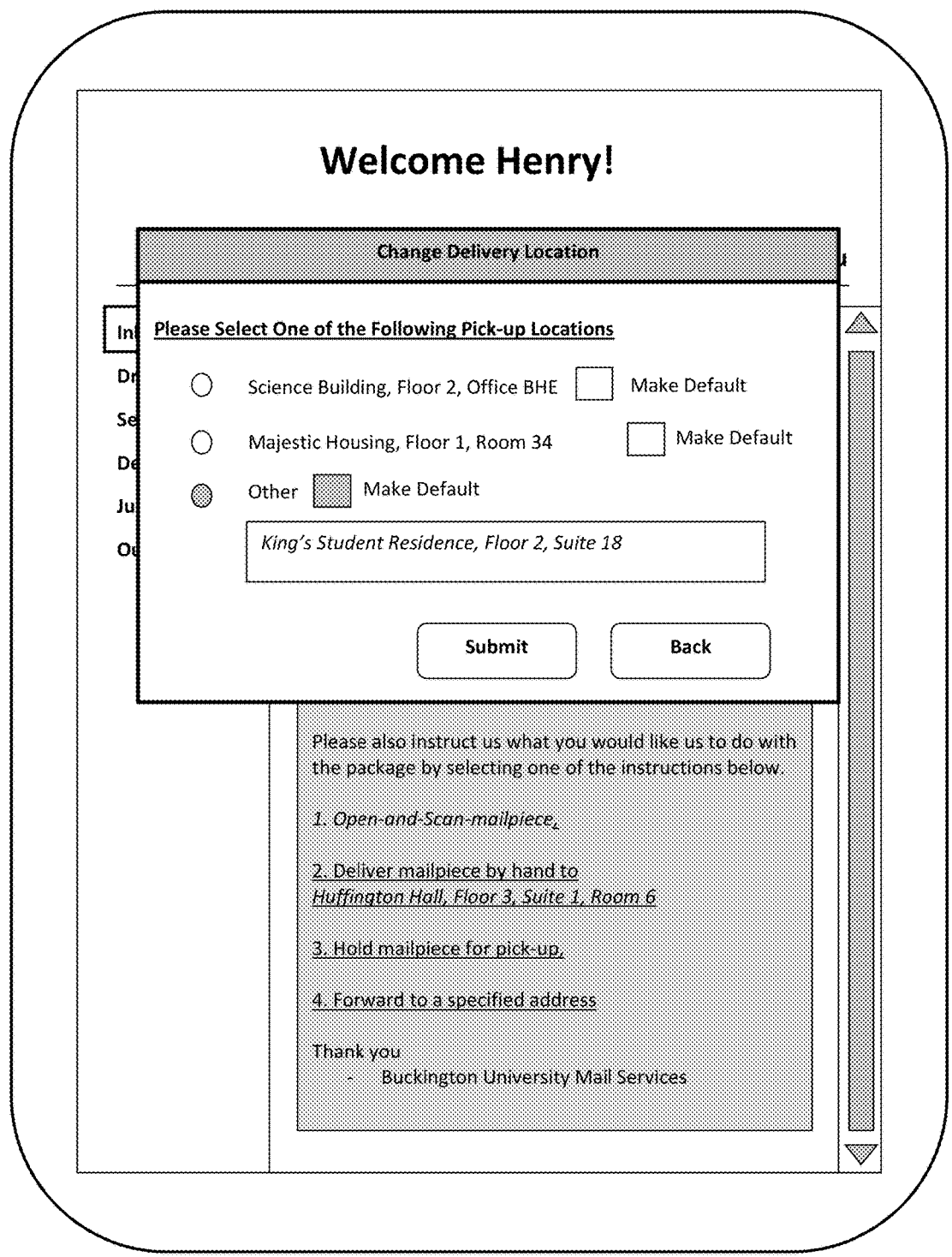
Figure 26D:
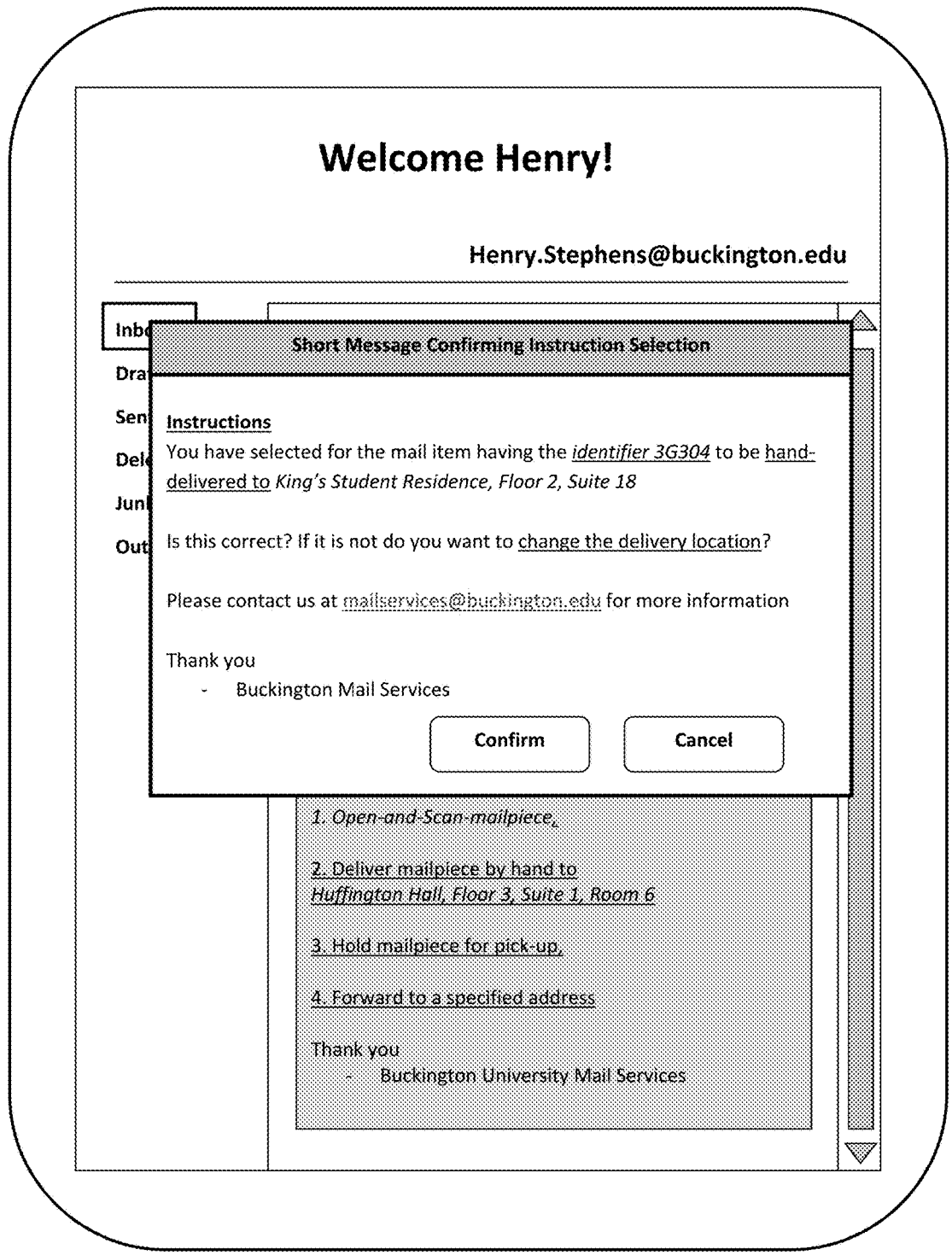

An example of such notification is shown in FIG. 26A. As indicated in the notification, there are many different types of predetermined responsive instructions (e.g., "1. Open-and-Scan-mailpiece", "Deliver mailpiece by hand to Huffington Hall, Floor 3, Suite 1, Room 6", "Hold mailpiece for pickup", etc.). In this case, Henry wishes to have the package hand-delivered to him. After Henry activates the "Deliver mailpiece by hand to Huffington Hall, Floor 3, Suite 1, Room 6" link, a short message is presented as shown in FIG. 26B. As indicated in the message, Henry may change the delivery location by activating the "change the delivery location" link. As shown in FIG. 26C, Henry may be presented with suggested delivery locations that Henry has used in the past. Further, Henry may select the "other" button and manually input another address (i.e. King's Student Residence, Floor 2, Suite 18) as the delivery location. In addition, it should be noted that each of the suggestions includes an option to make that delivery location the default delivery location. After activating the "submit" button, Henry is presented with a screen confirming his change to the delivery location as shown in FIG. 26D.

Figure 27:
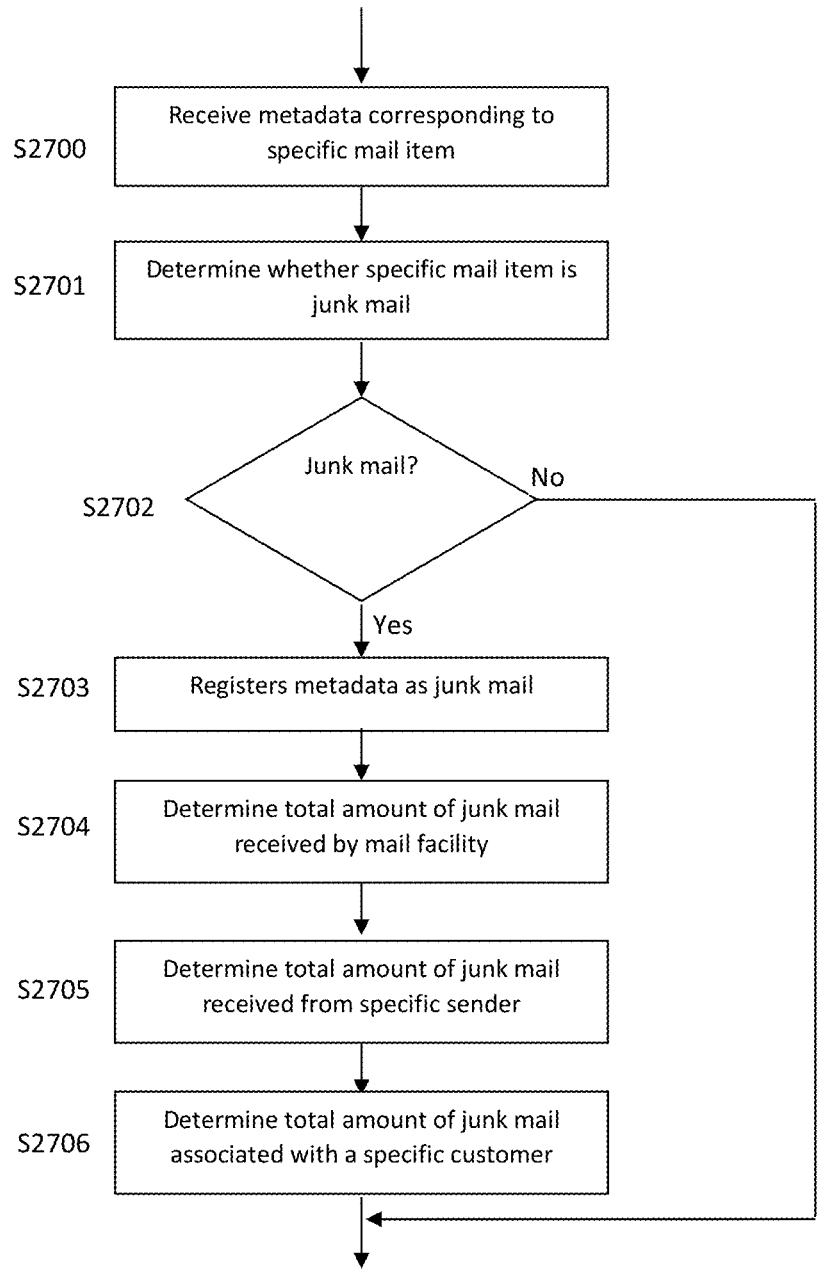
FIG. 27 shows a flow chart for a method that can be performed in any of the systems of FIGS. 1A-1C (or an equivalent).

FIG. 27 shows a method that can performed by a mail processing controller (e.g., 104 in FIG. 1A) according to an exemplary embodiment.

When the mail processing controller receives receive metadata corresponding to specific mail item (S2700), the mail processing controller determines whether the specific mail item is junk mail using the metadata (S2701). For example, the metadata may include words and phrases (on the packaging of the mail item) that may indicate that the mail item is junk mail. In the case that the mail item is junk mail (S2702, yes), the mail processing controller registers in the metadata that the mail item is junk mail (S2703). Next, the mail processing controller determines (i) the total amount of junk mail received by mail facility (S2704), (ii) the total amount of junk mail received from a specific sender (S2705) and (iii) the total amount of junk mail associated with a specific customer (S2706). Otherwise, in the case that the mail item is not junk mail (S2702, no), the process ends.

While the aforementioned examples relate to a mailcenter within a school, the application is not limited to such scenario. For example, the mailcenter may be for a corporate or organizational campus. In another example, the mailcenter may be a post office, such as servicing a rural (or other relatively small population) community in which mail delivery may or may not be a burden. The aforementioned system may be adapted to render the process more efficient and convenient and allow the customers to select if they want a specific mailpiece or not.

In another example, a two pass process may be applied to process postcards, letters and flats through the intelligent delivery system on arrival at the mailcenter. In the first pass, a camera or barcode scanner captures barcode data (e.g., IMB—intelligent mail barcode) from the mail piece, and an imprinter imprints a unique mailpiece identifier on the mailpiece. In the second pass, a digital camera captures one or more images of the mailpiece and an OCR provision scans the digital image(s) of the mailpiece to extract printed data from the exterior of the envelope or packaging, and associates it with the IMB data that was collected on the first pass, by using the imprinted barcode to link the datasets.

In such system, incoming mail may be scanned into batches of numbered mail trays (or bins) and shelved to await disposition instructions by the addressees. In a transactional workflow, a department code is imprinted on the transactional mail piece on the second pass and diverted from the rest of the mailstream, and then it can be sorted by department code and entered into a predefined transactional workflow.

On the other hand, for correspondence mail, the system notifies the mail service customer via email that a mailpiece has been received for the customer and provides a link to a webpage where the addressee can view the image of the outside of the mailpiece as well as data regarding the mailpiece and make a disposition decision regarding the mailpiece which has been received by the mailcenter for the customer.

The system can be configured to track the decision made regarding the mailpiece based on the image of the envelope or package presented to the customer. Periodically, the system may notify the mailcenter staff regarding which trays of mail have mailpieces within them that have had dispositions decisions made. Such staff may optionally pull the designated trays from the shelves and process the entire tray of mail back through a system scanner. Mailpieces within the tray which have had a disposition decision made will be imprinted with a disposition code (such as open/scan, hold, deliver, destroy, etc.) and diverted from the rest of the mailstream to be processed according to the code on the mailpiece. Mailpieces which have not had a disposition decision made regarding them are processed through the scanner and returned into the numbered tray to be placed back on the shelf for future processing.

If the customer has elected to have their mailpiece opened and scanned, the system will process the mailpiece through a high volume opener/extractor/scanner, or mailcenter staff may process through a manual opening and scanning process. In either instance, a notification is transmitted via email to indicate to the customer that the contents of the mailpiece are available for viewing, and a link is provided in the notification to view the mailpiece and contents.

The system handles the OCR (Optical Character Recognition) of the images captured by the image camera capture, merges it with the unique identifier (e.g., barcode) that is imprinted on the mailpiece. Thus, the system is able to capture an accurate count of mailpieces, the date and time the mailpiece was scanned, the IMB (Intelligent Mail Barcode) data, such as mailer ID and class of mail, sender information, recipient information, size of the mailpiece (e.g., postcard, letter, flat, etc.), and with a database lookup from customer data, the department of the recipient. The data can be collected and registered to provide metrics and historical analytics regarding the incoming mail. Such data can be utilized to create service level agreements (SLA) or piece count based contracts or charge back to departments based on their actual mail received.

The system can be configured to digitally deliver the images of the mailpieces to the designated recipient electronically and provide the recipient the ability to instruct the mailcenter as to how each piece of mail received for them should be processed. Examples are open and scan, physically deliver the mailpiece, hold for pickup, forward to someone else, trash or destroy the mailpiece or treat as junk mail. The system can track each mailpiece and the disposition decisions made regarding each mailpiece in real time. The system can also be configured to notify the mailcenter personnel when a decision is made regarding a mailpiece so that the tray containing the mailpiece can be processed through the scanner, and once the imprinted barcode associated with the mailpiece is detected the scanner then imprints the disposition instructions onto the mailpiece such as open/scan, hold, deliver, destroy, etc., and diverts it from the rest of the mailpieces still awaiting disposition instructions. The system also can be configured to process business rules such as escalations for mailpieces which have not had a sort decision made regarding them in a predefined number of days, multiple notifications of mail receipt from key senders (such as the FDA, FAA, IRS, etc.) for compliance purposes.

The aforementioned specific embodiments are illustrative, and many variations can be introduced on these embodiments without departing from the spirit of the disclosure or from the scope of the appended claims. For example, various examples and embodiments are discussed herein with reference to output devices, but it should be appreciated that the inventive subject matter of this disclosure can be applied to maintain, configure and service devices other than output devices, automobile emission control systems, medical test equipment, flight systems in aircraft, etc. In such examples (as well as many others), it is highly desirable, and even necessary in many instances, to oversee the application of configuration settings and to log information regarding who made changes, what changes were made, when they were made, as well as what systems they were applied to.

In addition, elements and/or features of different examples and illustrative embodiments may be combined with each other and/or substituted for each other within the scope of this disclosure and appended claims. For example, the orders in which the steps are performed in the aforementioned methods are not limited to those shown in the examples of FIGS. 5A-5D, 7-10 and 12-15, 17-22, 24, 25 and 27, and may be switched as long as similar results are achieved. Also, it should be noted that the methods illustrated in the examples of FIGS. 5A-5D, 7-10 and 12-15, 17-22, 24, 25 and 27 may be implemented using any of the systems described in connection with FIGS. 1A-1C.

What is claimed is:

1. An intelligent system to streamline mail delivery on a campus including a mailcenter, comprising:
   an image capture device to capture a digital image of an address-bearing face of a piece of mail;
   an imprinter to print a mailpiece identifier uniquely assigned to the piece of mail, on the piece of mail;
   an image processing apparatus that, upon receiving the digital image of the address-bearing face, extracts from the digital image (a) sender information indicating a sender of the piece of mail and (b) addressee information indicating an addressee of the piece of mail, and outputs metadata including the mailpiece identifier, the sender information and the addressee information along with the digital image of the address-bearing face;

a mail processing controller that controls mail processing flow, compares the extracted addressee information to the data registered in a mail database, to determine whether the extracted addressee information is acceptable, registers in the mail database the metadata and the corresponding digital image in association with the mailpiece identifier assigned to the piece of mail, and if the extracted addressee information is acceptable, performs a correspondence mail workflow, wherein the mail processing controller, upon command, performs one or more of a mail flow metrics process and an analytics process to mail data registered in the mail database, wherein the mail processing controller controls the mail processing flow based on results of performing said one or more of the mail flow metrics process and the analytics process, wherein in the correspondence mail workflow, the mail processing controller causes an electronic notification bearing the mailpiece identifier uniquely assigned to the piece of mail, to be transmitted to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail, wherein the mail processing controller causes the electronic notification and the instructions specified by the mail service customer through the notification response page for the piece of mail to be registered in the mail database in association with the mail service customer, and in the analytics process, the mail processing controller determines, based on data registered in the mail database in association with the mail service customer, a preferred disposition method for the mail service customer, and wherein when the mail processing controller has notified to the electronic address of the mail service customer of arrival of a new mailpiece received by the mailcenter, and the mail processing controller does not receive disposition instruction from the mail service customer for the new mailpiece, the mail processing controller causes the new mailpiece to be disposed according to the preferred disposition method determined by the mail processing controller based on the data registered in the mail database in association with the mail service customer.

2. The intelligent system as claimed in claim 1, wherein the metadata output by the image processing apparatus for the piece of mail includes date and time that the piece of mail was processed by image processing apparatus, and wherein in the mail flow metrics process, the mail processing controller determines, based on data registered in the mail database for plural mailpieces, a total number of mailpieces processed by the image processing apparatus over a specified period of time.

3. The intelligent system as claimed in claim 1, wherein the mail processing controller determines based on the metadata output by the image processing apparatus for the piece of mail whether the piece of mail is (i) correspondence mail addressed to an individual indicated in the addressee information and to be disposed according to instruction from an individual mail service customer of the mailcenter, or (ii) transactional mail that is processed according to a transactional mail workflow that does not include obtaining disposition instruction from any individuals.

4. The intelligent system as claimed in claim 3, wherein in the transactional mail workflow which is performed when the mail processing controller has determined that the piece of mail is transactional mail, the mail processing controller causes the piece of mail to be delivered to a predetermined location, without obtaining disposition instruction from any individuals.

5. The intelligent system as claimed in claim 1, wherein the mail processing controller causes the electronic notification and the instructions specified by the mail service customer through the notification response page for the piece of mail to be registered in the mail database in association with the mailpiece identifier assigned to the piece of mail, and to be registered also in the mail database in association with the mail service customer.

6. The intelligent system as claimed in claim 1,
wherein the mail processing controller causes the electronic notification and the instructions specified by the mail service customer through the notification response page for the piece of mail to be registered in the mail database in association with the mail service customer, and wherein in the analytics process, the mail processing controller determines, based on data registered in the mail database in association with the mail service customer and for a specified period of time, one or more of (i) a total number of mailpieces addressed to the mail service customer and processed by the mailcenter, (ii) a number of mailpieces addressed to the mail service customer and processed by the mailcenter for delivery according to instructions from the mail service customer, (iii) a number of mailpieces addressed to the mail service customer and processed by the mailcenter for pickup according to instructions from the mail service customer, (iv) a number of mailpieces addressed to the mail service customer and processed by the mailcenter for destruction according to instructions from the mail service customer.

7. The intelligent system as claimed in claim 1,
wherein the mail processing controller determines, based on a set of business rules and the sender information associated with the piece of mail, whether the piece of mail has a relatively high priority, and wherein when the mail processing controller determines that the piece of mail has a relatively high priority and the mail processing controller does not receive disposition instruction from the mail service customer for the piece of mail within a predetermined period of time in response to the electronic notification that was already sent to the mail service customer, the mail processing controller causes one or more reminder notifications to be sent to the mail service customer until the mailcenter receives disposition instruction from the mail service customer.

8. The intelligent system as claimed in claim 1, wherein in performing said one or more of the mail flow metrics process and the analytics process, the mail processing controller determines, based on data registered in the mail database and for a specified period of time, one or more of (i) a total number of mailpieces received by the mailcenter from a specified sender, (ii) a total number of mailpieces received by the mailcenter for a specified mail service customer, and (iii) a specified class of mail.

9. The intelligent system as claimed in claim 1, wherein in performing said one or more of the mail flow metrics process the analytics process, the mail processing controller determines, based on data registered in the mail database and for a specified period of time, one or more of (i) a total volume of junk mail received by the mailcenter, (ii) a total volume of junk mail received by the mailcenter from a specified sender, and (iii) a total volume of junk mail received by the mailcenter for a specified mail service customer.

10. An intelligent system to streamline mail delivery on a campus including a mailcenter, comprising:
an image capture device to capture a digital image of an address-bearing face of a piece of mail;
an imprinter to print a mailpiece identifier uniquely assigned to the piece of mail, on the piece of mail;
an image processing apparatus that, upon receiving the digital image of the address-bearing face, extracts from the digital image (a) sender information indicating a sender of the piece of mail and (b) addressee information indicating an addressee of the piece of mail, and outputs metadata including the mailpiece identifier, the sender information and the addressee information along with the digital image of the address-bearing face;
a mail processing controller that controls mail processing flow, compares the extracted addressee information to the data registered in a mail database, to determine whether the extracted addressee information is acceptable, registers in the mail database the metadata and the corresponding digital image in association with the mailpiece identifier assigned to the piece of mail, and if the extracted addressee information is acceptable, performs a correspondence mail workflow,
wherein the mail processing controller, upon command, performs one or more of a mail flow metrics process and an analytics process to mail data registered in the mail database,
wherein the mail processing controller controls the mail processing flow based on results of performing said one or more of the mail flow metrics process and the analytics process,
wherein in the correspondence mail workflow, the mail processing controller causes an electronic notification bearing the mailpiece identifier uniquely assigned to the piece of mail, to be transmitted to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail,
wherein the mail processing controller causes the electronic notification and the instructions specified by the mail service customer through the notification response page for the piece of mail to be registered in the mail database in association with the mail service customer, and in the analytics process, the mail processing controller determines, based on data registered in the mail database in association with the mail service customer, a preferred pickup location amongst plural candidate locations for mail pickup for the mail service customer, and
wherein the mail processing controller causes the notification response page to show the preferred pickup location, determined by the mail processing controller based on the data registered in the mail database in association with the mail service customer, as a default pickup location.

11. An intelligent system to streamline mail delivery on a campus including a mailcenter, comprising:
an image capture device to capture a digital image of an address-bearing face of a piece of mail;
an imprinter to print a mailpiece identifier uniquely assigned to the piece of mail, on the piece of mail;
an image processing apparatus that, upon receiving the digital image of the address-bearing face, extracts from the digital image (a) sender information indicating a sender of the piece of mail and (b) addressee information indicating an addressee of the piece of mail, and outputs metadata including the mailpiece identifier, the sender information and the addressee information along with the digital image of the address-bearing face;
a mail processing controller that controls mail processing flow, compares the extracted addressee information to the data registered in a mail database, to determine whether the extracted addressee information is acceptable, registers in the mail database the metadata and the corresponding digital image in association with the mailpiece identifier assigned to the piece of mail, and if the extracted addressee information is acceptable, performs a correspondence mail workflow,
wherein the mail processing controller, upon command, performs one or more of a mail flow metrics process and an analytics process to mail data registered in the mail database,
wherein the mail processing controller controls the mail processing flow based on results of performing said one or more of the mail flow metrics process and the analytics process,
wherein in the correspondence mail workflow, the mail processing controller causes an electronic notification bearing the mailpiece identifier uniquely assigned to the piece of mail, to be transmitted to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail,
wherein the mail processing controller causes the electronic notification and the instructions specified by the mail service customer through the notification response page for the piece of mail to be registered in the mail database in association with the mail service customer, and in the analytics process, the mail processing controller determines, based on data registered in the mail database in association with the mail service customer, a preferred delivery location of the mail service customer other than a residential address or office location of the mail service customer, and
wherein the mail processing controller causes the notification response page to show the preferred delivery location, determined by the mail processing controller based on the data registered in the mail database in association with the mail service customer, as a default delivery location which is changeable upon command via the notification response page.

12. A method performed by an intelligent delivery system to streamline mail delivery on a campus including a mailcenter, the method comprising the steps of:

capturing a digital image of an address-bearing face of a piece of mail;

imprinting a mailpiece identifier uniquely assigned to the piece of mail, on the piece of mail;

extracting, by an image processing apparatus of the intelligent delivery system from the digital image upon receiving the digital image of the address-bearing face, (a) sender information indicating a sender of the piece of mail and (b) addressee information indicating an addressee of the piece of mail, and outputting metadata including the mailpiece identifier, the sender information and the addressee information along with the digital image of the address-bearing face;

controlling, by a mail processing controller of the intelligent delivery system, mail processing flow, including registering in the mail database the metadata and the corresponding digital image in association with the mailpiece identifier assigned to the piece of mail, comparing the extracted addressee information to the data registered in a mail database, to determine whether the extracted addressee information is acceptable, and if the extracted addressee information is acceptable, performing a correspondence mail workflow;

performing, by the mail processing controller upon command, one or more of a mail flow metrics process and an analytics process to mail data registered in the mail database, wherein the mail processing controller controls the mail processing flow based on results of performing said one or more of the mail flow metrics process and the analytics process;

transmitting, by the mail processing controller, an electronic notification bearing the mailpiece identifier uniquely assigned to the piece of mail to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail;

registering, by the mail processing controller, the electronic notification and the instructions specified by the mail service customer through the notification response page for the piece of mail in the mail database in association with the mail service customer; and determining, by the mail processing controller in the analytics process, a preferred disposition method for the mail service customer based on data registered in the mail database in association with the mail service customer, wherein when the mail processing controller has notified to the electronic address of the mail service customer of arrival of a new mailpiece received by the mailcenter, and the mail processing controller does not receive disposition instruction from the mail service customer for the new mailpiece, the mail processing controller causes the new mailpiece to be disposed according to the preferred disposition method determined by the mail processing controller based on the data registered in the mail database in association with the mail service customer.

13. The method as claimed in claim 12, further comprising:

transmitting, by the mail processing controller, an electronic notification bearing the mailpiece identifier uniquely assigned to the piece of mail to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail;

registering, by the mail processing controller, the electronic notification and the instructions specified by the mail service customer through the notification response page for the piece of mail in the mail database in association with the mail service customer;

determining, by the mail processing controller in the analytics process, based on data registered in the mail database in association with the mail service customer and for a specified period of time, one or more of (i) a total number of mailpieces addressed to the mail service customer and processed by the mailcenter, (ii) a number of mailpieces addressed to the mail service customer and processed by the mailcenter for delivery according to instructions from the mail service customer, (iii) a number of mailpieces addressed to the mail service customer and processed by the mailcenter for pickup according to instructions from the mail service customer, (iv) a number of mailpieces addressed to the mail service customer and processed by the mailcenter for destruction according to instructions from the mail service customer.

14. The method as claimed in claim 12, further comprising:

determining, by the mail processing controller in the analytics process, based on data registered in the mail database and for a specified period of time, one or more of (i) a total number of mailpieces received by the mailcenter from a specified sender, (ii) a total number of mailpieces received by the mailcenter for a specified mail service customer, and (iii) a specified class of mail.

15. The method as claimed in claim 12, further comprising:

determining, by the mail processing controller in the analytics process, based on data registered in the mail database and for a specified period of time, one or more of (i) a total volume of junk mail received by the mailcenter, (ii) a total volume of junk mail received by the mailcenter from a specified sender, and (iii) a total volume of junk mail received by the mailcenter for a specified mail service customer.

16. A method performed by an intelligent delivery system to streamline mail delivery on a campus including a mailcenter, the method comprising the steps of:

capturing a digital image of an address-bearing face of a piece of mail;

imprinting a mailpiece identifier uniquely assigned to the piece of mail, on the piece of mail;

extracting, by an image processing apparatus of the intelligent delivery system from the digital image upon receiving the digital image of the address-bearing face, (a) sender information indicating a sender of the piece of mail and (b) addressee information indicating an addressee of the piece of mail, and outputting metadata including the mailpiece identifier, the sender information and the addressee information along with the digital image of the address-bearing face;

controlling, by a mail processing controller of the intelligent delivery system, mail processing flow, including registering in the mail database the metadata and the corresponding digital image in association with the mailpiece identifier assigned to the piece of mail, comparing the extracted addressee information to the data registered in a mail database, to determine whether the extracted addressee information is acceptable, and if the extracted addressee information is acceptable, performing a correspondence mail workflow;

performing, by the mail processing controller upon command, one or more of a mail flow metrics process and an analytics process to mail data registered in the mail database, wherein the mail processing controller controls the mail processing flow based on results of performing said one or more of the mail flow metrics process and the analytics process;

transmitting, by the mail processing controller, an electronic notification bearing the mailpiece identifier uniquely assigned to the piece of mail to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail;

registering, by the mail processing controller, the electronic notification and the instructions specified by the mail service customer through the notification response page for the piece of mail in the mail database in association with the mail service customer;

determining, by the mail processing controller in the analytics process, a preferred pickup location amongst plural candidate locations for mail pickup for the mail service customer based on data registered in the mail database in association with the mail service customer, causing, by the mail processing controller, the notification response page to show the preferred pickup location, determined by the mail processing controller based on the data registered in the mail database in association with the mail service customer, as a default pickup location.

17. A method performed by an intelligent delivery system to streamline mail delivery on a campus including a mailcenter, the method comprising the steps of:

capturing a digital image of an address-bearing face of a piece of mail;

imprinting a mailpiece identifier uniquely assigned to the piece of mail, on the piece of mail;

extracting, by an image processing apparatus of the intelligent delivery system from the digital image upon receiving the digital image of the address-bearing face, (a) sender information indicating a sender of the piece of mail and (b) addressee information indicating an addressee of the piece of mail, and outputting metadata including the mailpiece identifier, the sender information and the addressee information along with the digital image of the address-bearing face;

controlling, by a mail processing controller of the intelligent delivery system, mail processing flow, including registering in the mail database the metadata and the corresponding digital image in association with the mailpiece identifier assigned to the piece of mail, comparing the extracted addressee information to the data registered in a mail database, to determine whether the extracted addressee information is acceptable, and if the extracted addressee information is acceptable, performing a correspondence mail workflow;

performing, by the mail processing controller upon command, one or more of a mail flow metrics process and an analytics process to mail data registered in the mail database, wherein the mail processing controller controls the mail processing flow based on results of performing said one or more of the mail flow metrics process and the analytics process;

transmitting, by the mail processing controller, an electronic notification bearing the mailpiece identifier uniquely assigned to the piece of mail to an electronic address of a mail service customer and corresponding to the addressee information extracted from the digital image, to notify the mail service customer as to (i) arrival of the piece of mail at the mail center and (ii) a notification response page at which to specify disposition instructions to the mailcenter to process the piece of mail;

registering, by the mail processing controller, the electronic notification and the instructions specified by the mail service customer through the notification response page for the piece of mail in the mail database in association with the mail service customer;

determining, by the mail processing controller in the analytics process, a preferred delivery location of the mail service customer other than a residential address or office location of the mail service customer based on data registered in the mail database in association with the mail service customer; and causing, by the mail processing controller, the notification response page to show the preferred delivery location, determined by the mail processing controller based on the data registered in the mail database in association with the mail service customer, as a default delivery location which is changeable upon command via the notification response page.

* * * * *